US009517647B2

(12) United States Patent
Yamaguchi et al.

(10) Patent No.: US 9,517,647 B2
(45) Date of Patent: Dec. 13, 2016

(54) TAPE CASSETTE

(71) Applicant: Brother Kogyo Kabushiki Kaisha, Nagoya-shi, Aichi-ken (JP)

(72) Inventors: Koshiro Yamaguchi, Kakamigahara (JP); Tsuyoshi Nagae, Kasugai (JP); Teruo Imamaki, Nissin (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/934,512

(22) Filed: Jul. 3, 2013

(65) Prior Publication Data

US 2013/0294807 A1    Nov. 7, 2013

Related U.S. Application Data

(62) Division of application No. 12/644,525, filed on Dec. 22, 2009.

(30) Foreign Application Priority Data

Jun. 30, 2009   (JP) ................................. 2009-156405
Jun. 30, 2009   (JP) ................................. 2009-156406
(Continued)

(51) Int. Cl.
*B41J 11/44*     (2006.01)
*B41J 32/00*     (2006.01)
(Continued)

(52) U.S. Cl.
CPC ............... *B41J 32/00* (2013.01); *B41J 3/4075* (2013.01); *B41J 11/009* (2013.01); *B41J 15/044* (2013.01); *B41J 33/14* (2013.01)

(58) Field of Classification Search
USPC ................... 400/613, 611, 207, 208; 347/214
See application file for complete search history.

(56) References Cited

U.S. PATENT DOCUMENTS 372,044 A     10/1887   Rose et al.
3,901,372 A    8/1975   Denley
(Continued)

FOREIGN PATENT DOCUMENTS

AU    2003294971 A1    7/2004
CA       2108332 A1    4/1994
(Continued)

OTHER PUBLICATIONS

Chinese Office Action issued in Chinese Application No. 200910262680.3 on May 2, 2013.
(Continued)

*Primary Examiner* — Matthew G Marini
(74) *Attorney, Agent, or Firm* — Banner & Witcoff, Ltd.

(57) ABSTRACT

A tape cassette that includes a housing having a top surface, a bottom surface, a front surface and a pair of side surfaces, a tape that is a print medium housed in the housing, a tape exit that discharges, from the housing, the tape guided in the housing along a predetermined feed path, at least a part of the feed path extending parallel to the front surface, and a type indicator portion provided adjacent to the tape exit and in a specified area of the front surface on an upstream side of the tape exit in a feed direction of the tape, the type indicator portion indicating a type of the tape and including vertical information sections and a protrusion formed in at least one of the vertical information sections, the vertical information sections being strip-shaped sections extending along a direction orthogonal to the feed direction.

13 Claims, 27 Drawing Sheets

(30) Foreign Application Priority Data

Jun. 30, 2009 (JP) ................................ 2009-156407
Jun. 30, 2009 (JP) ................................ 2009-156409

(51) Int. Cl.

| | |
|---|---|
| *B41J 3/407* | (2006.01) |
| *B41J 11/00* | (2006.01) |
| *B41J 15/04* | (2006.01) |
| *B41J 33/14* | (2006.01) |

(56) References Cited

U.S. PATENT DOCUMENTS

| | | |
|---|---|---|
| 4,127,883 A | 11/1978 | Mestdagh |
| 4,226,547 A | 10/1980 | Bradshaw et al. |
| 4,360,278 A | 11/1982 | Paque |
| D267,330 S | 12/1982 | Worrell |
| 4,391,539 A | 7/1983 | Connoy |
| 4,402,619 A | 9/1983 | Paque et al. |
| 4,557,617 A | 12/1985 | Richardson et al. |
| 4,567,488 A | 1/1986 | Moriguchi |
| 4,678,353 A | 7/1987 | Richardson et al. |
| 4,725,155 A | 2/1988 | Kittel et al. |
| 4,773,775 A | 9/1988 | Bradshaw et al. |
| 4,815,871 A | 3/1989 | McGourty et al. |
| 4,815,874 A | 3/1989 | Richardson et al. |
| 4,815,875 A | 3/1989 | Richardson et al. |
| 4,832,514 A | 5/1989 | Basile |
| 4,844,636 A | 7/1989 | Paque |
| 4,880,325 A | 11/1989 | Ueda et al. |
| 4,892,425 A | 1/1990 | Shimizu et al. |
| D307,296 S | 4/1990 | Ivarson et al. |
| 4,915,516 A | 4/1990 | Shimizu |
| 4,917,514 A | 4/1990 | Richardson et al. |
| D307,918 S | 5/1990 | Goda |
| 4,927,278 A | 5/1990 | Kuzuya et al. |
| 4,930,913 A | 6/1990 | Basile |
| D311,416 S | 10/1990 | Richardson et al. |
| 4,966,476 A | 10/1990 | Kuzuya et al. |
| 4,983,058 A | 1/1991 | Nagae |
| 5,022,771 A | 6/1991 | Paque |
| D319,070 S | 8/1991 | Lavander |
| D320,391 S | 10/1991 | Paque |
| 5,056,940 A | 10/1991 | Basile |
| 5,078,523 A | 1/1992 | McGourty et al. |
| 5,098,208 A | 3/1992 | Martinez |
| 5,104,247 A | 4/1992 | Ohshima |
| 5,111,216 A | 5/1992 | Richardson et al. |
| 5,188,469 A | 2/1993 | Nagao et al. |
| 5,193,919 A | 3/1993 | Godo et al. |
| 5,195,835 A | 3/1993 | Collins |
| 5,203,951 A | 4/1993 | Hattori et al. |
| 5,223,939 A | 6/1993 | Imaizumi et al. |
| 5,227,477 A | 7/1993 | Auerbach et al. |
| 5,239,437 A | 8/1993 | Hoge et al. |
| D342,275 S | 12/1993 | Cooper |
| RE34,521 E | 1/1994 | Shimizu |
| 5,277,503 A | 1/1994 | Nagao |
| 5,318,370 A | 6/1994 | Nehowig |
| 5,348,406 A | 9/1994 | Yoshiaki et al. |
| 5,350,243 A | 9/1994 | Ichinomiya et al. |
| D352,305 S | 11/1994 | Cooper |
| 5,374,132 A | 12/1994 | Kimura |
| D356,333 S | 3/1995 | Pearce et al. |
| 5,395,173 A | 3/1995 | Ueno et al. |
| 5,399,033 A | 3/1995 | Putman |
| D357,497 S | 4/1995 | Gray et al. |
| 5,411,339 A | 5/1995 | Bahrabadi et al. |
| 5,419,648 A | 5/1995 | Nagao et al. |
| D359,303 S | 6/1995 | Gray et al. |
| 5,424,757 A | 6/1995 | Thom |
| 5,429,443 A | 7/1995 | Kobayashi et al. |
| 5,431,504 A | 7/1995 | Beadman et al. |
| 5,435,657 A | 7/1995 | Pearce et al. |
| 5,466,076 A | 11/1995 | Kobayashi et al. |
| 5,492,282 A | 2/1996 | Okuchi et al. |
| 5,492,420 A | 2/1996 | Nunokawa et al. |
| 5,494,362 A | 2/1996 | Kobayashi et al. |
| 5,506,736 A | 4/1996 | Ota |
| 5,511,891 A | 4/1996 | Nehowig et al. |
| 5,518,328 A | 5/1996 | Okuchi et al. |
| 5,533,818 A | 7/1996 | Bahrabadi |
| 5,536,092 A | 7/1996 | Yamaguchi |
| 5,538,352 A | 7/1996 | Sugiura |
| 5,540,510 A | 7/1996 | Sims et al. |
| 5,541,796 A | 7/1996 | Sawada |
| 5,553,952 A | 9/1996 | Umbach |
| 5,564,843 A | 10/1996 | Kawaguchi |
| 5,593,237 A | 1/1997 | Nozaki et al. |
| 5,595,447 A | 1/1997 | Takayama et al. |
| 5,599,119 A | 2/1997 | Nunokawa et al. |
| 5,605,404 A | 2/1997 | Nunokawa et al. |
| 5,620,268 A | 4/1997 | Yamaguchi et al. |
| 5,634,728 A | 6/1997 | Nunokawa et al. |
| 5,653,542 A | 8/1997 | Sugimoto et al. |
| 5,658,083 A | 8/1997 | Day et al. |
| 5,659,441 A | 8/1997 | Eckberg et al. |
| 5,709,486 A | 1/1998 | Day |
| 5,727,888 A | 3/1998 | Sugimoto et al. |
| 5,730,536 A | 3/1998 | Yamaguchi |
| 5,739,839 A | 4/1998 | Iwai et al. |
| 5,752,777 A | 5/1998 | Nunokawa et al. |
| 5,765,954 A | 6/1998 | Nunokawa et al. |
| 5,771,803 A | 6/1998 | Takami |
| 5,788,387 A | 8/1998 | Takayama et al. |
| 5,795,086 A | 8/1998 | Watanabe et al. |
| 5,813,773 A | 9/1998 | Kawai |
| 5,813,779 A | 9/1998 | Palmer et al. |
| 5,823,689 A | 10/1998 | Nehowig et al. |
| 5,825,724 A | 10/1998 | Matsumoto et al. |
| 5,826,995 A | 10/1998 | Day et al. |
| 5,857,788 A | 1/1999 | Gutsell et al. |
| 5,860,752 A | 1/1999 | Watanabe et al. |
| 5,887,993 A | 3/1999 | Nunokawa et al. |
| 5,961,225 A | 10/1999 | Nunokawa et al. |
| 5,964,539 A | 10/1999 | Yamaguchi et al. |
| 5,967,678 A | 10/1999 | Nunokawa et al. |
| 5,997,194 A | 12/1999 | Nunokawa et al. |
| 6,012,860 A | 1/2000 | Nunokawa et al. |
| 6,042,280 A | 3/2000 | Yamaguchi et al. |
| 6,048,118 A | 4/2000 | Martinez et al. |
| 6,050,672 A * | 4/2000 | Matsuhashi ................ 347/36 |
| 6,050,734 A | 4/2000 | Watanabe et al. |
| 6,059,469 A | 5/2000 | Hirumi |
| 6,106,171 A | 8/2000 | Nunokawa et al. |
| 6,116,796 A | 9/2000 | Yamaguchi et al. |
| 6,126,344 A | 10/2000 | Takayama et al. |
| 6,132,120 A | 10/2000 | Yamaguchi et al. |
| 6,146,034 A | 11/2000 | Watanabe et al. |
| 6,149,325 A | 11/2000 | Nunokawa et al. |
| 6,160,679 A | 12/2000 | Maekawa et al. |
| 6,167,696 B1 | 1/2001 | Maaseidvaag et al. |
| 6,168,328 B1 | 1/2001 | Ueda et al. |
| 6,190,065 B1 | 2/2001 | Brzuskiewicz |
| 6,190,069 B1 | 2/2001 | Yamaguchi et al. |
| 6,196,740 B1 | 3/2001 | Yamaguchi et al. |
| 6,227,477 B1 | 5/2001 | Komatsuzaki et al. |
| 6,232,993 B1 | 5/2001 | Kobayashi et al. |
| 6,270,269 B1 | 8/2001 | Watanabe et al. |
| 6,317,156 B1 | 11/2001 | Nagasaki |
| 6,334,724 B2 | 1/2002 | Yamaguchi et al. |
| 6,386,774 B1 | 5/2002 | Takayama et al. |
| 6,406,202 B1 | 6/2002 | Unno et al. |
| 6,419,648 B1 | 7/2002 | Vitek et al. |
| 6,429,443 B1 | 8/2002 | Mankos et al. |
| 6,435,744 B1 | 8/2002 | Dunn et al. |
| 6,476,838 B1 | 11/2002 | Italiano |
| 6,485,206 B1 | 11/2002 | Takahashi |
| 6,520,696 B2 | 2/2003 | Huss et al. |
| 6,644,876 B2 | 11/2003 | Carriere et al. |
| D486,853 S | 2/2004 | Wilken et al. |
| 6,709,179 B2 | 3/2004 | Yamaguchi et al. |
| 6,910,819 B2 | 6/2005 | Carriero et al. |
| 6,929,415 B2 | 8/2005 | Wilken |

(56) References Cited

U.S. PATENT DOCUMENTS

| | | |
|---|---|---|
| 6,955,318 B2 | 10/2005 | Nonomura |
| D519,522 S | 4/2006 | Lee |
| 7,070,347 B2 | 7/2006 | Carriere et al. |
| 7,070,348 B2 | 7/2006 | Sugimoto et al. |
| 7,097,372 B1 | 8/2006 | Heyse et al. |
| 7,121,751 B2 | 10/2006 | Harada et al. |
| 7,128,483 B2 | 10/2006 | Harada et al. |
| D534,203 S | 12/2006 | Harada et al. |
| 7,201,522 B2 | 4/2007 | Bandholz et al. |
| D542,334 S | 5/2007 | Harada et al. |
| 7,232,268 B2 | 6/2007 | Sugimoto et al. |
| 7,287,715 B2 | 10/2007 | Ban |
| 7,296,941 B2 | 11/2007 | Suzuki et al. |
| 7,357,585 B2 | 4/2008 | Kurashina |
| 7,404,684 B2 | 7/2008 | Sugimoto et al. |
| D579,942 S | 11/2008 | Terry et al. |
| 7,503,714 B2 | 3/2009 | Yamamoto et al. |
| 7,841,790 B2 | 11/2010 | Yamaguchi et al. |
| 7,942,594 B2 | 5/2011 | Kumazaki et al. |
| 7,965,308 B2 | 6/2011 | Jauert et al. |
| 8,045,288 B2 | 10/2011 | Ota et al. |
| 8,109,684 B2 | 2/2012 | Yamaguchi |
| 8,162,553 B2 | 4/2012 | Vandermeulen |
| 8,164,609 B2 | 4/2012 | Liu et al. |
| 8,382,389 B2 | 2/2013 | Yamaguchi et al. |
| D681,727 S | 5/2013 | Van Den Broecke |
| 8,529,142 B2 | 9/2013 | Tanaka |
| 8,540,444 B2 | 9/2013 | Vandermeulen et al. |
| 8,562,228 B2 | 10/2013 | Yamaguchi et al. |
| 8,641,304 B2 | 2/2014 | Yamaguchi et al. |
| 8,734,035 B2 | 5/2014 | Suva et al. |
| 8,740,482 B2 | 6/2014 | Yamaguchi et al. |
| 8,757,907 B2 | 6/2014 | Yamaguchi et al. |
| 8,764,326 B2 | 7/2014 | Yamaguchi et al. |
| 8,770,877 B2 | 7/2014 | Yamaguchi et al. |
| 2002/0006303 A1 | 1/2002 | Yamaguchi et al. |
| 2002/0012558 A1 | 1/2002 | Huss et al. |
| 2002/0047063 A1 | 4/2002 | Kaneda et al. |
| 2002/0135938 A1 | 9/2002 | Hiraguchi et al. |
| 2003/0081978 A1 | 5/2003 | Carriere et al. |
| 2004/0056143 A1 | 3/2004 | Nonomura |
| 2004/0062586 A1 | 4/2004 | Harada et al. |
| 2004/0233269 A1 | 11/2004 | Tsubota |
| 2004/0265027 A1 | 12/2004 | Hine et al. |
| 2005/0036816 A1 | 2/2005 | Carriere et al. |
| 2005/0152732 A1 | 7/2005 | Bandholz et al. |
| 2005/0172981 A1 | 8/2005 | Byun |
| 2006/0008608 A1 | 1/2006 | Kurashina |
| 2006/0088802 A1 | 4/2006 | Akaiwa |
| 2006/0182921 A1 | 8/2006 | Hioki et al. |
| 2006/0193669 A1 | 8/2006 | Takada et al. |
| 2006/0204304 A1 | 9/2006 | Hioki et al. |
| 2006/0216099 A1 | 9/2006 | Sakano et al. |
| 2006/0216100 A1 | 9/2006 | Minoya et al. |
| 2006/0233582 A1 | 10/2006 | Horiuchi |
| 2006/0238600 A1 | 10/2006 | Vandermeulen et al. |
| 2006/0239743 A1 | 10/2006 | Naito |
| 2007/0009302 A1 | 1/2007 | Vandermeulen |
| 2007/0009306 A1 | 1/2007 | Harada et al. |
| 2007/0031171 A1 | 2/2007 | Heyse et al. |
| 2007/0041772 A1 | 2/2007 | Harada et al. |
| 2007/0070168 A1 | 3/2007 | Mindler |
| 2007/0098473 A1 | 5/2007 | Heyse et al. |
| 2007/0172293 A1 | 7/2007 | Vandermeulen |
| 2007/0212149 A1 | 9/2007 | Ota et al. |
| 2007/0231041 A1 | 10/2007 | Ueda et al. |
| 2007/0237562 A1 | 10/2007 | Kato et al. |
| 2007/0264070 A1 | 11/2007 | Loo et al. |
| 2007/0283249 A1 | 12/2007 | Nose et al. |
| 2008/0003043 A1 | 1/2008 | Fukui et al. |
| 2008/0050160 A1 | 2/2008 | Yamaguchi et al. |
| 2008/0056793 A1 | 3/2008 | Yokoyama |
| 2008/0080922 A1 | 4/2008 | Vandermeulen |
| 2008/0181703 A1 | 7/2008 | Ito et al. |
| 2008/0181708 A1 | 7/2008 | Yamaguchi et al. |
| 2008/0226373 A1 | 9/2008 | Yamaguchi et al. |
| 2008/0232886 A1 | 9/2008 | Kato |
| 2008/0310904 A1 | 12/2008 | Yamaguchi et al. |
| 2009/0016795 A1 | 1/2009 | Caveney et al. |
| 2009/0190988 A1 | 7/2009 | Vereecken et al. |
| 2009/0202283 A1 | 8/2009 | Kumazaki et al. |
| 2009/0285617 A1 | 11/2009 | Vandermeulen |
| 2010/0119281 A1 | 5/2010 | Ford et al. |
| 2010/0166475 A1 | 7/2010 | Yamaguchi et al. |
| 2010/0166478 A1 | 7/2010 | Yamaguchi et al. |
| 2010/0166479 A1 | 7/2010 | Yamaguchi et al. |
| 2010/0232862 A1 | 9/2010 | Vandermeulen |
| 2010/0247208 A1 | 9/2010 | Yamaguchi et al. |
| 2010/0247209 A1 | 9/2010 | Yamaguchi et al. |
| 2010/0247210 A1 | 9/2010 | Yamaguchi et al. |
| 2010/0272492 A1 | 10/2010 | Van Britsom et al. |
| 2011/0058884 A1 | 3/2011 | Kato |
| 2012/0008999 A1 | 1/2012 | Yamaguchi et al. |
| 2012/0027485 A1 | 2/2012 | Suva et al. |
| 2012/0027486 A1 | 2/2012 | Suva et al. |
| 2012/0027487 A1 | 2/2012 | Suva et al. |
| 2012/0057917 A1 | 3/2012 | Van Britsom et al. |
| 2012/0080550 A1 | 4/2012 | Yamaguchi et al. |
| 2012/0170959 A1 | 7/2012 | Vandermeulen et al. |
| 2012/0188325 A1 | 7/2012 | Yamaguchi et al. |
| 2012/0189366 A1 | 7/2012 | Yamaguchi et al. |
| 2012/0201588 A1 | 8/2012 | Yamaguchi et al. |
| 2014/0205350 A1 | 7/2014 | Yamaguchi et al. |
| 2014/0218458 A1 | 8/2014 | Suva et al. |

FOREIGN PATENT DOCUMENTS

| | | |
|---|---|---|
| CA | 2182264 A1 | 6/1996 |
| CH | 121073 | 6/1927 |
| CH | 136498 | 11/1929 |
| CN | 1098984 A | 2/1995 |
| CN | 1119146 A | 3/1996 |
| CN | 1143928 A | 2/1997 |
| CN | 1146954 A | 4/1997 |
| CN | 1148547 A | 4/1997 |
| CN | 1148548 | 4/1997 |
| CN | 1166155 A | 11/1997 |
| CN | 1289293 | 3/2001 |
| CN | 1313197 A | 9/2001 |
| CN | 1313198 A | 9/2001 |
| CN | 1085151 C | 5/2002 |
| CN | 1376115 | 10/2002 |
| CN | 1385312 A | 12/2002 |
| CN | 1385313 A | 12/2002 |
| CN | 1385314 A | 12/2002 |
| CN | 1397431 | 2/2003 |
| CN | 1415482 A | 5/2003 |
| CN | 1415484 | 5/2003 |
| CN | 1415484 A | 5/2003 |
| CN | 1415485 A | 5/2003 |
| CN | 1469811 | 1/2004 |
| CN | 1493462 | 5/2004 |
| CN | 1636755 | 7/2005 |
| CN | 1642746 | 7/2005 |
| CN | 1663807 A | 9/2005 |
| CN | 1744993 A | 3/2006 |
| CN | 1744994 A | 3/2006 |
| CN | 1762720 | 4/2006 |
| CN | 1799850 A | 7/2006 |
| CN | 1799851 A | 7/2006 |
| CN | 1820940 A | 8/2006 |
| CN | 1827386 | 9/2006 |
| CN | 1835867 | 9/2006 |
| CN | 1865012 A | 11/2006 |
| CN | 1914045 A | 2/2007 |
| CN | 1990261 A | 7/2007 |
| CN | 1331684 C | 8/2007 |
| CN | 101028771 A | 9/2007 |
| CN | 101039807 A | 9/2007 |
| CN | 101060985 | 10/2007 |
| CN | 101128324 | 2/2008 |
| CN | 101229724 | 7/2008 |
| CN | 101264701 A | 9/2008 |
| CN | 101264702 A | 9/2008 |

(56) References Cited

FOREIGN PATENT DOCUMENTS

| | | |
|---|---|---|
| CN | 101310989 | 11/2008 |
| CN | 101327696 | 12/2008 |
| CN | 101356061 A | 1/2009 |
| CN | 101516628 A | 8/2009 |
| CN | 101758676 A | 6/2010 |
| CN | 102616025 | 8/2012 |
| CN | 202895934 | 4/2013 |
| EP | 119179 A1 | 9/1984 |
| EP | 214466 A2 | 3/1987 |
| EP | 0329369 A2 | 8/1989 |
| EP | 0511602 A1 | 11/1992 |
| EP | 0555954 A2 | 8/1993 |
| EP | 0593269 A2 | 4/1994 |
| EP | 0629509 A2 | 12/1994 |
| EP | 0635375 | 1/1995 |
| EP | 0644506 A2 | 3/1995 |
| EP | 0684143 A2 | 11/1995 |
| EP | 0703089 A1 | 3/1996 |
| EP | 734878 A2 | 10/1996 |
| EP | 0742103 A1 | 11/1996 |
| EP | 0760291 | 3/1997 |
| EP | 0863021 B1 | 9/1998 |
| EP | 0644506 | 4/1999 |
| EP | 0644506 B1 | 4/1999 |
| EP | 0936076 A2 | 8/1999 |
| EP | 0940263 A2 | 9/1999 |
| EP | 0958931 A2 | 11/1999 |
| EP | 0997300 A2 | 5/2000 |
| EP | 1167049 A1 | 1/2002 |
| EP | 1170139 A1 | 1/2002 |
| EP | 1199179 A1 | 4/2002 |
| EP | 1284196 A2 | 2/2003 |
| EP | 12847196 A2 | 2/2003 |
| EP | 1502758 | 2/2005 |
| EP | 1516739 A1 | 3/2005 |
| EP | 1552949 | 7/2005 |
| EP | 1575781 A1 | 9/2005 |
| EP | 1700705 A1 | 9/2006 |
| EP | 1707395 A1 | 10/2006 |
| EP | 1829696 A2 | 9/2007 |
| EP | 2059396 A1 | 5/2009 |
| EP | 2236303 A1 | 10/2010 |
| EP | 2236304 A1 | 10/2010 |
| EP | 2448762 B1 | 9/2013 |
| JP | 58220783 | 12/1973 |
| JP | S56-20944 U | 2/1981 |
| JP | S58-139415 U | 9/1983 |
| JP | 5978879 | 5/1984 |
| JP | S60-99692 U | 7/1985 |
| JP | S61-179776 | 8/1986 |
| JP | 62-173944 | 11/1987 |
| JP | S63-81063 U | 5/1988 |
| JP | 63-166557 A | 7/1988 |
| JP | 63-203348 A | 8/1988 |
| JP | 63-254085 A | 10/1988 |
| JP | H01-195088 A | 8/1989 |
| JP | H01-146945 U | 10/1989 |
| JP | H02-56664 | 4/1990 |
| JP | H02-56665 | 4/1990 |
| JP | H02-56666 U | 4/1990 |
| JP | H02-147272 | 6/1990 |
| JP | 3-093584 A | 4/1991 |
| JP | 03-151261 | 6/1991 |
| JP | 03151261 | 6/1991 |
| JP | 3063155 | 9/1991 |
| JP | H03-118672 U | 12/1991 |
| JP | H03-120680 U | 12/1991 |
| JP | 416113 | 2/1992 |
| JP | H04-37575 A | 2/1992 |
| JP | H04-133756 A | 5/1992 |
| JP | H4133756 | 5/1992 |
| JP | H04-168086 A | 6/1992 |
| JP | H05-16342 U | 3/1993 |
| JP | H05-18853 | 3/1993 |
| JP | H05-63067 A | 3/1993 |
| JP | 05104840 | 4/1993 |
| JP | H05-155067 A | 6/1993 |
| JP | H05-54225 U | 7/1993 |
| JP | H05-78565 U | 10/1993 |
| JP | 5-80765 U | 11/1993 |
| JP | H05-294051 A | 11/1993 |
| JP | H05-301435 | 11/1993 |
| JP | H06-12053 U | 2/1994 |
| JP | H06-52560 A | 2/1994 |
| JP | 6-21953 U | 3/1994 |
| JP | 6-152907 A | 5/1994 |
| JP | 06122239 | 5/1994 |
| JP | 06122249 | 5/1994 |
| JP | 06127094 | 5/1994 |
| JP | H06-124406 A | 5/1994 |
| JP | 6-53560 | 7/1994 |
| JP | 6-191081 A | 7/1994 |
| JP | H06183117 A | 7/1994 |
| JP | 6-210889 A | 8/1994 |
| JP | H06-255145 A | 9/1994 |
| JP | H06-74348 U | 10/1994 |
| JP | H06-328800 A | 11/1994 |
| JP | 071782 | 1/1995 |
| JP | H07-1805 A | 1/1995 |
| JP | H07-9743 A | 1/1995 |
| JP | H07-25122 | 1/1995 |
| JP | H07-25123 A | 1/1995 |
| JP | H07-47737 A | 2/1995 |
| JP | 07-068814 | 3/1995 |
| JP | 7020725 | 3/1995 |
| JP | H07-61009 A | 3/1995 |
| JP | H07-68877 | 3/1995 |
| JP | H07-69497 A | 3/1995 |
| JP | 7-108702 A | 4/1995 |
| JP | H07-89115 A | 4/1995 |
| JP | H07-89196 A | 4/1995 |
| JP | H07-101133 A | 4/1995 |
| JP | H07-108730 | 4/1995 |
| JP | H789196 | 4/1995 |
| JP | H07-137327 A | 5/1995 |
| JP | H07-40456 U | 7/1995 |
| JP | H07-214876 | 8/1995 |
| JP | 7-237314 A | 9/1995 |
| JP | 7-276695 A | 10/1995 |
| JP | H07-251539 A | 10/1995 |
| JP | H07-276695 A | 10/1995 |
| JP | H07-290803 A | 11/1995 |
| JP | 07314862 | 12/1995 |
| JP | H07-314864 A | 12/1995 |
| JP | H07-314865 A | 12/1995 |
| JP | H07-314866 A | 12/1995 |
| JP | H08-25768 A | 1/1996 |
| JP | H08-39909 A | 2/1996 |
| JP | 8-58211 | 3/1996 |
| JP | H08-90887 A | 4/1996 |
| JP | H08-118738 A | 5/1996 |
| JP | H08-165035 | 6/1996 |
| JP | 08216461 | 8/1996 |
| JP | 8-252964 A | 10/1996 |
| JP | 8-267839 A | 10/1996 |
| JP | H08-290618 A | 11/1996 |
| JP | 09-039347 | 2/1997 |
| JP | 2596263 | 4/1997 |
| JP | H09-109533 | 4/1997 |
| JP | 09123579 | 5/1997 |
| JP | H09-118044 A | 5/1997 |
| JP | H09-134557 A | 5/1997 |
| JP | 9-141986 A | 6/1997 |
| JP | 09141997 | 6/1997 |
| JP | H09-188049 A | 7/1997 |
| JP | H09-188050 A | 7/1997 |
| JP | 09240158 | 9/1997 |
| JP | 10-056604 | 2/1998 |
| JP | 10-181063 A | 7/1998 |
| JP | H10-301701 A | 11/1998 |
| JP | H1-146945 A | 2/1999 |
| JP | H11-78188 A | 3/1999 |
| JP | H11-78189 | 3/1999 |
| JP | 1191144 | 4/1999 |

(56) References Cited

FOREIGN PATENT DOCUMENTS

| | | |
|---|---|---|
| JP | H11-105351 A | 4/1999 |
| JP | H11-129563 A | 5/1999 |
| JP | H11-263055 A | 9/1999 |
| JP | H11-263056 A | 9/1999 |
| JP | 2000-006501 A | 1/2000 |
| JP | 2998617 | 1/2000 |
| JP | 2000006481 | 1/2000 |
| JP | 2000025251 A | 1/2000 |
| JP | 2000-043337 A | 2/2000 |
| JP | 2000043336 A | 2/2000 |
| JP | 2000-076372 | 3/2000 |
| JP | 2000085224 A | 3/2000 |
| JP | 3031439 | 4/2000 |
| JP | 2000103129 A | 4/2000 |
| JP | 2000103131 A | 4/2000 |
| JP | 2000135843 A | 5/2000 |
| JP | 2000198258 A | 7/2000 |
| JP | 2000-211193 | 8/2000 |
| JP | 2000-229750 | 8/2000 |
| JP | 2001011594 A | 1/2001 |
| JP | 2001048389 A | 2/2001 |
| JP | 2001088359 | 4/2001 |
| JP | 2001-121797 A | 5/2001 |
| JP | 3207860 B2 | 9/2001 |
| JP | 2001310540 A | 11/2001 |
| JP | 2001319447 A | 11/2001 |
| JP | 2002-053248 A | 2/2002 |
| JP | 2002042441 A | 2/2002 |
| JP | 3266736 B2 | 3/2002 |
| JP | 3266739 | 3/2002 |
| JP | 2002-103762 | 4/2002 |
| JP | 2002104568 A | 4/2002 |
| JP | 2002-166606 | 6/2002 |
| JP | 2002-167084 | 6/2002 |
| JP | 2002166605 | 6/2002 |
| JP | 2002179300 A | 6/2002 |
| JP | 2002-308518 A | 10/2002 |
| JP | 2002-308518 A | 10/2002 |
| JP | 2002192769 | 10/2002 |
| JP | 2002308481 A | 10/2002 |
| JP | 3357128 | 12/2002 |
| JP | 2002367333 A | 12/2002 |
| JP | 2003-011454 | 1/2003 |
| JP | 2003-026164 | 1/2003 |
| JP | 2003-048337 A | 2/2003 |
| JP | 2003-506235 | 2/2003 |
| JP | 3378622 | 2/2003 |
| JP | 3378622 B2 | 2/2003 |
| JP | 2003-072127 | 3/2003 |
| JP | 2003145902 | 5/2003 |
| JP | 3426983 | 7/2003 |
| JP | 2003-251904 | 9/2003 |
| JP | 2003251902 A | 9/2003 |
| JP | 2003285522 A | 10/2003 |
| JP | 2004-018077 | 1/2004 |
| JP | 2004-155150 A | 6/2004 |
| JP | 3543659 | 7/2004 |
| JP | 3543659 B2 | 7/2004 |
| JP | 2004-255656 | 9/2004 |
| JP | 3564848 B2 | 9/2004 |
| JP | 3567469 | 9/2004 |
| JP | 2004291591 A | 10/2004 |
| JP | 2004323241 A | 11/2004 |
| JP | 3106187 | 12/2004 |
| JP | 2005-059504 | 3/2005 |
| JP | 2005-088597 A | 4/2005 |
| JP | 2005-178206 | 7/2005 |
| JP | 2005231203 A | 9/2005 |
| JP | 2005-298031 | 10/2005 |
| JP | 2005280008 A | 10/2005 |
| JP | 2005297348 | 10/2005 |
| JP | 4061507 | 11/2005 |
| JP | 2006021432 | 1/2006 |
| JP | 2006-512224 A | 4/2006 |
| JP | 2006096030 | 4/2006 |
| JP | 2006-168974 A | 6/2006 |
| JP | 2006142835 A | 6/2006 |
| JP | 2006182034 A | 7/2006 |
| JP | 2006-240310 A | 9/2006 |
| JP | 2006248059 A | 9/2006 |
| JP | 2006-264337 | 10/2006 |
| JP | 2006-272895 A | 10/2006 |
| JP | 2006272895 A | 10/2006 |
| JP | 2006272977 A | 10/2006 |
| JP | 2006289991 A | 10/2006 |
| JP | 2007111863 | 5/2007 |
| JP | 2007-196654 A | 8/2007 |
| JP | 2007-230155 A | 9/2007 |
| JP | 2007-268815 | 10/2007 |
| JP | 4003068 B2 | 11/2007 |
| JP | 2007296863 A | 11/2007 |
| JP | 2008044180 | 2/2008 |
| JP | 4061507 B2 | 3/2008 |
| JP | 2008062474 A | 3/2008 |
| JP | 2008-509823 A | 4/2008 |
| JP | 2008080668 A | 4/2008 |
| JP | 2008083432 | 4/2008 |
| JP | 2008094103 | 4/2008 |
| JP | 2008-213462 A | 9/2008 |
| JP | 2008-229855 A | 10/2008 |
| JP | 2008254384 | 10/2008 |
| JP | 2008-279678 | 11/2008 |
| JP | 2008-279678 A | 11/2008 |
| JP | 2008265180 A | 11/2008 |
| JP | 2008265278 | 11/2008 |
| JP | 2008-307703 | 12/2008 |
| JP | 2009001020 | 1/2009 |
| JP | 2009028976 A | 2/2009 |
| JP | 2009-509812 A | 3/2009 |
| JP | 2009-184832 A | 8/2009 |
| JP | 2009-214431 | 9/2009 |
| JP | 2009-215083 A | 9/2009 |
| JP | 2010-234697 A | 10/2010 |
| JP | 4571626 B2 | 10/2010 |
| JP | 2011-011407 A | 1/2011 |
| JP | 2011011401 A | 1/2011 |
| JP | 2011-110843 A | 6/2011 |
| JP | 2011-110845 A | 6/2011 |
| JP | 2011-110848 A | 6/2011 |
| KR | 2007-0091073 A | 9/2007 |
| RU | 2297333 C2 | 4/2007 |
| TW | 200827179 A | 7/2008 |
| WO | 96/16812 A1 | 6/1996 |
| WO | 0032401 A1 | 6/2000 |
| WO | 0110649 | 2/2001 |
| WO | 0232680 | 4/2002 |
| WO | 03080350 A1 | 10/2003 |
| WO | 2004/058509 A1 | 7/2004 |
| WO | 2005101306 A1 | 10/2005 |
| WO | 2005/120844 A1 | 12/2005 |
| WO | 2006013466 | 2/2006 |
| WO | 2006033431 | 2/2006 |
| WO | 2006024913 A2 | 3/2006 |
| WO | 2006033432 A1 | 3/2006 |
| WO | 2006090842 A1 | 8/2006 |
| WO | 2008/029931 A1 | 3/2008 |
| WO | 2009/107534 A1 | 9/2009 |
| WO | 2010113445 A1 | 10/2010 |
| WO | 20101113782 | 10/2010 |

OTHER PUBLICATIONS

Chinese Office Action issued in Chinese Application 200910262679.0 on May 2, 2013.
Chinese Office Action issued in Chinese Application 200910262677.1 on May 2, 2013.
Japanese Office Action issued in Japanese Application 2010-073747 on May 14, 2013.
Japanese Office Action issued in Japanese Application 2010-073749 on May 21, 2013.
Japanese Office Action issued in Japanese Application 2010-073751 on May 28, 2013.

(56) References Cited

OTHER PUBLICATIONS

Japanese Office Action issued in Japanese Application 2010-073754 on Jun. 4, 2013.
Japanese Office Action issued in Japanese Application 2010-073755 on May 21, 2013.
Japanese Office Action issued in Japanese Application 2009-156350 on Jul. 2, 2013.
Japanese Office Action issued in Japanese Application 2009-156281 on Jul. 2, 2013.
Chinese Office Action issued in Chinese Application 2009-80161443.6 on Jun. 4, 2013.
New Zealand Office Action issued in New Zealand Application 596044 on Jul. 10, 2013.
Japanese Office Action issued in Japanese Application 2010-73748 on Apr. 23, 2013.
Japanese Office Action issued in Japanese Application 2010-73750 on Apr. 23, 2013.
Chinese Office Action issued in Chinese Application No. 200910262675.2 on Aug. 7, 2013.
Chinese Office Action issued in Chinese Application No. 201080013339.5 on Aug. 22, 2013.
Japanese Office Action issued in Japanese Application No. 2011507143 on Sep. 3, 2013.
Japanese Office Action issued in Japanese Application No. 2011547222 on Oct. 1, 2013.
Final Office Action issued Dec. 23, 2013 in U.S. Appl. No. 13/431,350.
New Zealand Office Action issued in Application No. 596044 on Sep. 25, 2013.
Chinese Office Action issued in Application No. 201010150928 on Sep. 3, 2013.
U.S. Office Action issued in U.S. Appl. No. 13/240,266 on Oct. 16, 2013.
Chinese Office Action issued in Application No. 201010150090.4 on Sep. 26, 2013.
Chinese Office Action issued in Application No. 201010150109.5 on Sep. 22, 2013.
Extended European Search Report issued in Application No. 09842716.4 on Nov. 6, 2013.
Chinese Office Action issued in Application No. 201010150088.7 on Sep. 30, 2013.
Chinese Office Action issued in Application No. 200980158165.9 on Oct. 28, 2013.
Extended European Search Report issued in Application No. 10758310.6 on Nov. 12, 2013.
U.S. Office Action issued in U.S. Appl. No. 13/240,216 on Nov. 13, 2013.
Office Action issued in Chinese Patent Application 201010274378.2 dated Jan. 22, 2014.
Extended European Search Report issued Dec. 16, 2013 in EP App. No. 12160324.5.
Extended European Search Report issued Dec. 18, 2013 in EP App. No. 12160192.6.
Extended European Search Report issued Dec. 20, 2013 in EP App. No. 12161271.7.
Office Action issued Dec. 19, 2013 in Chinese Application No. 200910262674.8.
Office Action issued Jan. 17, 2014 in Chinese Application No. 201210071810.7.
Office Action issued Jan. 3, 2014 in Australian Application No. 2010231426.
Office Action issued Dec. 30, 2013 in Chinese Application No. 201010209208.6.
Office Action issued Dec. 30, 2013 in Chinese Application No. 201210070147.9.
Extended European Search Report issued Feb. 5, 2014 in EP App. No. 09852818.5.
Japanese Office Action issue in Application No. 2011-507142 on Nov. 26, 2013.
European Office Action issued in Application No. 10711776.4 on Nov. 22, 2013.
New Zealand Office Action issue in Application No. 596044 on Nov. 8, 2013.
Japanese Office Action issue in Application No. 2011-507049 on Dec. 3, 2013.
Chinese Office Action issue in Application No. 200980161405.0 on Nov. 1, 2013.
Non-Final Office Action received in corresponding U.S. Appl. No. 13/430,080 mailed Mar. 10, 2014.
Notice of Allowance issued in corresponding U.S. Appl. No. 13/240,266 mailed Mar. 27, 2014.
Notice of Allowance issued in corresponding U.S. Appl. No. 12/644,572 mailed Apr. 11, 2014.
Final Office Action received in corresponding U.S. Appl. No. 13/240,216 mailed May 7, 2014.
Non-Final Office Action received in corresponding U.S. Appl. No. 14/226,256 mailed May 22, 2014.
Office Action issued Apr. 1, 2014 in Japanese Application No. 2013-035990.
Office Action issued Mar. 13, 2014 in Chinese Application No. 201010150928.
Office Action issued Apr. 15, 2014 in Australian Application No. 2009332345.
Office Action issued Apr. 1, 2001 in Chinese Application No. 20101015019.
Office Action issued Apr. 2, 2014 in Chinese Application No. 201210070968.
Office Action issued Apr. 17, 2014 in Russian Application No. 2011143817.
Office Action issued May 9, 2014 in Vietnamese Application No. 1-2011-02491.
Notice of Allowance issued in corresponding U.S. Appl. No. 12/732,747 mailed Feb. 19, 2014.
Notice of Allowance issued in corresponding U.S. Appl. No. 12/732,404 mailed Feb. 4, 2014.
Notice of Allowance issued in corresponding U.S. Appl. No. 12/732,828 mailed Jan. 27, 2014.
Notice of Allowance issued in corresponding U.S. Appl. No. 12/644,451 mailed Feb. 24, 2014.
Apr. 2, 2013 (JP) Office Action issued in Japanese Patent Application No. 2009-156398.
Apr. 2, 2013 (JP) Office Action issued in Japanese Patent Application No. 2009-156403.
Apr. 2, 2013 (JP) Office Action issued in Japanese Patent Application No. 2009-156281.
Apr. 2, 2013 (JP) Office Action issued in Japanese Patent Application No. 2009-156355.
Apr. 2, 2013 (JP) Office Action issued in Japanese Patent Application No. 2009-156399.
Apr. 2, 2013 (JP) Office Action issued in Japanese Patent Application No. 2009-156404.
Apr. 2, 2013 (JP) Office Action issued in Japanese Patent Application No. 2009-156350.
Apr. 2, 2013 (JP) Office Action issued in Japanese Patent Application No. 2009-156357.
Apr. 2, 2013 (JP) Office Action issued in Japanese Patent Application No. 2009-156371.
Apr. 2, 2013 (JP) Office Action issued in Japanese Patent Application No. 2009-270325.
Apr. 8, 2013 (EP) European Search Report issued in European Patent Application No. 09852278.2.
Apr. 19, 2013 (CN) Office Action issued in Chinese Patent Application No. 200910262678.6.
Apr. 15, 2013 (CN) Office Action issued in Chinese Patent Application No. 201080013099.9.
May 21, 2013 (JP) Office Action issued in Japanese Patent Application No. 2009-154699.
May 21, 2013 (JP) Office Action issued in Japanese Patent Application No. 2009-154698.
Jan. 29, 2013 (JP) Office Action issued in Japanese Patent Application No. 2011-506968.

(56) References Cited

OTHER PUBLICATIONS

Nov. 13, 2012 (JP) Office Action issued in Japanese Patent Application No. 2009-297502.
Jul. 3, 2012 (JP) Office Action issued in Japanese Patent Application No. 2010-084501.
Jul. 3, 2012 (JP) Office Action issued in Japanese Patent Application No. 2010-084502.
Aug. 14, 2012 (PCT) International Preliminary Report on Patentability issued in PCT/JP2009/071812.
Sep. 11, 2012 (JP) Office Action issued in Japanese Patent Application No. 2009-086172.
Sep. 11, 2012 (JP) Office Action issued in Japanese Patent Application No. 2009-088449.
May 8, 2012 (JP) Office Action issued in Japanese Patent Application No. 2009-086239.
Jun. 12, 2012 (JP) Office Action issued in Japanese Patent Application No. 2009-086222.
Jun. 12, 2012 (JP) Office Action issued in Japanese Patent Application No. 2010-084499.
Mar. 27, 2012 (JP) Office Action issued in Japanese Patent Application No. 2008-331638.
Mar. 27, 2012 (JP) Office Action issued in Japanese Patent Application No. 2009-156405.
Mar. 27, 2012 (JP) Office Action issued in Japanese Patent Application No. 2009-156406.
Mar. 27, 2012 (JP) Office Action issued in Japanese Patent Application No. 2009-156407.
Mar. 7, 2012 (JP) Office Action issued in Japanese Patent Application No. 2009-270221.
Nov. 15, 2011 (PCT) International Preliminary Report on Patentability issued in PCT/JP2009/071568.
Nov. 15, 2011 (PCT) International Preliminary Report on Patentability issued in PCT/JP2010/055324.
Nov. 15, 2011 (PCT) International Preliminary Report on Patentability issued in PCT/JP2010/055326.
Nov. 15, 2011 (PCT) International Preliminary Report on Patentability issued in PCT/JP2010/050253.
Dec. 18, 2012 (JP) Office Action issued in Japanese Patent Application No. 2009-156369.
Jul. 10, 2012 (PCT) International Preliminary Report on Patentability issued in PCT/JP2009/070971.
Apr. 26, 2013 (CN) Office Action issued in Chinese Patent Application No. 200910262676.7.
Nov. 13, 2012 (JP) Office Action issued in Japanese Patent Application No. 2009-270056.
Jul. 3, 2012 (JP) Office Action issued in Japanese Patent Application No. 2010-084500.
Apr. 11, 2012 (PCT) International Preliminary Report on Patentability issued in PCT/JP2010/055310.
Mar. 27, 2012 (JP) Office Action issued in Japanese Patent Application No. 2008-331639.
Nov. 15, 2011 (JP) Office Action issued in Japanese Patent Application No. 2009-088241.
May 20, 2010 (PCT) International Search Report in International Application No. PCT/JP2009/007086.
May 20, 2010 (PCT) International Search Report in International Application No. PCT/JP2009/007085.
Jul. 30, 2010 (PCT) International Search Report in International Application No. PCT/JP2010/002169.
Jul. 30, 2010 (PCT) International Search Report in International Application No. PCT/JP2010/002165.
Mar. 23, 2010 (PCT) International Search Report in International Application No. PCT/JP2009/071568.
May 21, 2010 (PCT) International Search Report in International Application No. PCT/JP2009/007089.
Jun. 22, 2010 (PCT) International Search Report in International Application No. PCT/JP2010/055324.
Jun. 22, 2010 (PCT) International Search Report in International Application No. PCT/JP2010/055326.
Mar. 16, 2010 (PCT) International Search Report in International Application No. PCT/JP2010/050253.
May 20, 2010 (PCT) International Search Report in International Application No. PCT/JP2009/007087.
Mar. 5, 2010 (PCT) International Search Report in International Application No. PCT/JP2009/007088.
Aug. 3, 2010 (PCT) International Search Report in International Application No. PCT/JP2010/002154.
Aug. 3, 2010 (PCT) International Search Report in International Application No. PCT/JP2010/002161.
Jun. 22, 2010 (PCT) International Search Report in International Application No. PCT/JP2010/055305.
Aug. 24, 2010 (PCT) International Search Report in International Application No. PCT/JP2010/004076.
Jun. 22, 2010 (PCT) International Search Report in International Application No. PCT/JP2010/055311.
Jun. 22, 2010 (PCT) International Search Report in International Application No. PCT/JP2010/055310.
Jun. 28, 2010 (PCT) International Search Report in International Application No. PCT/JP2010/002170.
Mar. 23, 2010 (PCT) International Search Report in International Application No. PCT/JP2009/070971.
May 21, 2010 Extended European Search Report in European Patent Application No. 09180351.
Jul. 2, 2010 Extended European Search Report in European Patent Application No. 10157994.
Jul. 12, 2010 Extended European Search Report in European Patent Application No. 10158024.
Oct. 12, 2010 Extended European Search Report in European Patent Application No. 10155348.
May 21, 2010 Extended European Search Report in European Patent Application No. 09180354.
Dec. 3, 2010 Extended European Search Report in European Patent Application No. 10175769.
Oct. 11, 2011 (JP) Office Action issued in Japanese Patent Application No. 2008-331634.
Oct. 11, 2011 (JP) Office Action issued in Japanese Patent Application No. 2009-088440.
Oct. 11, 2011 (JP) Office Action issued in Japanese Patent Application No. 2009-088227.
Oct. 11, 2011 (JP) Office Action issued in Japanese Patent Application No. 2009-088238.
Oct. 11, 2011 (JP) Office Action issued in Japanese Patent Application No. 2009-088441.
Oct. 11, 2011 (JP) Office Action issued in Japanese Patent Application No. 2009-088460.
Jan. 17, 2012 (JP) Office Action issued in Japanese Patent Application No. 2009-088456.
May 22, 2012 (JP) Japanese Office Action issued in Japanese Patent Application No. 2010-041323.
Feb. 14, 2012 (PCT) International Preliminary Report on Patentability in International Application No. PCT/JP2010/055305.
Feb. 14, 2012 (PCT) International Preliminary Report on Patentability in International Application No. PCT/JP2010/055311.
Sep. 28, 2012 (NZ) Examination Report issued in New Zealand Patent Application No. 596044.
Sep. 6, 2012 (EP) Office Action in Application No. 10711477.9-1251.
Mar. 16, 2010 (PCT) International Search Report and Written Opinion issued in International Application No. PCT/JP2009/071812.
Final Office Action received in corresponding U.S. Appl. No. 12/732,457 mailed Mar. 26, 2014.
Non-Final Office Action received in corresponding U.S. Appl. No. 13/431,371 mailed Mar. 25, 2014.
Sep. 2, 2014—(US) Non-Final Office Action—U.S. Appl. No. 14/226,165.
Sep. 9, 2014—(US) Non-Final Office Action—U.S. Appl. No. 14/226,417.
Sep. 9, 2014—(US) Non-Final Office Action—U.S. Appl. No. 14/226,380.
Sep. 12, 2014—(US) Final Office Action—U.S. Appl. No. 13/431,371.

(56) References Cited

OTHER PUBLICATIONS

Sep. 11, 2014—(US) Office Action—U.S. Appl. No. 13/848,750.
Sep. 22, 2014—(US) Non-Final Office Action—U.S. Appl. No. 14/141,673.
Sep. 25, 2014—(US) Non-Final Office Action—U.S. Appl. No. 14/226,424.
Apr. 10, 2014 (CN) Office Action issued in Chinese Application No. 201010150109.5.
Dec. 16, 2014—(US) Notice of Allowance—U.S. Appl. No. 13/240,216.
Dec. 16, 2014—(US) Non-Final Office Action—U.S. Appl. No. 14/226,259.
Jan. 2, 2015—(US) Non-Final Office Action—U.S. Appl. No. 14/226,262.
Jan. 5, 2014—(US) Non-final Office Action—U.S. Appl. No. 14/226,201.
Dec. 5, 2014—(US) Non-Final Office Action—U.S. Appl. No. 14/226,325.
Dec. 1, 2014—(US) Non-Final Office Action—U.S. Appl. No. 14/226,289.
Nov. 4, 2014—(US) Non-Final Office Action—U.S. Appl. No. 14/226,428.
Nov. 5, 2014—(US) Non-Final Office Action—U.S. Appl. No. 14/226,373.
Oct. 27, 2014—(US) Non-Final Office Action—U.S. Appl. No. 14/141,576.
Jan. 22, 2015—(US) Notice of Allowance—U.S. Appl. No. 12/732,457.
Jan 16, 2015—(US) Non-Final Office Action—U.S. Appl. No. 14/226,402.
Jan. 20, 2015—(US) Non-Final Office Action—U.S. Appl. No. 13/431,371.
Jan. 28, 2015—(US) Notice of Allowance—U.S. Appl. No. 13/431,277.
Nov. 12, 2014 (MX) Office Action in Application No. MX/a/2011/013553.
Dec. 26, 2014—(CN) Office Action in Application No. 201080013339.5.
Jan. 22, 2015—(US) Non-Final Office Action—U.S. Appl. No. 14/226,411.
Feb. 10, 2015—(US) Notice of Allowance—U.S. Appl. No. 14/226,380.
Sep. 12, 2014—(US) Non-Final Office Action—U.S. Appl. No. 14/226,386.
Nov. 4, 2014—(US) Non-Final Office Action—U.S. Appl. No. 14/226,367.
Oct. 30, 2015—(US) Final Office Action U.S. Appl. No. 14/226,256.
May 29, 2015—(US) Notice of Allowance—U.S. Appl. No. 14/226,165.
May 26, 2015—(CN) Office Action—App 201310659625.4.
Apr. 9, 2015—(US) Non-Final Office Action—U.S. Appl. No. 14/641,681.
Apr. 17, 2015—(US) Final Office Action—U.S. Appl. No. 14/226,367.
Apr. 21, 2015—(US) Final Office Action—U.S. Appl. No. 14/226,428.
May 1, 2015—(US) Notice of Allowance—U.S. Appl. No. 12/644,572.
May 6, 2015—(US) Final Office Action—U.S. Appl. No. 14/226,259.
May 6, 2015—(US) Final Office Action—U.S. Appl. No. 14/226,373.
Apr. 7, 2015—(TW) Office Action in Application No. 99132600.
May 19, 2015—(US) Final Office Action—U.S. Appl. No. 14/226,289.
May 19, 2015—(US) Notice of Allowance—U.S. Appl. No. 14/226,201.
May 20, 2015—(US) Notice of Allowance—U.S. Appl. No. 13/848,750.
Jun. 2, 2015—(US) Final Office Action—U.S. Appl. No. 14/226,262.
Jun. 5, 2015—(US) Notice of Allowance—U.S. Appl. No. 14/226,380.
Jun. 2, 2015—(US) Non-Final Office Action—U.S. Appl. No. 14/226,256.
Apr. 9, 2015—(TW) Office Action—App 099132598—Eng. Tran.
Feb. 12, 2015—(US) Final Office Action—U.S. Appl. No. 12/732,257.
Feb. 12, 2015—(US) Final Office Action—U.S. Appl. No. 13/431,350.
Feb. 12, 2015—(US) Final Office Action—U.S. Appl. No. 14/226,417.
Feb. 17, 2015—(US) Final Office Action—U.S. Appl. No. 14/141,673.
Mar. 4, 2015—(US) Final Office Action—U.S. Appl. No. 14/141,576.
Mar. 4, 2015—(US) Non-Final Office Action—U.S. Appl. No. 14/226,386.
Mar. 6, 2015—(US) Final Office Action—U.S. Appl. No. 14/226,424.
Feb. 6, 2015—(EP) Extended Search Report—App. 14189221.6.
Jan. 29, 2015—(TW) Office Action—App 099132599.
Mar. 17, 2015—(US) Notice of Allowance—U.S. Appl. No. 13/848,750.
Apr. 1, 2015—(US) Notice of Allowance—U.S. Appl. No. 12/732,457.
Apr. 1, 2015—(US) Notice of Allowance—U.S. Appl. No. 13/430,033.
Jan. 23, 2015 (AU) Office Action in Application No. 2010231426.
Mar. 6, 2015 (AU) Office Action in Application No. 2010231425.
Mar. 10, 2015 (JP) Office Action in Application No. 2014-095027.
Mar. 13, 2015 (US) Notice of Allowance in U.S. Appl. No. 14/226,165.
Mar. 12, 2015 (EP) Search Report in Application No. 14156840.2.
Feb. 19, 2015 (CA) Office Action in Application No. 2755885.
Mar. 2, 2015 (TW) Office Action in Application No. 101110368.
Jun. 17, 2015—(US) Final Office Action—U.S. Appl. No. 14/226,325.
Feb. 13, 2015—(US) Non-Final Office Action—U.S. Appl. No. 13/240,322.
May 29, 2015—(MY) Substantive Examination Adverse Report—App. PI 2013702520—Eng Tran.
Jun. 1, 2015—(CN) Notification of First Office Action—App 201310717842.4—Eng Tran.
Jun. 1, 2015—(CN) Notification of First Office Action—App 201310717871.0—Eng Tran.
Jun. 19, 2015 (CN) Notification of First Office Action—App 201310659875.8—Eng Tran.
Aug. 11, 2015—(AU) Patent Examination Report 1—App 2014221250.
Aug. 6, 2015—(CN) Office Action—App 201410046812.X—Eng Tran.
Sep. 8, 2015—(JP) Office Action—App 2014-210427—Eng Tran.
Sep. 2, 2015—(CN) Notification of First Office Action—App 201410200475.5.
Oct. 23, 2015—(US) Final Office Action—U.S. Appl. No. 13/431,350.
Oct. 26, 2015—(US)—Non-Final Office Action—U.S. Appl. No. 14/643,865.
Oct. 30, 2015—(US)—Non-Final Office Action—U.S. Appl. No. 14/226,373.
Oct. 1, 2015—(US) Notice of Allowance—U.S. Appl. No. 12/732,457.
Oct. 5, 2015—(US) Notice of Allowance—U.S. Appl. No. 12/644,572.
Oct. 5, 2015—(US) Notice of Allowance—U.S. Appl. No. 14/141,673.
Oct. 7, 2015—(US)—Final Office Action—U.S. Appl. No. 13/240,322.
Oct. 13, 2015—(US) Notice of Allowance—U.S. Appl. No. 13/430,033.

(56) References Cited

OTHER PUBLICATIONS

Oct. 20, 2015—(US) Notice of Allowance—U.S. Appl. No. 14/226,201.
Oct. 22, 2015—(US) Final Office Action—U.S. Appl. No. 14/641,681.
Apr. 2, 2015 (EP) Office Action in Application No. 10711776.4.
Apr. 9, 2015—(US) Notice of Allowance—U.S. Appl. No. 13/431,277.
Apr. 10, 2015—(US) Non-Final Office Action—U.S. Appl. No. 13/430,080.
Apr. 13, 2015—(CN) Notification of Third Office Action—App 20120071810.7—Eng. Tran.
Apr. 14, 2015—(US) Notice of Allowance—U.S. Appl. No. 13/240,266.
Apr. 20, 2015 (AU) Office Action in Application No. 2010231426.
May 22, 2015—(US) Non-Final Office Action—U.S. Appl. No. 12/732,257.
Jun. 25, 2015—(US) Non-Final Office Action—U.S. Appl. No. 13/431,350.
Jul. 7, 2015—(US) Notice oc Allowance—U.S. Appl. No. 14/141,673.
Jul. 16, 2015—(US) Non-Final Office Action—U.S. Appl. No. 14/226,417.
Aug. 4, 2015—(US) Notice of Allowance—U.S. Appl. No. 14/141,576.
Jul. 31, 2015—(US) Final Office Action—U.S. Appl. No. 14/226,411.
Aug. 13, 2015—(US) Final Office Action—U.S. Appl. No. 13/431,371.
Aug. 24, 2015—(US) Final Office Action—U.S. Appl. No. 14/226,402.
Sep. 1, 2015—(US) Notice of Allowance—U.S. Appl. No. 14/226,259.
Sep. 9, 2015—(US) Final Office Action—U.S. Appl. No. 14/226,386.
Sep. 8, 2015—(US) Notice of Allowance—U.S. Appl. No. 14/141,673.
Sep. 17, 2015—(US)—Non-Final Office Action—U.S. Appl. No. 14/226,424.
Sep. 18, 2015—(US)—Non-Final Office Action—U.S. Appl. No. 14/226,428.
Dec. 4, 2015—(US) Notice of Allowance—U.S. Appl. No. 14/226,325.
Dec. 10, 2015—(US) Non-Final Office Action—U.S. Appl. No. 14/755,141.
Dec. 11, 2015—(US) Notice of Allowance—U.S. Appl. No. 14/226,165.
Dec. 17, 2015—(US) Non-Final Office Action—U.S. Appl. No. 14/920,398.
Dec. 23, 2015—(US) Final Office Action—U.S. Appl. No. 14/226,417.
Nov. 3, 2015—(US) Notice of Allowance—U.S. Appl. No. 14/226,259.
Nov. 9, 2015—(US) Notice of Allowance—U.S. Appl. No. 13/848,750.
Nov. 13, 2015—(US) Non-Final Office Action—U.S. Appl. No. 14/226,289.
Nov. 20, 2015—(KR) Office Action—App 10-2011-7017238.
Nov. 20, 2015—(KR) Office Action—App 10-2015-7006347.
Nov. 25, 2015—(US) Final Office Action—U.S. Appl. No. 14/226,256.
Nov. 27, 2015—(US) Notice of Allowance—U.S. Appl. No. 14/226,367.
Oct. 27, 2015—(CN) Office Action—App 201410195767.4.
Dec. 24, 2015—(US) Non-Final Office Action—U.S. Appl. No. 14/226,380.
Nov. 27, 2015—(CN) Office Action—App 201410311930.9.
Dec. 3, 2015—(CN) Office Action—App 201510088644.5.
Jan. 12, 2016—(US) Notice of Allowance—U.S. Appl. No. 13/431,371.
Jan. 15, 2016—(US) Notice of Allowance—U.S. Appl. No. 12/732,257.
Jan. 29, 2016—(US) Notice of Allowance—U.S. Appl. No. 14/226,411.
Dec. 24, 2015—(TW) Decision of Rejection—App 101110368—Eng Tran.
Feb. 5, 2016—(US) Non-Final Office Action—U.S. Appl. No. 13/240,322.
Feb. 11, 2016—(US) Notice of Allowance—U.S. Appl. No. 14/226,402.
Feb. 12, 2016—(US) Notice of Allowance—U.S. Appl. No. 13/431,277.
Feb. 16, 2016—(US) Non-Final Office Action—U.S. Appl. No. 14/867,877.
Feb. 24, 2016—(US) Non-Final Office Action—U.S. Appl. No. 14/226,262.
Feb. 25, 2016—(US) Non-Final Office Action—U.S. Appl. No. 14/141,568.
Feb. 22, 2016—(US) Non-Final Office Action—U.S. Appl. No. 14/226,386.
Feb. 23, 2016—(US) Final Office Action—U.S. Appl. No. 14/226,424.
Mar. 4, 2016—(US) Notice of Allowance—U.S. Appl. No. 14/643,865.
Apr. 19, 2016—(US) Notice of Allowance—U.S. Appl. No. 14/226,417.
Apr. 21, 2016—(US) Notice of Allowance—U.S. Appl. No. 14/226,428.
Mar. 29, 2016—(US) Notice of Allowance—U.S. Appl. No. 14/641,681.
May 25, 2016—(US) Notice of Allowance—U.S. Appl. No. 14/755,141.
Jun. 24, 2016—(US) Notice of Allowance—U.S. Appl. No. 14/226,256.
Aug. 16, 2016—(US) Notice of Allowance—U.S. Appl. No. 13/240,322.
Oct. 19, 2016—(US) Notice of Allowance—U.S. Appl. No. 14/226,380.

* cited by examiner

510

| | LAMINATED | RECEPTOR | CHARACTER COLOR | REMARKS | SW1 | SW2 | SW3 | SW4 | SW5 |
|---|---|---|---|---|---|---|---|---|---|
| 0 | | | | ERROR | 0 | 0 | 0 | 0 | 0 |
| 1 | 6 | | BLACK | | 0 | 0 | 0 | 1 | 0 |
| 2 | 9 | | BLACK | | 1 | 0 | 0 | 1 | 0 |
| 3 | 12 | | BLACK | | 0 | 1 | 0 | 1 | 0 |
| 4 | SPARE | | | | 1 | 1 | 0 | 1 | 0 |
| 5 | 9 | | COLOR | | 1 | 0 | 0 | 0 | 0 |
| 6 | 12 | | COLOR | | 0 | 1 | 0 | 0 | 0 |
| 7 | SPARE | | | | 1 | 1 | 0 | 0 | 0 |
| 8 | | 6 | BLACK | | 0 | 0 | 1 | 1 | 0 |
| 9 | | 9 | BLACK | | 1 | 0 | 1 | 1 | 0 |
| 10 | | 12 | BLACK | | 0 | 1 | 1 | 1 | 0 |
| 11 | | 3.5 | COLOR | | 1 | 1 | 1 | 0 | 0 |
| 12 | | 6 | COLOR | | 0 | 0 | 1 | 0 | 0 |
| 13 | | 9 | COLOR | | 1 | 0 | 1 | 0 | 0 |
| 14 | | 12 | COLOR | | 0 | 1 | 1 | 0 | 0 |
| 15 | | | SPARE | | 1 | 1 | 1 | 1 | 0 |
| 16 | 18 | | BLACK | | 0 | 0 | 0 | 1 | 1 |
| 17 | 24 | | BLACK | | 1 | 0 | 0 | 1 | 1 |
| 18 | 36 | | BLACK | | 0 | 1 | 0 | 1 | 1 |
| 19 | SPARE | | | | 1 | 1 | 0 | 1 | 1 |
| 20 | 18 | | COLOR | | 0 | 0 | 0 | 0 | 1 |
| 21 | 24 | | COLOR | | 1 | 0 | 0 | 0 | 1 |
| 22 | 36 | | COLOR | | 0 | 1 | 0 | 0 | 1 |
| 23 | SPARE | | | | 1 | 1 | 0 | 0 | 1 |
| 24 | | 18 | COLOR | | 0 | 0 | 1 | 0 | 1 |
| 25 | | 24 | COLOR | | 1 | 0 | 1 | 0 | 1 |
| 26 | | 36 | COLOR | | 0 | 1 | 1 | 0 | 1 |
| 27 | | SPARE | | | 1 | 1 | 1 | 0 | 1 |
| 28 | | 18 | BLACK | | 0 | 0 | 1 | 1 | 1 |
| 29 | | 24 | BLACK | | 1 | 0 | 1 | 1 | 1 |
| 30 | | 36 | BLACK | | 0 | 1 | 1 | 1 | 1 |
| 31 | | | SPARE | | 1 | 1 | 1 | 1 | 1 |

TAPE CASSETTE

CROSS-REFERENCE TO RELATED APPLICATION

This application is a Divisional Application of U.S. Ser. No.: 12/644,525 filed on Dec. 22, 2009, which claims priority to Japanese Patent Application Nos. 2009-156405, 2009-156406, 2009-156407, and 2009-156409, respectively filed on Jun. 30, 2009. The disclosure of the foregoing applications is herein incorporated by reference in its entirety.

BACKGROUND

The present disclosure relates to a tape cassette that is detachably installed in a tape printer.

A tape cassette has been known that, when installed in a housing portion of a tape printer, selectively presses down a plurality of detecting switches provided on the cassette housing portion to cause the tape printer to detect the type of a tape stored inside a cassette case (a tape width, a print mode, etc.) More specifically, a cassette detection portion is provided on a section of the bottom surface of the tape cassette, where through-holes are formed in a pattern corresponding to the type of the tape. When the tape cassette is installed in the cassette housing portion, the plurality of detecting switches, which are constantly urged in an upward direction, are selectively pressed in accordance with the pattern of the through-holes formed in the cassette detection portion. The tape printer detects the type of tape in the tape cassette installed in the cassette housing portion based on a combination of the pressed and non-pressed switches among the plurality of detecting switches.

SUMMARY

The pattern of through-holes formed in the cassette detection portion is basically only designed to allow the tape printer to detect the type of the tape. Accordingly, different patterns are allocated randomly in accordance with the type of the tape. In other words, the through-holes do are not formed in a pattern in accordance with rules to allow them to be identified from the outward appearance. Therefore, it is difficult for a person to visually identify the type of the tape. For that reason, for example, in a tape cassette manufacturing process, it may be difficult for a worker to visually identify the type of the tape that should be mounted inside the cassette case from the external appearance of the tape cassette.

An object of the present invention is to provide a tape cassette that allows a type of a tape to be identified by visually checking an external appearance of the tape cassette.

Exemplary embodiments herein provide a tape cassette that includes a housing, a tape, a tape exit, and a type indicator portion. The housing has a top surface, a bottom surface, a front surface and a pair of side surfaces. The tape is a print medium mounted in the housing. The tape exit discharges, from the housing, the tape guided in the housing along a predetermined feed path. At least a part of the feed path extends parallel to the front surface. The type indicator portion is provided adjacent to the tape exit and in a specified area of the front surface on an upstream side of the tape exit in a feed direction of the tape. The type indicator portion indicates a tape type of the tape, and includes a plurality of vertical information sections and a protrusion formed in at least one of the plurality of vertical information sections. The protrusion protrudes forward from the front surface of the housing. The plurality of vertical information sections is a plurality of strip-shaped sections extending along a direction orthogonal to the feed direction.

BRIEF DESCRIPTION OF THE DRAWINGS

Exemplary embodiments of the present disclosure will be described below in detail with reference to the accompanying drawings in which.

DETAILED DESCRIPTION OF EXEMPLARY EMBODIMENTS

Figure 1:
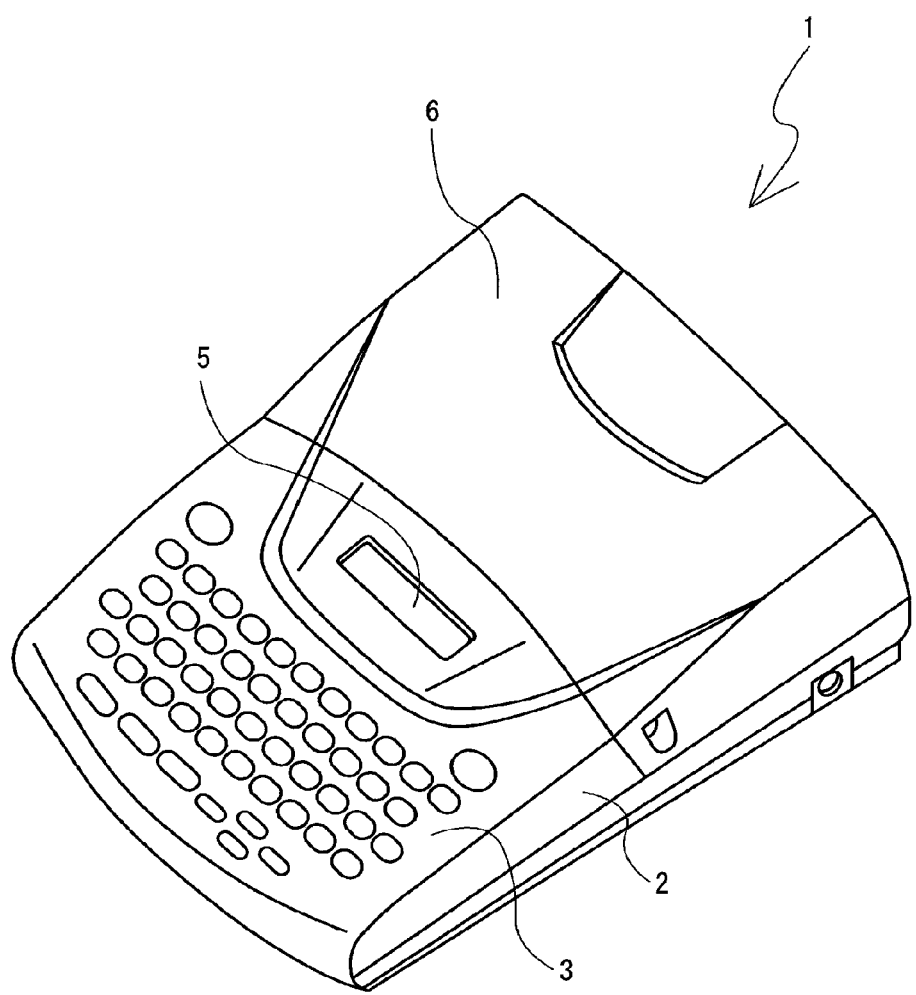
FIG. 1 is a perspective view of a tape printer 1 when a cassette cover 6 is closed.

Exemplary embodiments of the present invention will be explained below with reference to the figures. The configurations of the apparatus, the flowcharts of various processing and the like shown in the drawings are merely exemplary and do not intend to limit the present invention.

A tape printer 1 and a tape cassette 30 according to the present embodiment will be explained hereinafter with reference to FIG. 1 to FIG. 27. In the explanation of the present embodiment, the lower left side, the upper right side, the lower right side, and the upper left side in FIG. 1 are respectively defined as the front side, the rear side, the right side, and the left side of the tape printer 1. In addition, the lower right side, the upper left side, the upper right side, and the lower left side in FIG. 2 are respectively defined as the front side, the rear side, the right side, and the left side of the tape cassette 30.

Figure 2:
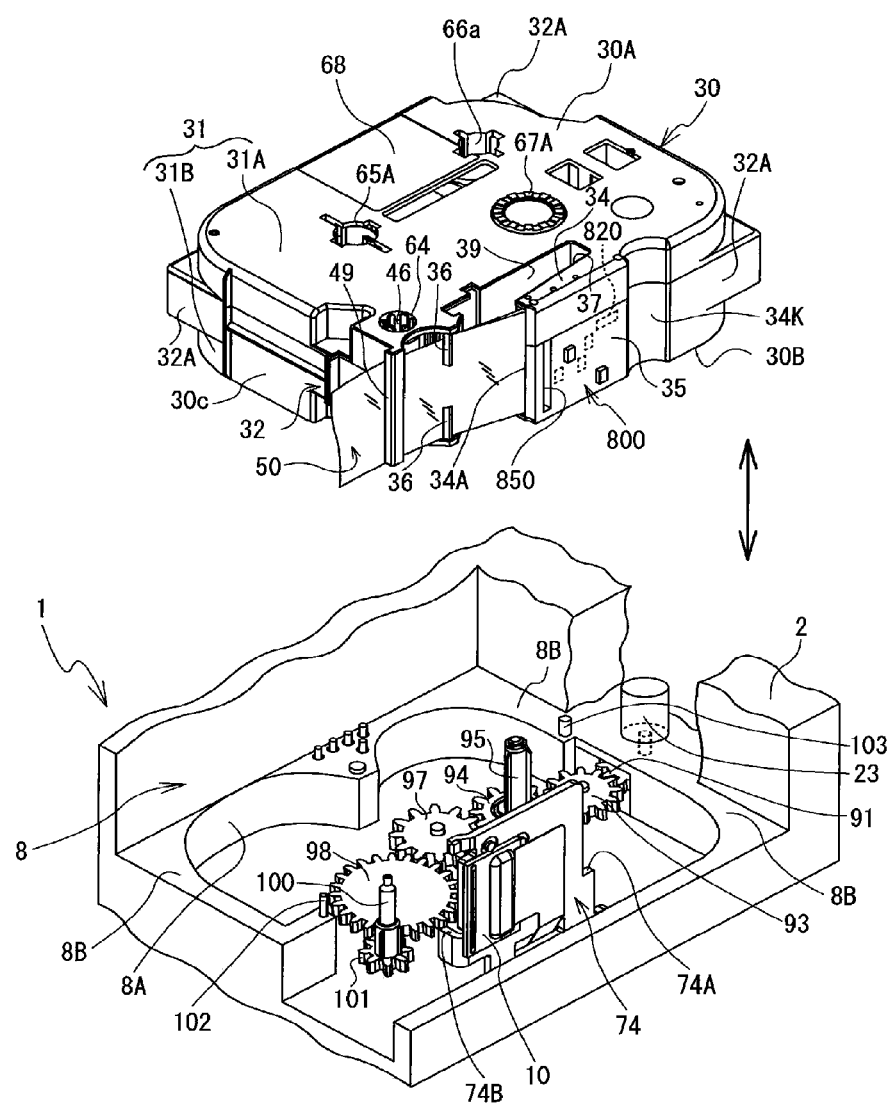
FIG. 2 is a perspective view illustrating a tape cassette 30 and a cassette housing portion 8.

Note that, in actuality, a group of gears, including gears 91, 93, 94, 97, 98 and 101 shown in FIG. 2, is covered and hidden by the bottom surface of a cavity 8A. However, for explanation purposes, the bottom surface of the cavity 8A is not shown in FIG. 2. Furthermore, in FIG. 2 to FIG. 6, side walls that form a periphery around a cassette housing portion 8 are shown schematically, but this is simply a schematic diagram, and the side walls shown in FIG. 2, for example, are depicted as thicker than they are in actuality. Moreover, in FIG. 3 to FIG. 6, for ease of understanding, the states in which various types of the tape cassette 30 are installed in the cassette housing portion 8 are shown with a top case 31A removed.

First, an outline configuration of the tape printer 1 according to the present embodiment will be explained. Hereinafter, the tape printer 1 configured as a general purpose device will be explained as an example. As the general purpose device, the tape printer 1 may commonly use a plurality of types of tape cassettes 30 with various types of tapes. The types of the tape cassettes 30 may include a thermal type tape cassette 30 that includes only a heat-sensitive paper tape, a receptor type tape cassette 30 that includes a print tape and an ink ribbon, and a laminated type tape cassette 30 that includes a double-sided adhesive tape, a film tape and an ink ribbon.

As shown in FIG. 1, the tape printer 1 is provided with a main unit cover 2 that has a rectangular shape in a plan view. A keyboard 3 is provided on the front side of the main unit cover 2. The keyboard 3 includes character keys for characters (letters, symbols, numerals, and so on), a variety of function keys, and so on. A display 5 is provided on the rear side of the keyboard 3. The display 5 displays input characters. A cassette cover 6 is provided on the rear side of the display 5. The cassette cover 6 may be opened and closed when the tape cassette 30 is replaced. Further, although not shown in the figures, a discharge slit is provided to the rear of the left side of the main unit cover 2, from which the printed tape is discharged to the outside. Also, a discharge window is formed on the left side of the cassette cover 6, such that, when the cassette cover 6 is in a closed state, the discharge slit is exposed to the outside.

Next, an internal configuration within the main unit cover 2 below the cassette cover 6 will be explained with reference to FIG. 2 to FIG. 8. As shown in FIG. 2, the cassette housing portion 8 is provided in the interior of the main unit cover 2 below the cassette cover 6. The cassette housing portion 8 is an area in which the tape cassette 30 can be installed or removed. The cassette housing portion 8 includes a cavity 8A and a cassette support portion 8B. The cavity 8A is formed as a depression that has a flat bottom surface, and the shape of the cavity 8A generally corresponds to the shape of a bottom surface 30B of a cassette case 31 (to be described later) when the tape cassette 30 is installed. The cassette support portion 8B is a flat portion extending horizontally from the outer edge of the cavity 8A.

As shown in FIG. 2, two positioning pins 102 and 103 are provided at two positions on the cassette support portion 8B. More specifically, the positioning pin 102 is provided on the left side of the cavity 8A and the positioning pin 103 is provided on the right side of the cavity 8A. The positioning pins 102 and 103 (refer to FIG. 11) are provided at the positions that respectively oppose pin holes 62 and 63, when the tape cassette 30 is installed in the cassette housing portion 8. The pin holes 62 and 63 are two indentations formed in the bottom surface of the common portion 32 of the tape cassette 30. When the tape cassette 30 is installed in the cassette housing portion 8, the positioning pins 102 and 103 are respectively inserted into the pin holes 62 and 63 to support the tape cassette 30 from underneath at the left and right positions of the peripheral portion of the tape cassette 30.

The cassette housing portion 8 is equipped with a feed mechanism, a print mechanism, and the like. The feed mechanism pulls out the tape from the tape cassette 30 and feeds the tape. The print mechanism prints characters on a surface of the tape. As shown in FIG. 2, a head holder 74 is fixed in the front part of the cassette housing portion 8, and a thermal head 10 that includes a heating element (not shown in the figures) is mounted on the head holder 74. Further, as shown in FIG. 3 to FIG. 6, an upstream support portion 74A and a downstream support portion 74B (hereinafter collectively referred to as head support portions 74A and 74B) are provided on both the right and left ends of the head holder 74. The head support portions 74A and 74B support the tape cassette 30 from underneath when the tape cassette 30 is installed in the tape printer 1. A cassette hook 75 is provided on the rear side of the head holder 74. The cassette hook 75 engages with the tape cassette 30 when the tape cassette 30 is installed in the cassette housing portion 8.

A tape feed motor 23 that is a stepping motor is provided outside of the cassette housing portion 8 (the upper right side in FIG. 2). A drive gear 91 is anchored to the lower end of a drive shaft of the tape feed motor 23. The drive gear 91 is meshed with a gear 93 through an opening, and the gear 93 is meshed with a gear 94. A ribbon take-up shaft 95 is standing upward on the upper surface of the gear 94. The ribbon take-up shaft 95 drives the rotation of a ribbon take-up spool 44, which will be described later. In addition, the gear 94 is meshed with a gear 97, the gear 97 is meshed with a gear 98, and the gear 98 is meshed with a gear 101.

A tape drive shaft 100 is standing upward on the upper surface of the gear 101. The tape drive shaft 100 drives the rotation of a tape drive roller 46, which will be described later.

If the tape feed motor 23 is driven to rotate in the counterclockwise direction in a state where the tape cassette 30 is installed in the cassette housing portion 8, the ribbon take-up shaft 95 is driven to rotate in the counterclockwise direction via the drive gear 91, the gear 93 and the gear 94. The ribbon take-up shaft 95 causes the ribbon take-up spool 44, which is fitted with the ribbon take-up shaft 95, to rotate. Furthermore, the rotation of the gear 94 is transmitted to the tape drive shaft 100 via the gear 97, the gear 98 and the gear 101, to thereby drive the tape drive shaft 100 to rotate in the clockwise direction. The tape drive shaft 100 causes the tape drive roller 46, which is fitted with the tape drive shaft 100 by insertion, to rotate.

As shown in FIG. 3 to FIG. 6, on the front side of the head holder 74, an arm shaped platen holder 12 is pivotably supported around a support shaft 12A. A platen roller 15 and a movable feed roller 14 are both rotatably supported on the leading end of the platen holder 12. The platen roller 15 faces the thermal head 10, and may be moved close to and apart from the thermal head 10. The movable feed roller 14 faces the tape drive roller 46 that may be fitted with the tape drive shaft 100, and may be moved close to and apart from the tape drive roller 46.

A release lever (not shown in the figures), which moves in the right-and-left direction in response to the opening and closing of the cassette cover 6, is coupled to the platen holder 12. When the cassette cover 6 is opened, the release lever moves in the right direction, and the platen holder 12 moves toward the stand-by position shown in FIG. 3. At the stand-by position shown in FIG. 3, the platen holder 12 has moved away from the cassette housing portion 8. Therefore, the tape cassette 30 can be installed into or detached from the cassette housing portion 8 when the platen holder 12 is at the stand-by position. The platen holder 12 is constantly elastically urged to remain in the stand-by position by a spiral spring that is not shown in the figures.

Figure 3:
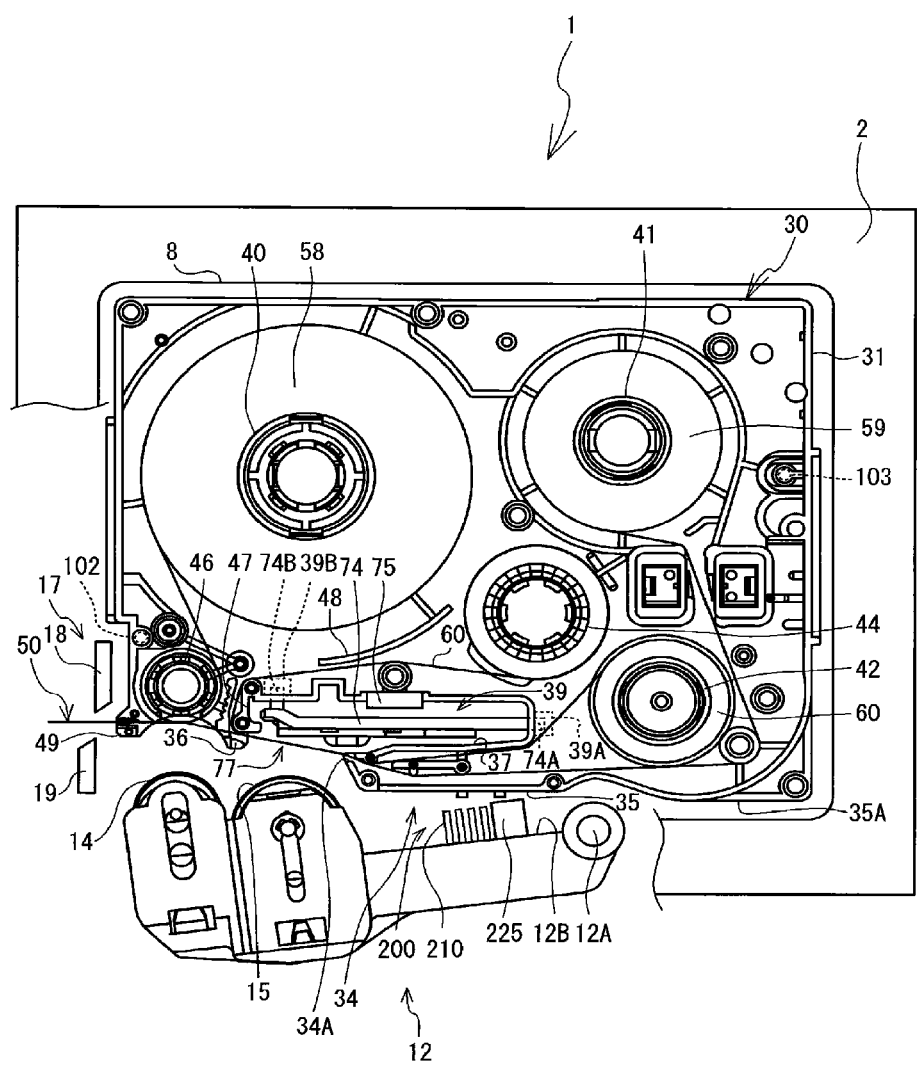
FIG. 3 is a plan view of the cassette housing portion 8 with a laminated type tape cassette 30 installed, when a platen holder 12 is at a standby position.
Figure 4:
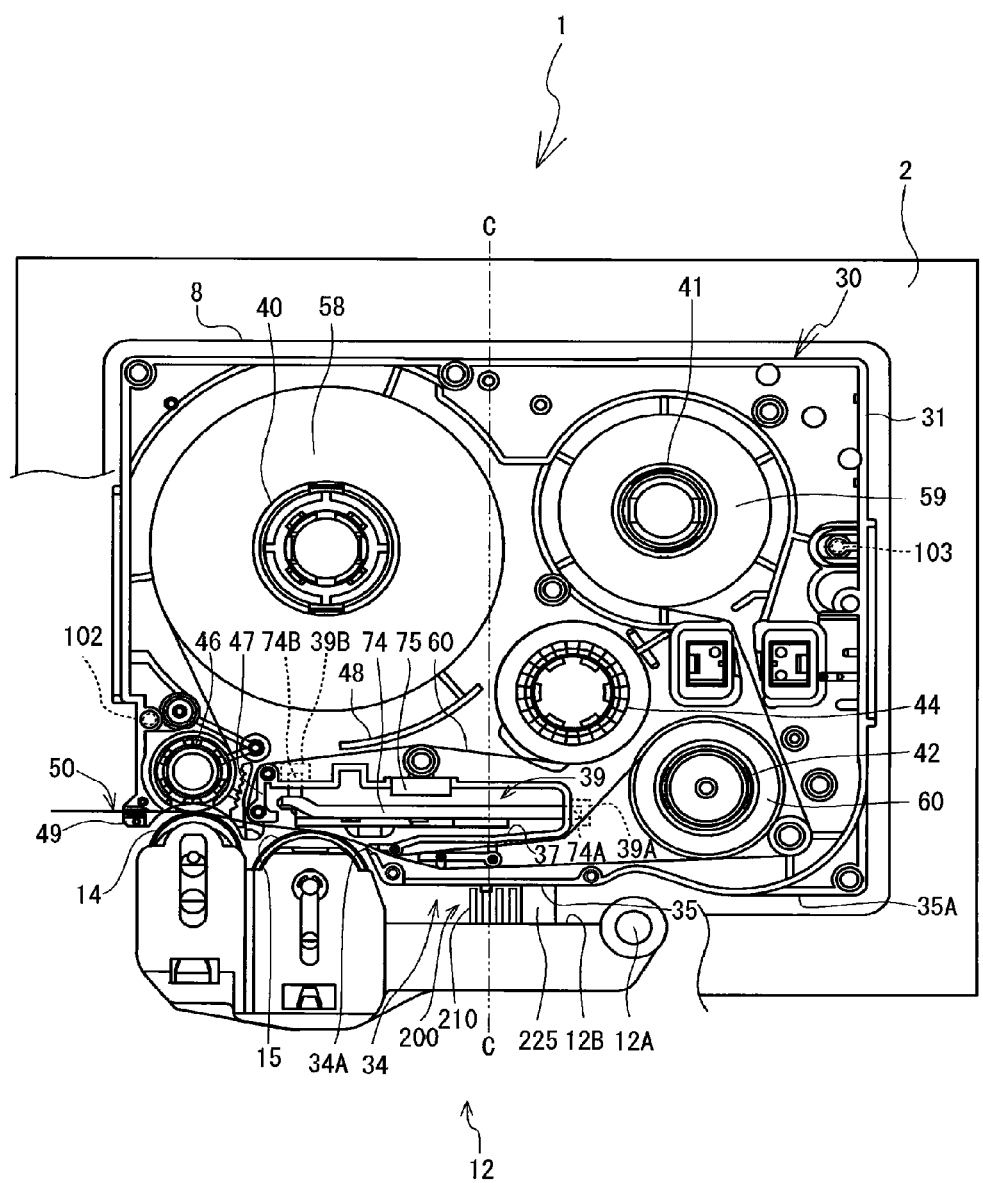
FIG. 4 is a plan view of the cassette housing portion 8 with the laminated type tape cassette 30 installed, when the platen holder 12 is at a print position.
Figure 5:
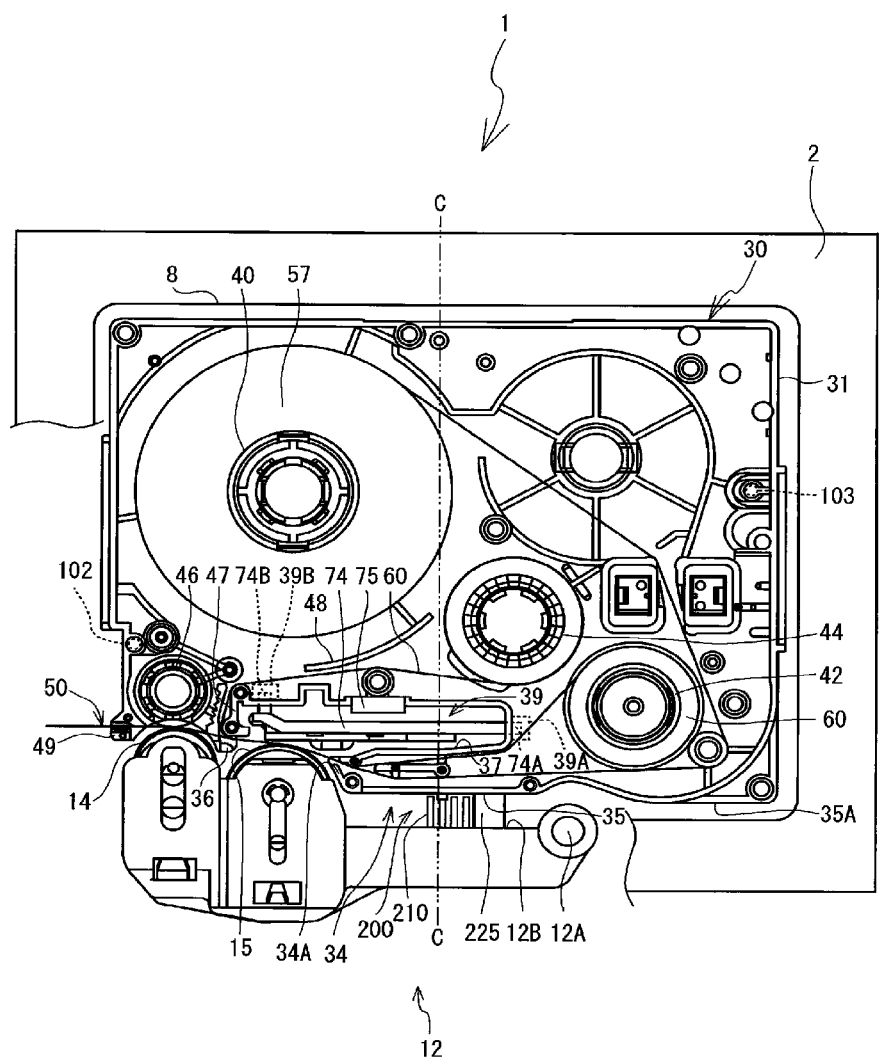
FIG. 5 is a plan view of the cassette housing portion 8 with a receptor type tape cassette 30 installed, when the platen holder 12 is at the print position.
Figure 6:
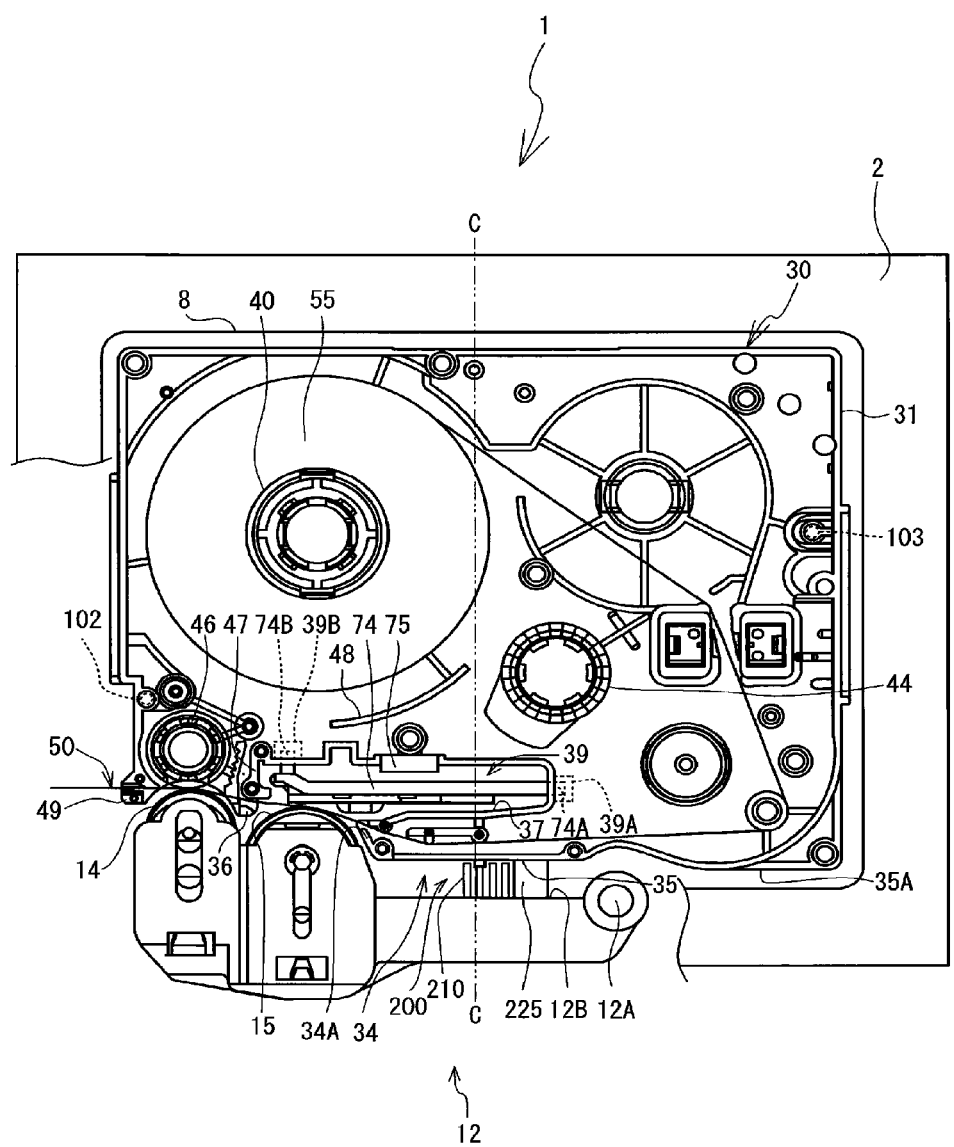
FIG. 6 is a plan view of the cassette housing portion 8 with a thermal type tape cassette 30 installed, when the platen holder 12 is at the print position.

On the other hand, when the cassette cover 6 is closed, the release lever moves in the left direction and the platen holder 12 moves toward the print position shown in FIG. 4 to FIG. 6. At the print position shown in FIG. 4 to FIG. 6, the platen holder 12 has moved close to the cassette housing portion 8. At the print position, as shown in FIG. 3 and FIG. 4, when the laminated type tape cassette 30 is installed in the cassette housing portion 8, the platen roller 15 presses the thermal head 10 via a film tape 59 and an ink ribbon 60. At the same time, the movable feed roller 14 presses the tape drive roller 46 via a double-sided adhesive tape 58 and the film tape 59.

In a similar way, as shown in FIG. 5, when the receptor type tape cassette 30 is installed in the cassette housing portion 8, the platen roller 15 presses the thermal head 10 via a print tape 57 and the ink ribbon 60, while the movable feed roller 14 presses the tape drive roller 46 via the print tape 57. Further, as shown in FIG. 6, when the thermal type tape cassette 30 is installed in the cassette housing portion 8, the platen roller 15 presses the thermal head 10 via a heat-sensitive paper tape 55, while the movable feed roller 14 presses the tape drive roller 46 via the heat-sensitive paper tape 55.

As described above, at the print position shown in FIG. 4 to FIG. 6, printing can be performed using the tape cassette 30 installed in the cassette housing portion 8. The heat-sensitive paper tape 55, the print tape 57, the double-sided adhesive tape 58, the film tape 59 and the ink ribbon 60 will be explained in more detail later.

As shown in FIG. 3, a feed path along which a printed tape 50 is fed extends from a tape discharge portion 49 of the tape cassette 30 to a discharge slit (not shown in the figures) of the tape printer 1. A cutting mechanism 17 that cuts the printed tape 50 at a predetermined position is provided on the feed path. Note that the cutting mechanism 17 is not shown in FIG. 4 to FIG. 6. The cutting mechanism 17 includes a fixed blade 18 and a movable blade 19 that opposes the fixed blade 18 and that is supported such that it can move in the back-and-forth direction (in the up-and-down direction in FIG. 3 to FIG. 6). The movable blade 19 is moved in the back-and-forth direction by a cutter motor 24 (refer to FIG. 9).

As shown in FIG. 3 to FIG. 6, a protruding piece 225 is provided on the rear side surface of the platen holder 12, namely, a surface on the side that opposes the thermal head 10 (hereinafter referred to as a cassette-facing surface 12B). The protruding piece 225 is a plate-like protrusion that extends in the right-and-left direction. The protruding piece 225 protrudes from the cassette-facing surface 12B in a generally horizontal manner toward the cassette housing portion 8. When the tape cassette 30 is installed in the cassette housing portion 8 at a proper position, the protruding piece 225 is positioned at a height facing an opposing portion 820 provided in an arm front surface 35, which will be described later, of the tape cassette 30.

Figure 7:
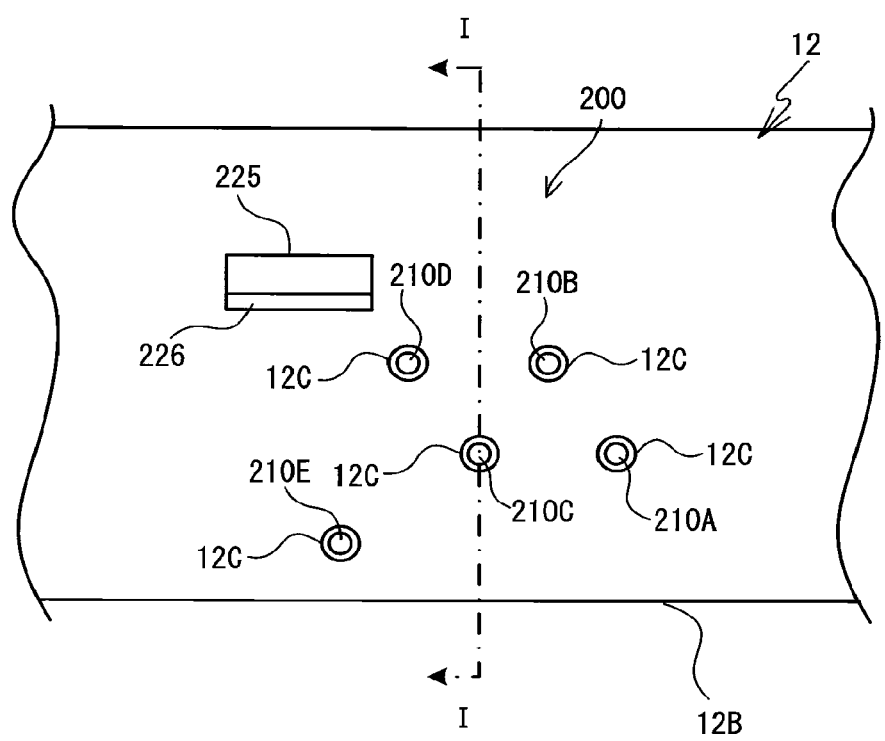
FIG. 7 is a partial enlarged view of a cassette-facing surface 12B on which is provided an arm detection portion 200.

The arrangement and structure of the protruding piece 225 on the platen holder 12 will be explained with reference to FIG. 7 and FIG. 8. As shown in FIG. 7, the protruding piece 225 is provided on the cassette-facing surface 12B of the platen holder 12 and is positioned above the arm detecting switches 210B and 210D in the upper row, and extends rightwards (the left side in FIG. 7) from a position in the right-and-left direction between the arm detecting switch 210D and the arm detecting switch 210E.

Figure 8:
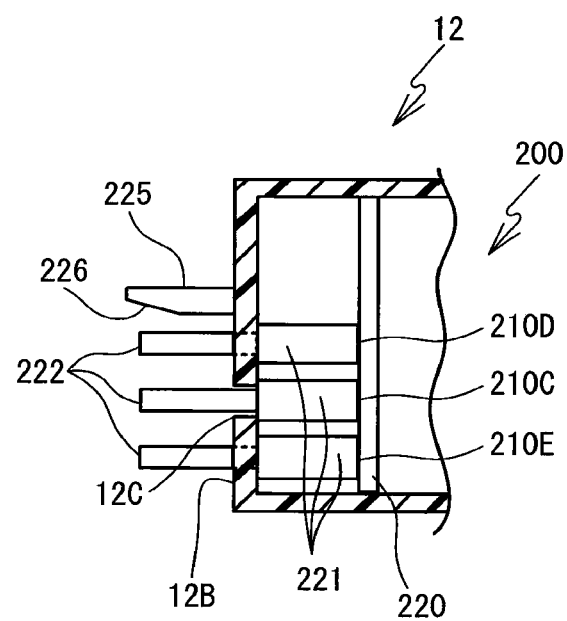
FIG. 8 is a cross-sectional view along a I-I line shown in FIG. 7 as seen in the direction of the arrows.

As shown in FIG. 8, the protruding piece 225 is integrally formed with the platen holder 12 such that the protruding piece 225 protrudes from the cassette-facing surface 12B of the platen holder 12 in the rearward direction (the left side in FIG. 8). A length of protrusion of the protruding piece 225 from the cassette-facing surface 12B is set to be a distance between the cassette-facing surface 12B and the arm front surface 35 when the tape cassette 30 is installed in the cassette housing portion 8 and the platen holder 12 is at the print position. Therefore, the protruding piece 225 opposes the arm front surface 35 of the tape cassette 30 installed in the cassette housing portion 8, and the leading end of the protruding piece 225 opposes the opposing portion 820. Furthermore, an inclined portion 226, which is a horizontally inclined part of a lower surface of the protruding piece 225, is formed on the protruding piece 225 such that the thickness of the protruding piece 225 becomes smaller toward the leading end (the left side in FIG. 8).

Figure 9:
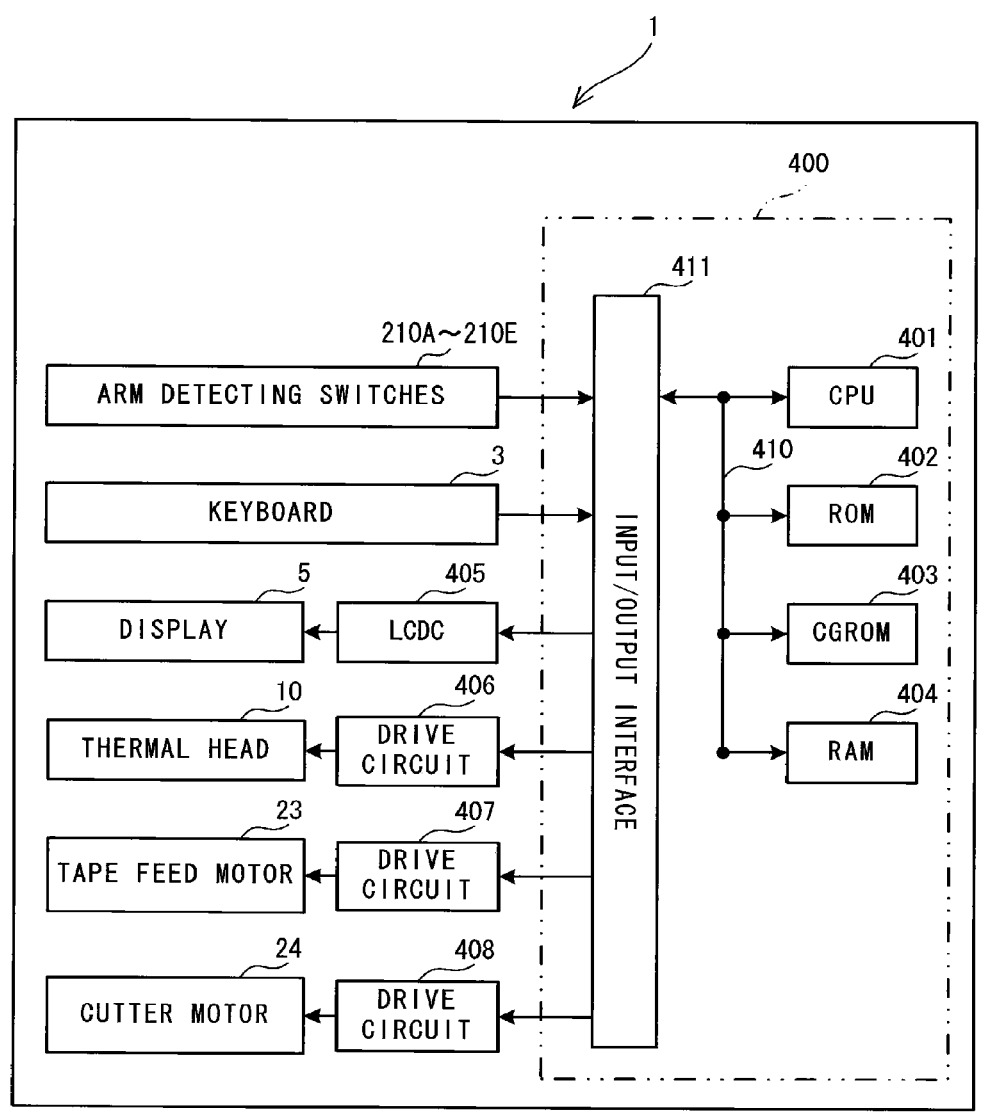
FIG. 9 is a block diagram showing an electrical configuration of the tape printer 1.

With the platen holder shown as an example in FIG. 9, the protruding piece 225 contacts with the arm front surface 35 (more specifically, the opposing portion 820) as shown in FIG. 4 to FIG. 6. The protruding piece 225, however, may not need to contact with the opposing portion 820. In other words, the length of protrusion of the protruding piece 225 from the cassette-facing surface 12B may be slightly shorter than the distance between the cassette-facing surface 12B and the arm front surface 35 when the tape cassette 30 is installed in the cassette housing portion 8 and the platen holder 12 is at the print position.

As shown in FIG. 3 to FIG. 6, an arm detection portion 200 is provided on the cassette-facing surface of the platen holder 12. The arm detection portion 200 is provided slightly to the right of a center position in the longitudinal direction of the cassette-facing surface 12B. The arm detection portion 200 includes a plurality of arm detecting switches 210. Switch terminals 222 of the arm detecting switches 210 (refer to FIG. 8) respectively protrude from the cassette-facing surface 12B toward the cassette housing portion 8 in a generally horizontal manner. In other words, the arm detecting switches 210 protrude in a direction that is generally perpendicular to a direction of insertion and removal (the up-and-down direction in FIG. 2) of the tape cassette 30 with respect to the cassette housing portion 8, such that the arm detecting switches 210 oppose the front surface (more specifically, the arm front surface 35) of the tape cassette 30 installed in the cassette housing portion 8.

When the tape cassette 30 is installed in the cassette housing portion 8 at a proper position, the arm detecting switches 210 are respectively positioned at a height facing an arm indicator portion 800, which will be described later.

The arrangement and structure of the arm detecting switches 210 in the platen holder 12 will be explained in more detail with reference to FIG. 7 and FIG. 8. As shown in FIG. 7, five through-holes 12C are formed in three rows in the vertical direction in the cassette-facing surface 12B of the platen holder 12. More specifically, the through-holes 12C are arranged such that two holes are arranged in an upper row, two holes are arranged in a middle row, and one hole is arranged in a lower row.

Positions of the through-holes 12C are different from each other in the right-and-left direction. Specifically, the five through-holes 12C are arranged in a zigzag pattern from the left side of the cassette-facing surface 12B (the right side in FIG. 7), in the following order: the left side of the middle row, the left side of the upper row, the right side of the middle row, the right side of the upper row, and then the lower row. The five arm detecting switches 210 are provided from the left side of the cassette-facing surface 12B in the order of 210A, 210B, 210C, 210D, and 210E, at positions corresponding to the five through-holes 12C.

As shown in FIG. 8, each of the arm detecting switches 210 includes a generally cylindrically shaped main unit 221 and a switch terminal 222. The main unit 221 is positioned inside the platen holder 12. The bar-shaped switch terminal 222 can extend and retract in the direction of an axis line from one end of the main unit 221. The other end of the main unit 221 of the arm detecting switch 210 is attached to a switch support plate 220 and positioned inside the platen holder 12.

In addition, on the one end of the main units 221, the switch terminals 222 can extend and retract through the through-holes 12C formed in the cassette-facing surface 12B of the platen holder 12. Each of the switch terminals 222 is constantly maintained in a state in which the switch terminal 222 extends from the main unit 221 due to a spring member provided inside the main unit 221 (not shown in the figures). When the switch terminal 222 is not pressed, the switch terminal 222 remains extended from the main unit 221 to be in an off state. On the other hand, when the switch terminal 222 is pressed, the switch terminal 222 is pushed back into the main unit 221 to be in an on state.

A length of protrusion of the switch terminal 225 from the cassette-facing surface 12B is generally equal to or slightly shorter than the length of protrusion of the protruding piece 225, namely, the distance between the cassette-facing surface 12B and the arm front surface 35 when the tape cassette 30 is installed in the cassette housing portion 8 and the platen holder 12 is at the print position.

If the platen holder 12 moves toward the stand-by position (refer to FIG. 3) in a state where the tape cassette 30 is installed in the cassette housing portion 8, the arm detecting switches 210 are separated from the tape cassette 30. Consequently, all the arm detecting switches 210 are therefore in the off state. On the other hand, if the platen holder 12 moves toward the print position (refer to FIG. 4 to FIG. 6), the arm detecting switches 210 oppose the front surface of the tape cassette 30, more specifically, the arm indicator portion 800 provided in the arm front surface 35.

When the arm detecting switches 210 oppose the arm front surface 35, there may be a small gap between the leading end of the extended switch terminals 222 and the arm front surface 35. In the arm indicator portion 800, a pressing portion(s) 802, which is a protrusion, is arranged in a predetermined pattern. Therefore, the arm detecting switches 210 are selectively pressed by the arm indicator portion 800. The tape type is detected based on a combination of the on and off states of the arm detecting switches 210, as will be described in more detail later.

Next, the electrical configuration of the tape printer 1 will be explained with reference to FIG. 9. As shown in FIG. 9, the tape printer 1 includes a control circuit 400 formed on a control board. The control circuit 400 includes a CPU 401 that controls each instrument, a ROM 402, a CGROM 403, a RAM 404, and an input/output interface 411, all of which are connected to the CPU 401 via a data bus 410.

ROM 402 stores various programs to control the tape printer 1, including a display drive control program, a print drive control program, a pulse number determination program, a cutting drive control program, and so on. The display drive control program controls a liquid crystal drive circuit (LCDC) 405 in association with code data of characters, such as letters, symbols, numerals and so on input from the keyboard 3. The print drive control program drives the thermal head 10 and the tape feed motor 23. The pulse number determination program determines the number of pulses to be applied corresponding to the amount of formation energy for each print dot. The cutting drive control program drives the cutting motor 24 to cut the printed tape 50 at the predetermined cutting position. The CPU 401 performs a variety of computations in accordance with each type of program.

The ROM 402 also stores various tables that are used to identify the tape type of the tape cassette 30 installed in the tape printer 1. The tables will be explained in more detail later.

The CGROM 403 stores print dot pattern data to be used to print various characters. The print dot pattern data is associated with corresponding code data for the characters. The print dot pattern data is categorized by font (Gothic, Mincho, and so on), and the stored data for each font includes six print character sizes (dot sizes of 16, 24, 32, 48, 64 and 96, for example).

The RAM 404 includes a plurality of storage areas, including a text memory, a print buffer and so on. The text memory stores text data input from the keyboard 3. The print buffer stores dot pattern data, including the printing dot patterns for characters and the number of pulses to be applied that is the amount of formation energy for each dot, and so on. The thermal head 10 performs dot printing in accordance with the dot pattern data stored in the print buffer. Other storage areas store data obtained in various computations and so on.

The input/output interface 411 is connected, respectively, to the arm detecting switches 210A to 210E, the keyboard 3, the liquid crystal drive circuit (LCDC) 405 that has a video RAM (not shown in the figures) to output display data to the display (LCD) 5, a drive circuit 406 that drives the thermal head 10, a drive circuit 407 that drives the tape feed motor 23, a drive circuit 408 that drives the cutter motor 24, and so on.

The configuration of the tape cassette 30 according to the present embodiment will be explained below with reference to FIG. 2 to FIG. 6 and FIG. 10 to FIG. 18. Hereinafter, the tape cassette 30 configured as a general purpose cassette will be explained as an example. As the general purpose cassette, the tape cassette 30 may be assembled as the thermal type, the receptor type and the laminated type that have been explained above, by changing, as appropriate, the type of the tape to be mounted in the tape cassette 30 and by changing the presence or absence of the ink ribbon, and so on.

Figure 16:
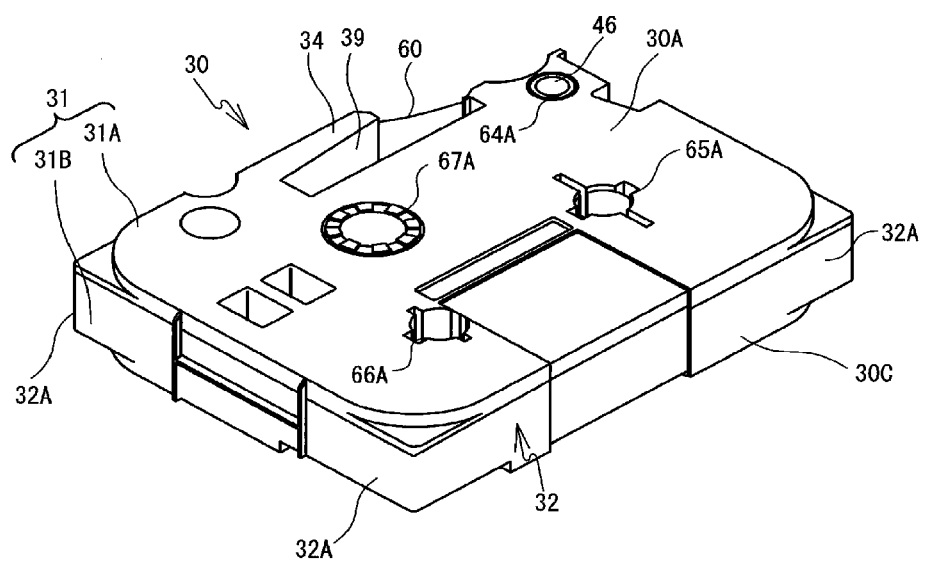
FIG. 16 is an external perspective view of a narrow-width tape cassette 30, as seen from the top surface 30A.
Figure 17:
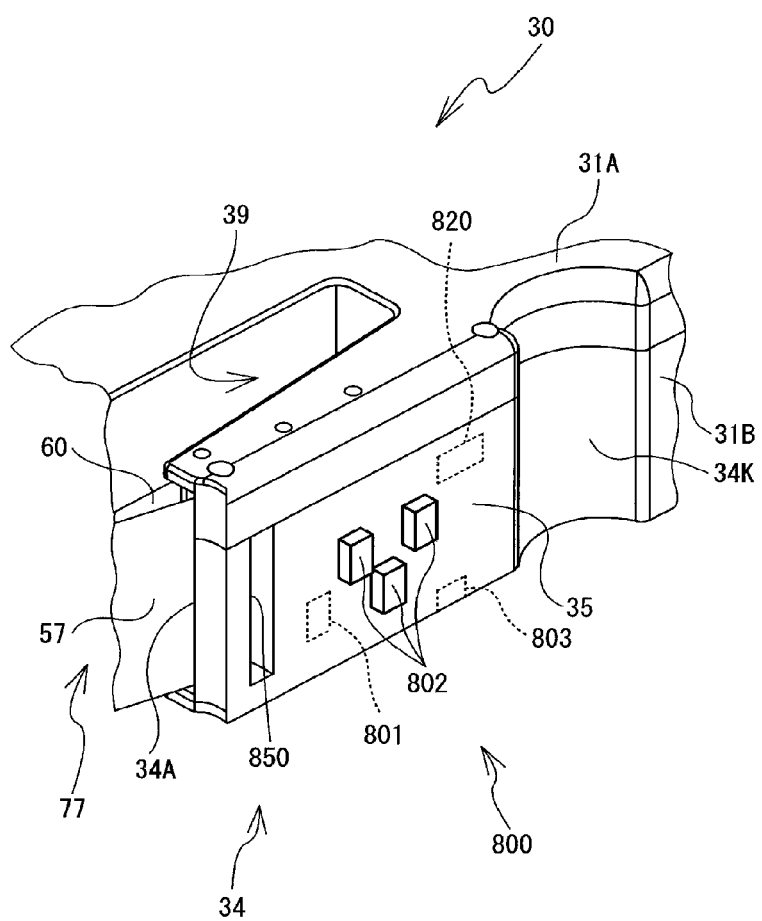
FIG. 17 is an enlarged external perspective view of the arm portion 34 of the narrow-width tape cassette 30.
Figure 18:
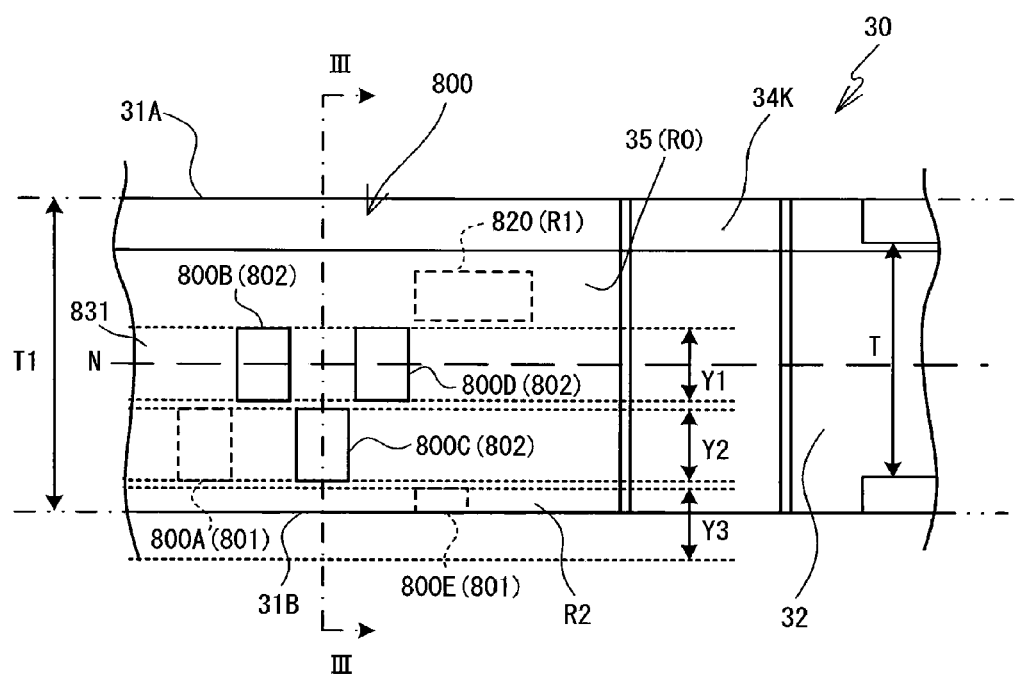
FIG. 18 is a partial enlarged front view of the narrow-width tape cassette 30.

FIG. 2 and FIG. 10 to FIG. 15 are figures relating to the tape cassette 30 in which a width of the tape (hereinafter referred to as a tape width) is equal to or greater than a predetermined width (18 mm, for example) (hereinafter referred to as a wide-width tape cassette 30). More specifically, the wide-width tape cassette 30 represented in FIG. 2 and FIG. 10 to FIG. 15 is assembled as the laminated type cassette (refer to FIG. 3 and FIG. 4) including the ink ribbon 60 with an ink color other than black (red, for example), and the width of the tape is 36 mm. On the other hand, FIG. 16 to FIG. 18 are figures relating to the tape cassette 30 in which the tape width is less than the predetermined width (hereinafter referred to as the narrow-width tape cassette 30). More specifically, the narrow-width tape cassette 30 represented in FIG. 16 to FIG. 18 is assembled as the receptor type cassette (refer to FIG. 5) including the ink ribbon 60 with a black ink color, and the width of the tape is 12 mm.

Hereinafter, the configuration of the tape cassette 30 will be explained, mainly using the wide-width tape cassette 30 (refer to FIG. 2, and FIG. 10 to FIG. 15) as an example. However, the configuration of the narrow-width tape cassette 30 (refer to FIG. 16 to FIG. 18) is basically the same as that of the wide-width tape cassette 30.

Figure 10:
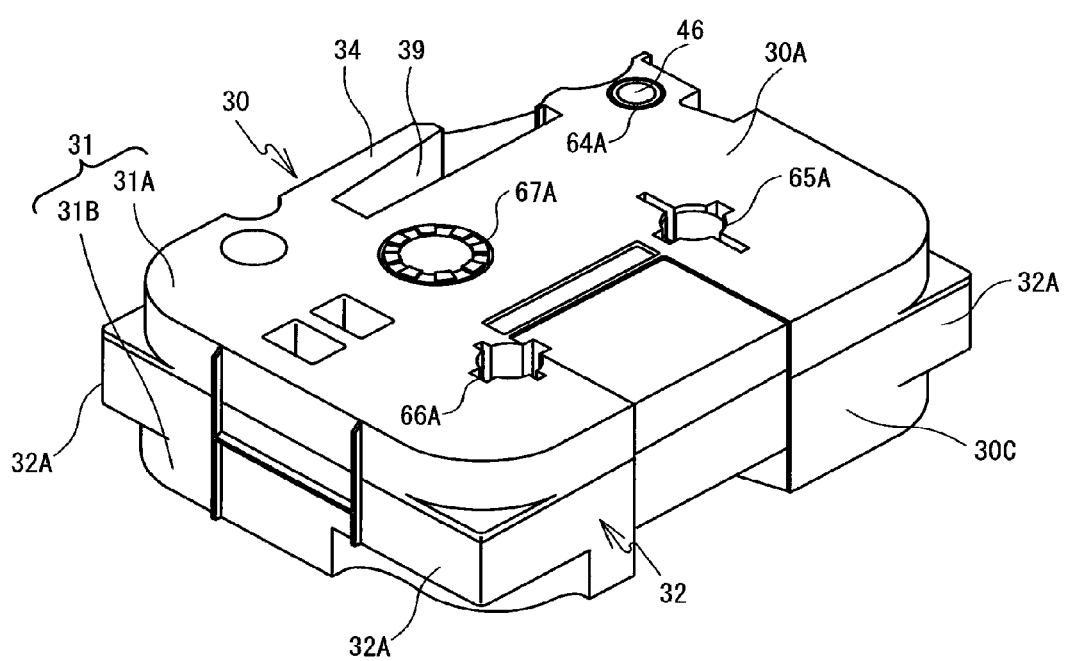
FIG. 10 is an external perspective view of a wide-width tape cassette 30 as seen from a top surface 30A.

As shown in FIG. 2 and FIG. 10, the tape cassette 30 includes a cassette case 31 that is a housing having a generally rectangular parallelepiped shape (box-like shape), with rounded corner portions in a plan view. The cassette case 31 includes a bottom case 31B that includes the bottom surface 30B of the cassette case 31 and the top case 31A that includes a top surface 30A of the cassette case 31. The top case 31A is fixed to an upper portion of the bottom case 31B.

When the top case 31A and the bottom case 31B are joined, a side surface 30C of a predetermined height is formed. The side surface 30C extends between the top surface 30A and the bottom surface 30B along the peripheries of the top surface 30A and the bottom surface 30B. In other words, the cassette case 31 is a box-shaped case that has the top surface 30A and the bottom surface 30B, which are a pair of rectangular flat surfaces opposing each other in a vertical direction, and the side surface 30C (in the present embodiment, formed by four surfaces of a front surface, a rear surface, a left side surface and a right side surface) that has a predetermined height and extends along the peripheries of the top surface 30A and the bottom surface 30B.

In the cassette case 31, the peripheries of the top surface 30A and the bottom surface 30B may not have to be completely surrounded by the side surface 30C. A part of the side surface 30C (the rear surface, for example) may include an aperture that exposes the interior of the cassette case 31 to the outside. Further, a boss that connects the top surface 30A and the bottom surface 30B may be provided in a position facing the aperture. In the explanation below, the distance from the bottom surface 30B to the top surface 30A (the length in the vertical direction) is referred to as the height of the tape cassette 30 or the height of the cassette case 31. In the present embodiment, the vertical direction of the cassette case 31 (namely, the direction in which the top surface 30A and the bottom surface 30B oppose each other) generally corresponds to the direction of insertion and removal of the tape cassette 30.

The cassette case 31 has the corner portions 32A that have the same width (the same length in the vertical direction), regardless of the type of the tape cassette 30. The corner portions 32A each protrude in an outward direction to form a right angle when seen in a plan view. However, the lower left corner portion 32A does not form a right angle in the plan view, as the tape discharge portion 49 is provided in the corner. When the tape cassette 30 is installed in the cassette housing portion 8, the lower surface of the corner portions 32A opposes the above-described cassette support portion 8B inside the cassette housing portion 8.

The cassette case 31 includes a portion that is called the common portion 32. The common portion 32 includes the corner portions 32A and encircles the cassette case 31 along the side surface 30C at the same position as the corner portions 32A in the vertical (height) direction of the cassette case 31 and also has the same width as the corner portions 32A. More specifically, the common portion 32 is a portion that has a symmetrical shape in the vertical direction with respect to a center line in the vertical (height) direction of the cassette case 31.

The height of the tape cassette 30 differs depending on the width of the tape (the heat-sensitive paper tape 55, the print tape 57, the double-sided adhesive tape 58, the film tape 59 and so on) mounted in the cassette case 31. The height of the common portion 32 (a width T), however, is set to be the same, regardless of the width of the tape of the tape cassette 30.

For example, when the width T of the common portion 32 is 12 mm, as the width of the tape of the tape cassette 30 is larger (18 mm, 24 mm, 36 mm, for example), the height of the cassette case 31 becomes accordingly larger, but the width T of the common portion 32 remains constant. If the width of the tape of the tape cassette 30 is equal to or less than the width T of the common portion 32 (6 mm, 12 mm, for example), the height of the cassette case 31 is the width T of the common portion 32 (12 mm) plus a predetermined width. The height of the cassette case 31 is at its smallest in this case.

Figure 11:
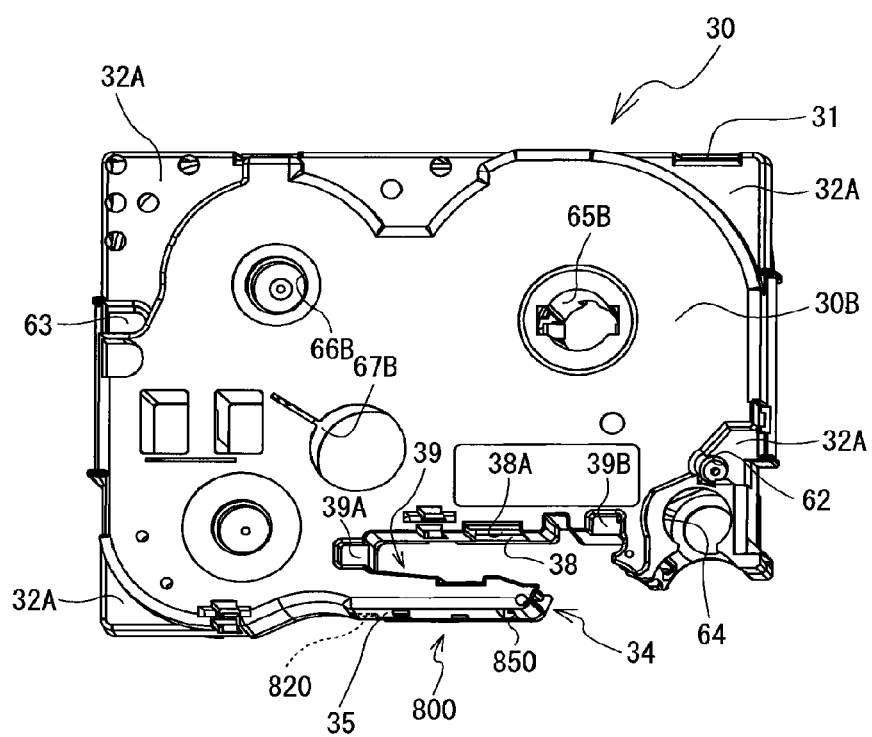
FIG. 11 is an external perspective view of the tape cassette 30 as seen from a bottom surface 30B.

As shown in FIG. 2, FIG. 10 and FIG. 11, the top case 31A and the bottom case 31B respectively have support holes 65A, 66A and 67A and support holes 65B, 66B and 67B (refer to FIG. 12) that rotatably support a first tape spool 40, a second tape spool 41 and the ribbon take-up spool 44, respectively, which will be explained later.

In the case of the laminated type tape cassette 30 shown in FIG. 3 and FIG. 4, three types of tape rolls are mounted in the cassette case 31, namely, the double-sided adhesive tape 58 wound on the first tape spool 40, the film tape 59 wound on the second tape spool 41 and the ink ribbon 60 wound on a ribbon spool 42. The first tape spool 40, on which the double-sided adhesive tape 58 is wound with its release paper facing outward, is rotatably supported by the support holes 65A and 65B. The second tape spool 41, on which the film tape 59 is wound, is rotatably supported by the support holes 66A and 66B. In addition, the ink ribbon 60 that is wound on the ribbon spool 42 is rotatably positioned in the cassette case 31.

Between the first tape spool 40 and the ribbon spool 42 in the cassette case 31, the ribbon take-up spool 44 is rotatably supported by the support holes 67A and 67B. The ribbon take-up spool 44 pulls out the ink ribbon 60 from the ribbon spool 42 and takes up the ink ribbon 60 that has been used to print characters. A clutch spring (not shown in the figures) is attached to a lower portion of the ribbon take-up spool 44 to prevent loosening of the taken up ink ribbon 60 due to reverse rotation of the ribbon take-up spool 44.

In the case of the receptor type tape cassette 30 shown in FIG. 5, two types of tape roll are mounted in the cassette case 31, namely, the print tape 57 wound on the first tape spool 40 and the ink ribbon 60 wound on the ribbon spool 42. The receptor type tape cassette 30 does not include the second tape spool 41.

In the case of the thermal type tape cassette 30 shown in FIG. 6, a single type of tape roll is mounted in the cassette case 31, namely, the heat-sensitive paper tape 55 wound on the first tape spool 40. The thermal type tape cassette 30 does not include the second tape spool 41 and the ribbon spool 42.

As shown in FIG. 2, a semi-circular groove 34K that has a semi-circular shape in a plan view is provided in the front surface of the cassette case 31, and extends over the height of the cassette case 31 (in other words, extends from the top surface 30A to the bottom surface 30B). The semi-circular groove 34K is a recess that serves to prevent an interference between the shaft support 12A and the cassette case 31 when the tape cassette 30 is installed in the cassette housing portion 8. The shaft support 12A is the center of rotation of the platen holder 12.

Of the front surface of the cassette case 31, a section that stretches leftwards from the semi-circular groove 34K (more specifically, an external wall 34B to be described later) is referred to as the arm front surface 35. Another section of the front surface of the cassette case 31 that stretches rightwards from the semi-circular groove 34K is referred to as a right front surface 35A. As shown in FIG. 3 to FIG. 6, the arm front surface 35 is positioned slightly in the backward direction of the right front surface 35A, and extends parallel to the right front surface 35A. A part that is defined by the arm front surface 35 and an arm rear surface 37 and that extends leftwards from the right front portion of the tape cassette 30 is referred to as an arm portion 34. The arm rear surface 37 is separately provided at the rear of the arm front surface 35 and extends over the height of the cassette case 31.

The structure that guides a tape as a print medium (the heat-sensitive paper tape 55, the print tape 57, the film tape 59, for example) and the ink ribbon 60 in the arm portion 34 will be explained with reference to FIG. 12. A part of the bottom case 31B that forms the arm portion 34 includes the external wall 34B, an internal wall 34C, and a separating wall 34D. The external wall 34B forms a part of the arm front surface 35 of the bottom case 31B. The internal wall 34C is higher than the external wall 34B and has approximately the same height as a width of the ink ribbon 60 (hereinafter referred to as a ribbon width). The internal wall 34C forms a part of the arm rear surface 37 of the bottom case 31B. The separating wall 34D stands between the external wall 34B and the internal wall 34C, and has the same height as the internal wall 34C.

A pair of guide regulating pieces 34E are formed on the lower edges of both sides of the separating wall 34D. A guide pin 34G is provided at the upstream side (the right side in FIG. 12) of the separating wall 34D in the arm portion 34 of the bottom case 31B. A guide regulating piece 34F is provided on the lower edge of the guide pin 34G. A matching pair of guide regulating pieces 34H are provided in a part of the top case 31A that forms the arm portion 34, respectively corresponding to the pair of guide regulating pieces 34E provided on the lower edges of both sides of the separating wall 34D. The leading end of the arm front surface 35 is bent rearwards, and an exit 34A that extends in the vertical direction is formed at the left end of the arm front surface 35 and the arm rear surface 37.

When the top case 31A and the bottom case 31B are joined to form the cassette case 31, a tape feed path and a ribbon feed path are formed inside the arm portion 34. The tape feed path guides the tape that is the print medium (in FIG. 12, the film tape 59) with the external wall 34B, the separating wall 34D, and the guide pin 34G. The ribbon feed path guides the ink ribbon 60 with the internal wall 34C and the separating wall 34D.

While the lower edge of the film tape 59 is regulated by the guide regulating piece 34F, the direction of the film tape 59 is changed by the guide pin 34G. The film tape 59 is fed further while regulated in the tape width direction by each of the guide regulating pieces 34E on the lower edges of the separating wall 34D working in concert with each of the guide regulating pieces 34H of the top case 31A. In such a way, the film tape 59 is guided and fed between the external wall 34B and the separating wall 34D inside the arm portion 34.

The ink ribbon 60 is guided by the separating wall 34D and the internal wall 34C that have approximately the same height as the ribbon width, and is thus guided and fed between the internal wall 34C and the separating wall 34D inside the arm portion 34. In the arm portion 34, the ink ribbon 60 is regulated by the bottom surface of the top case 31A and the top surface of the bottom case 31B in the ribbon width direction. Then, after the film tape 59 and the ink ribbon 60 are guided along each of the feed paths, the film tape 59 and the ink ribbon 60 are joined together at the exit 34A and discharged to a head insertion portion 39 (more specifically, an opening 77, which will be described later).

With the structure described above, the tape feed path and the ribbon feed path are formed as different feed paths separated by the separating wall 34D inside the arm portion 34. Therefore, the film tape 59 and the ink ribbon 60 may be reliably and independently guided within each of the feed paths that correspond to the respective tape width and ribbon width.

Figure 12:
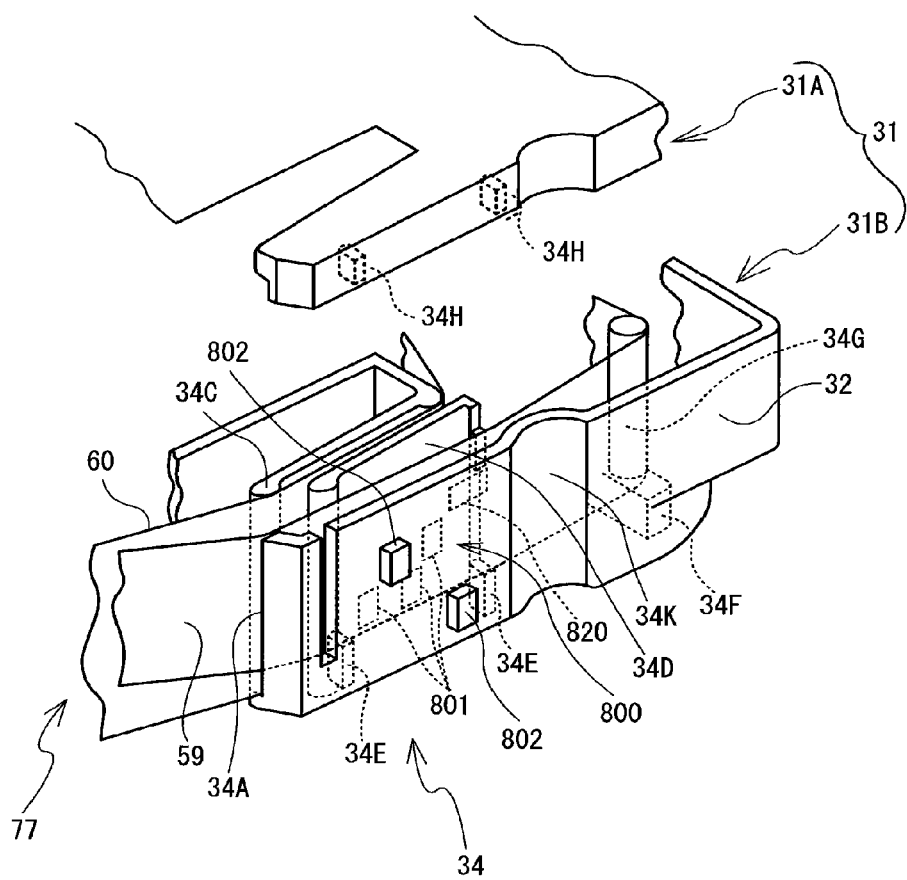
FIG. 12 is an enlarged and exploded perspective view of an arm portion 34 of the wide-width tape cassette 30.

Although FIG. 12 shows an example of the laminated type tape cassette 30 (refer to FIG. 3 and FIG. 4), the arm portion 34 of the other types of tape cassettes 30 is similar. Specifically, in the receptor type tape cassette 30 (refer to FIG. 5), the print tape 57 is guided and fed along the tape feed path, while the ink ribbon 60 is guided and fed along the ribbon feed path. In the thermal type tape cassette 30 (refer to FIG. 6), the heat-sensitive paper tape 55 is guided and fed along the tape feed path, while the ribbon feed path is not used.

Further, as shown in FIG. 12, an arm indicator portion 800 and the opposing portion 820 are provided on the arm front surface 35. The arm indicator portion 800 is a portion that makes it possible for a person to identify the tape type included in the tape cassette 30. In addition, the arm indicator portion 800 allows the tape printer 1 to detect the tape type, by selectively pressing the arm detecting switches 210 (refer to FIG. 3 to FIG. 5) provided on the platen holder 12 of the tape printer 1. The opposing portion 820 is a portion that opposes the protruding piece 225 provided on the platen holder 12. The arm front surface 35 that includes the arm indicator portion 800 and the opposing portion 820 will be described later in detail.

A through-hole 850 with an upright rectangular shape in a front view is provided in the arm front surface 35 of the bottom case 31B, to the left side of the arm indicator portion 800. The through-hole 850 is provided as a relief hole for a die to be used in a molding process of the cassette case 31, and does not have any particular function.

As shown in FIG. 3 to FIG. 6, a space that is surrounded by the arm rear surface 37 and a peripheral wall surface that extends continuously from the arm rear surface 37 is the head insertion portion 39. The head insertion portion 39 has a generally rectangular shape in a plan view and penetrates through the tape cassette 30 in the vertical direction. The head insertion portion 39 is situated to the front of the cassette case 31. The head insertion portion 39 is connected to the outside also at the front surface side of the tape cassette 30, through the opening 77 formed in the front surface of the tape cassette 30. The head holder 74 that supports the thermal head 10 of the tape printer 1 may be inserted into the head insertion portion 39. The tape that is discharged from the exit 34A of the arm portion 34 (one of the heat-sensitive paper tape 55, the print tape 57 and the film tape 59) is exposed to the outside of the cassette case 31 at the opening 77, where printing is performed by the thermal head 10.

Support reception portions are provided at positions facing the head insertion portion 39 of the cassette case 31. The support reception portions are used to determine the position of the tape cassette 30 in the vertical direction when the tape cassette 30 is installed in the tape printer 1. In the present embodiment, an upstream reception portion 39A is provided on the upstream side of the insertion position of the thermal head 10 (more specifically, the print position) in the feed direction of the tape that is the print medium (the heat-sensitive paper tape 55, the print tape 57, or the film tape 59), and a downstream reception portion 39B is provided on the downstream side. The support reception portions 39A and 39B are hereinafter collectively referred to as the head reception portions 39A and 39B.

When the tape cassette 30 is installed in the cassette housing portion 8, the head reception portions 39A and 39B respectively contact with the head support portions 74A and 74B (refer to FIG. 2) provided on the head holder 74 to be supported from underneath by the head support portions 74A and 74B. In addition, in the bottom case 31B, a latch portion 38 is provided at a position between the upstream reception portion 39A and the downstream reception portion 39B, facing the head insertion portion 39. The latch portion 38 is an indentation with a generally rectangular shape in a bottom view (refer to FIG. 11). When the tape cassette 30 is installed in the cassette housing portion 8, the latch portion 38 serves as a portion with which the cassette hook 75 is engaged.

When the user inserts the tape cassette 30 into the cassette housing portion 8 and pushes the tape cassette 30 downwards, the upstream reception portion 39A of the tape cassette 30 comes into contact with the upstream support portion 74A provided on the head holder 74, and the movement of the upstream reception portion 39A beyond that point in the downward direction is restricted. Further, the downstream reception portion 39B of the tape cassette 30 comes into contact with the downstream support portion 74B provided on the head holder 74, and the movement of the downstream reception portion 39B beyond that point in the downward direction is restricted. Then, the tape cassette 30 is held in a state in which the head reception portions 39A and 39B are supported from underneath by the head support portions 74A and 74B.

Accordingly, positioning of the tape cassette 30 in the vertical direction may be accurately performed at a position in the vicinity of the thermal head 10 that performs printing on the tape as the print medium (the heat-sensitive paper tape 55, the print tape 57, or the film tape 59). Then, the center position of printing by the thermal head 10 in the vertical direction may be accurately matched with the center position of the tape in the tape width direction. In particular, in the feed direction of the tape as the print medium, the tape cassette 30 is supported on both the upstream and downstream sides with respect to the insertion position of the thermal head 10, more specifically, with respect to the print position. As a consequence, the positioning in the vertical direction may be particularly accurately performed. Thus, the center position of printing by the thermal head 10 in the vertical direction and the center position in the tape width direction may be particularly accurately matched with each other.

In addition, the upstream reception portion 39A and the downstream reception portion 39B of the tape cassette 30 according to the present embodiment face the head insertion portion 39 from mutually orthogonally intersecting directions. Both the head reception portions 39A and 39B, which are indented portions, are supported by the head support portions 74A and 74B that extend in the mutually orthogonally intersecting directions. Consequently, the movement of the tape cassette 30 is restricted not only in the vertical direction, but also in the right-and-left direction and the back-and-forth direction. As a result, a proper positional relationship can be maintained between the thermal head 10 and the head insertion portion 39.

In addition, as shown in FIG. 3 to FIG. 6, when the tape cassette 30 is installed into the cassette housing portion 8, the cassette hook 75 engages with the latch portion 38. Consequently, after the tape cassette 30 is installed in the tape printer 1, any rising movement of the tape cassette 30, namely, a movement of the tape cassette 30 in the upward direction may be restricted, and tape feeding and printing may be stably performed.

Furthermore, as shown in FIG. 11, the pin holes 62 and 63 are provided at two positions on the lower surface of the corner portions 32A, corresponding to the above-described positioning pins 102 and 103 of the tape printer 1. More specifically, the pin hole 62, into which the positioning pin 102 is inserted, is an indentation provided in the lower surface of the corner portion 32A to the rear of a support hole 64 that is provided in the left front portion of the cassette case 31 (the lower right side in FIG. 11). Note that the tape drive roller 46 and some other components are not shown in FIG. 11. The pin hole 63, into which the positioning pin 103 is inserted, is an indentation provided in the lower surface of the corner portion 32A in the vicinity of a central portion of the right end of the cassette case 31 (the left side in FIG. 11).

A distance in the vertical (height) direction of the tape cassette 30 between the position of the pin holes 62 and 63 and a center position in the vertical direction of the film tape 59 that is the print medium housed in the cassette case 31 is constant, regardless of the tape type (the tape width, for example) of the tape cassette 30. In other words, the distance remains constant even when the height of the tape cassette 30 is different.

As shown in FIG. 2 to FIG. 6, a pair of regulating members 36 that match in the vertical direction are provided on the downstream side of the head insertion portion 39 in the tape feed direction. The base portions of the regulating members 36 regulate the printed film tape 59 in the vertical direction (in the tape width direction), and guide the printed film tape 59 toward the tape discharge portion 49 on the downstream side of the thermal head 10. At the same time, the regulating members 36 bond the film tape 59 and the double-sided adhesive tape 58 together appropriately without making any positional displacement.

A guide wall 47 is standing in the vicinity of the regulating members 36. The guide wall 47 separates the used ink ribbon 60 that has been fed via the head insertion portion 39 from the film tape 59, and guides the used ink ribbon 60 toward the ribbon take-up spool 44. A separating wall 48 is standing between the guide wall 47 and the ribbon take-up spool 44. The separating wall 48 prevents mutual contact between the used ink ribbon 60 that is guided along the guide wall 47 and the double-sided adhesive tape 58 that is wound on and supported by the first tape spool 40.

The support holes 64 (refer to FIG. 11) are provided on the downstream side of the regulating members 36 in the tape feed direction, and the tape drive roller 46 is rotatably supported inside the support holes 64. In a case where the laminated type tape cassette 30 shown in FIG. 3 and FIG. 4 is installed in the cassette housing portion 8, the tape drive roller 46, by moving in concert with the opposing movable feed roller 14, pulls out the film tape 59 from the second tape spool 41. At the same time, the tape drive roller 46 pulls out the double-sided adhesive tape 58 from the first tape spool 40, then guides the double-sided adhesive tape 58 to the print surface of the film tape 59 to bond them together, and then feeds them toward the tape discharge portion 49 as the printed tape 50.

In a case where the receptor type tape cassette 30 shown in FIG. 5 is installed in the cassette housing portion 8, the print tape 57 is pulled out from the first tape spool 40 by the tape drive roller 46 moving in concert with the movable feed roller 14. On the downstream side of the thermal head 10, the printed print tape 57, namely, the printed tape 50, is regulated in the vertical direction (in the tape width direction) by the base portions of the regulating members 36, and is guided toward the tape discharge portion 49. In addition, the used ink ribbon 60 that has been fed via the head insertion portion 39 is separated from the print tape 57 by the guide wall 47 and guided toward the ribbon take-up spool 44.

In a case where the thermal type tape cassette 30 shown in FIG. 6 is installed, the heat-sensitive paper tape 55 is pulled out from the first tape spool 40 by the tape drive roller 46 moving in concert with the movable feed roller 14. On the downstream side of the thermal head 10, the printed heat-sensitive paper tape 55, namely, the printed tape 50, is regulated in the vertical direction (in the tape width direction) by the base portions of the regulating members 36, and guided toward the tape discharge portion 49.

The tape discharge portion 49 is a plate-shaped member that extends between the top surface 30A and the bottom surface 30B and is slightly separated from a front end of the left side surface of the cassette case 31. The tape discharge portion 49 guides the printed tape 50, which has been fed via the regulating members 36 and the tape drive roller 46, into a passage formed between the tape discharge portion 49 and the front end of the left side surface of the bottom case 31B, and discharges the printed tape 50 from a tape discharge aperture at a downstream end of the passage.

The structure and the function of the arm front surface 35 that includes the arm indicator portion 800 and the opposing portion 820 will be described below in detail, with reference to FIG. 12 to FIG. 18.

As described above, the tape cassette 30 according to the present embodiment is structured such that when a person looks at the tape cassette 30 alone in a state in which the tape cassette 30 is not installed in the tape printer 1, the person can identify the type of the tape mounted in the tape cassette 30 by visually checking the arm indicator portion 800. In addition, the tape cassette 30 is structured such that when the tape cassette 30 is installed in the cassette housing portion 8 of the tape printer 1, the tape printer 1 can identify the type of the tape by detecting information indicated by the arm indicator portion 800 using the arm detection portion 200. First, areas included in the arm front surface 35 and the structure in these areas will be described.

Figure 13:
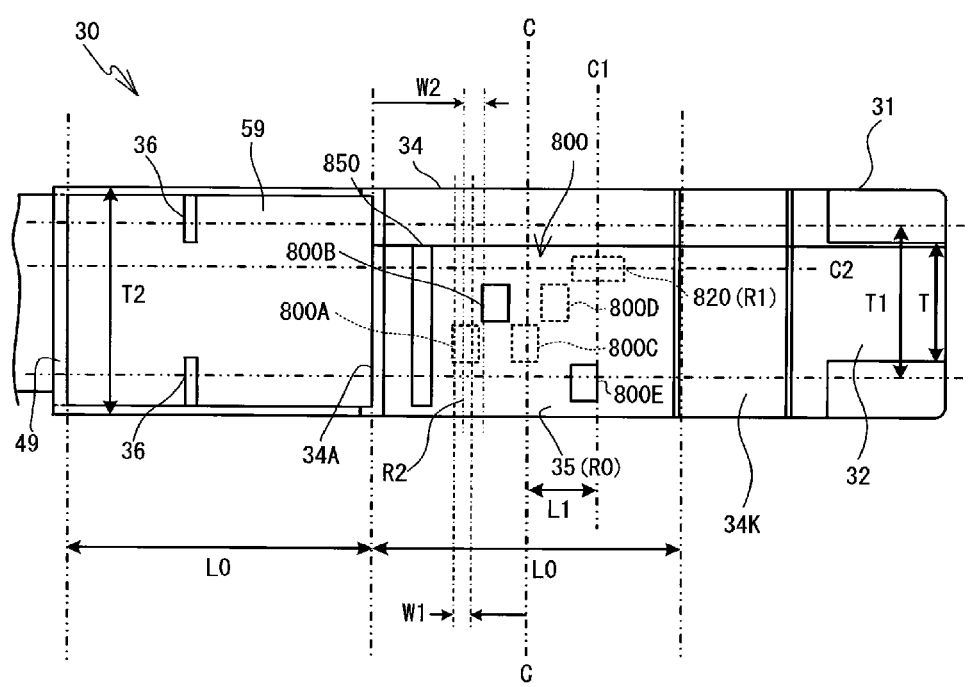
FIG. 13 is a front view of the wide-width tape cassette 30, and illustrates the positional relationship of various elements provided on an arm front surface 35.

As shown in FIG. 13, the arm front surface 35 includes a specified area R0. The specified area R0 is adjacent to the exit 34A and situated on an upstream side of the exit 34A in the tape feed direction. The exit 34A is a portion where the tape as the print medium (one of the heat-sensitive paper tape 55, the print tape 57, and the film tape 59) is discharged from the arm portion 34.

The length of the specified area R0 in the right-and-left direction is defined to be equal to or less than a distance L0 between the exit 34A of the arm portion 34 and the tape discharge portion 49. Between the exit 34A and the tape discharge portion 49, the tape discharged from the exit 34A is fed toward the tape discharge portion 49 with a surface of the tape being exposed to the front side. Accordingly, the distance L0 is equivalent to a tape exposure length that is the length of the exposed tape. In the present embodiment, the entire arm front surface 35 extending from the exit 34A to the left end of the semi-circular groove 34K is the specified area R0.

The specified area R0 includes a first area R1 that functions as the opposing portion 820, and a second area R2 that is an area other than the first area R1 and includes the arm indicator portion 800. Each of the areas will be described below in the order of the second area R2 and the first area R1.

Figure 14:
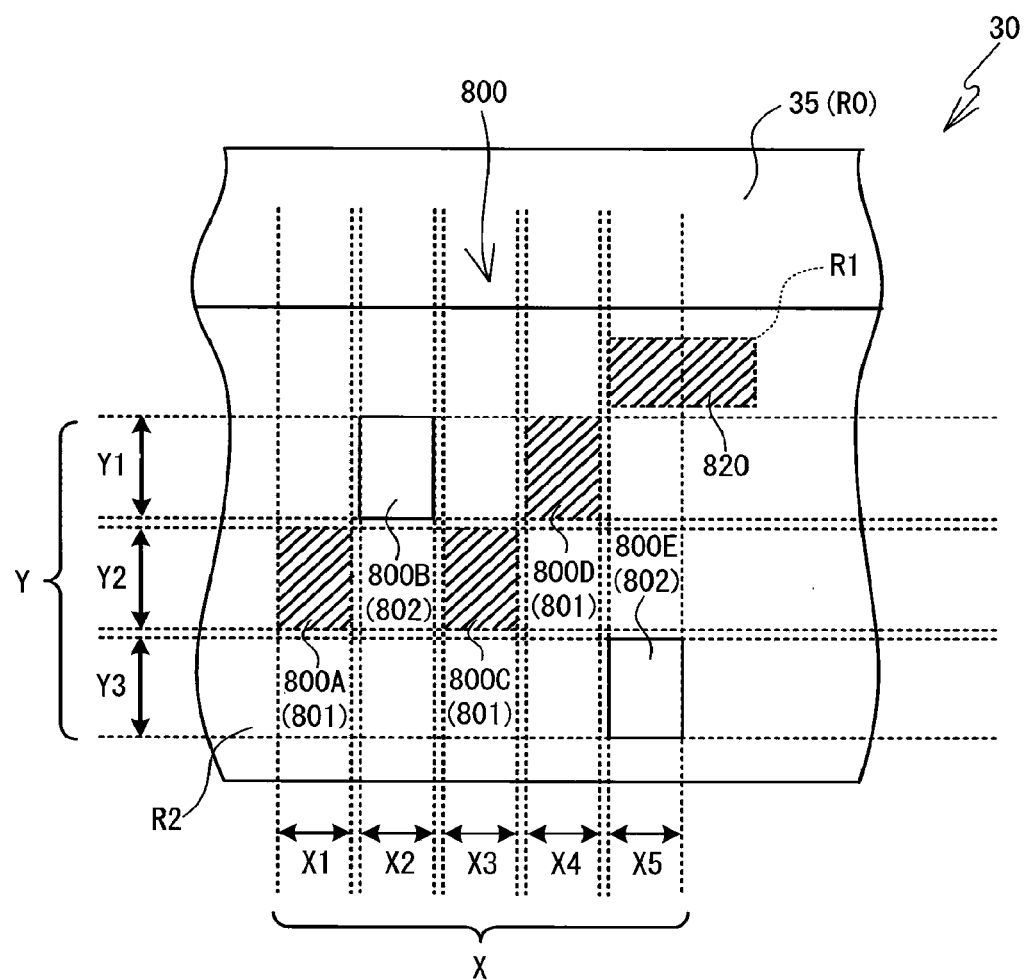
FIG. 14 is an explanatory view of a specified area R0 in the wide-width tape cassette 30.

As shown in FIG. 14, the second area R2 includes a plurality of vertical information sections X and a plurality of lateral information sections Y. The plurality of vertical information sections X is formed as a plurality of strip-shaped sections extending along a direction orthogonal to the tape feed direction (the up-and-down direction in FIG. 14). The plurality of lateral information sections Y is formed as a plurality of strip-shaped sections extending in parallel with the tape feed direction (the right-and-left direction in FIG. 14).

The vertical information sections X according to the present embodiment that are exemplified in FIG. 14 include five vertical information sections X1 to X5. The vertical information sections X1 to X5 are arranged at an interval from the exit 34A of the arm portion 34, and also arranged at equal intervals from the left side to the right side in a front view. Among the vertical information sections X1 to X5, the vertical information section X1 is positioned on the most downstream side (namely, the leftmost side) in the tape feed direction. The vertical information sections X2, X3, X4 and X5 are arranged in this order from the vertical information section X1 toward the upstream side (namely, the right side) in the tape feed direction. The widths (namely, the lengths in the right-and-left direction) of the vertical information sections X1 to X5 are approximately the same, and adjacent vertical information sections of the vertical information sections X1 to X5 are adjacent to each other at equal intervals.

The lateral information sections Y according to the present embodiment that are exemplified in FIG. 14 include three lateral information sections Y1 to Y3. The lateral information sections Y1 to Y3 are arranged in rows from the upper side toward the lower side in a front view. Among the lateral information sections Y1 to Y3, the lateral information section Y1 is positioned on the uppermost side. The center of the lateral information section Y1 in the vertical direction is positioned at an approximately center position of the height of the arm front surface 35. The lateral information sections Y2 and Y3 are arranged in this order from the lateral information section Y1 toward the lower side. The widths (namely, the lengths in the vertical direction) of the lateral information sections Y1 to Y3 are approximately the same, and adjacent lateral information sections of the lateral information sections Y1 to Y3 are adjacent to each other at approximately equal intervals.

Figure 15:
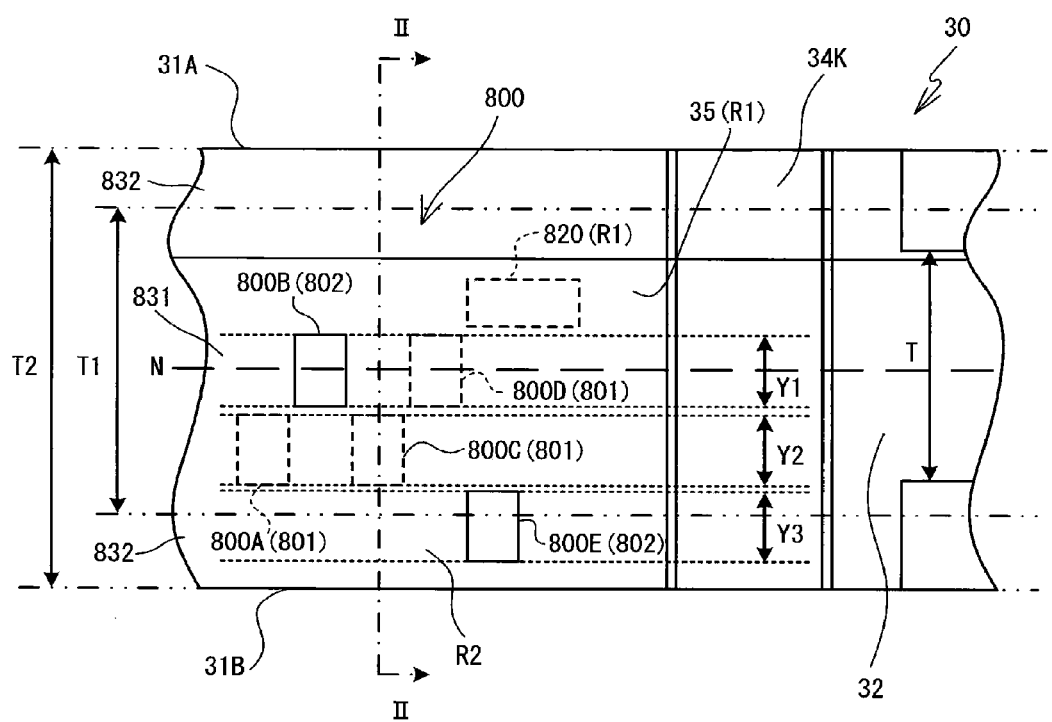
FIG. 15 is a partial enlarged front view of the wide-width tape cassette 30.

Further, as shown in FIG. 15 and FIG. 18, among the lateral information sections Y1 to Y3 according to the present embodiment, the lateral information sections Y1 and Y2 on the upper side are provided within a range of a predetermined height (hereinafter referred to as the predetermined height) T1 of the arm front surface 35. In the description below, an area within the range of the predetermined height T1 of the arm front surface 35 is referred to as a common indicator portion 831. Preferably, the common indicator portion 831 is an area that is symmetrical in the vertical direction with respect to a center line N of the cassette case 31 in the vertical direction. Meanwhile, areas that are outside the common indicator portion 831 and that are within a range of a predetermined height T2 (T2>T1) of the arm front surface 35 are referred to as extension portions 832.

The predetermined height T1 of the common indicator portion 831 is the height of the tape cassette 30 for which the height of the cassette case 31 is smallest among the plurality of tape cassettes 30 with different tape widths.

In the wide-width tape cassette 30 shown in FIG. 15, the lateral information section Y3, which is on the lowest side among the lateral information sections Y1 to Y3, is provided astride the common indicator portion 831 and the extension portion 832 positioned below the common indicator portion 831. In the narrow-width tape cassette 30 shown in FIG. 18, the extension portion 832 is not present because the height of the tape cassette 30 is equal to the predetermined height T1 of the common indicator portion 831. Therefore, in the narrow-width tape cassette 30, the lateral information section Y3 is arranged along the lower edge of the common indicator portion 831, namely, a lower edge of the arm front surface 35, and has a width that is approximately one third of the width of the lateral information sections Y1 and Y2.

The second area R2 is an area that opposes the arm detecting switches 210 of the tape printer 1 when the tape cassette 30 is installed in the cassette housing portion 8, and includes the arm indicator portion 800 that indicates the tape type. A protrusion is formed in at least one of the vertical information sections X1 to X5. Which of the vertical information sections X1 to X5 includes a protrusion is determined in advance, according to the tape type. The arm indicator portion 800 is a portion that includes the plurality of vertical information sections X1 to X5 and that indicates the tape type by a combination of whether a protrusion is formed in each of the vertical information sections X1 to X5. A person can identify the tape type by visually checking the protrusion(s) formed in the vertical information sections X1 to X5 of the arm indicator portion 800. In a case where the vertical information sections X1 to X5 are arranged at equal intervals, as in the present embodiment, even if there is a vertical information section in which a protrusion is not formed among the vertical information sections X1 to X5, a person can easily identify which of the vertical information sections X1 to X5 is the vertical information section without a protrusion. In other words, the person can visually identify in which of the vertical information sections X1 to X5 a protrusion is formed, without a mistake.

The vertical positions of the protrusion(s) formed in the vertical information sections X1 to X5 may be fixed for each of the vertical information sections X1 to X5. For example, among a plurality of areas where the vertical information sections X1 to X5 and the lateral information sections Y1 to Y3 intersect and overlap with each other (hereinafter referred to as overlapping areas), one overlapping area in each of the vertical information sections X1 to X5 may be fixed as an indicator. In such a case, the tape type may be identified based on a combination of whether the protrusion is formed in each of the indicators. If positions corresponding to the arm detecting switches 210 (refer to FIG. 7) of the tape printer 1 are determined as the indicators, the tape type can be identified not only by human visual check but also by the tape printer 1.

Given this, in the present embodiment, five overlapping areas that respectively oppose the five arm detecting switches 210A to 210E shown in FIG. 7 when the tape cassette 30 is installed in the cassette housing portion 8 are fixed as indicators 800A to 800E. More specifically, as shown in FIG. 14, the area in which the vertical information section X1 and the lateral information section Y2 intersect and overlap with each other functions as the indicator 800A that opposes the arm detecting switch 210A. The area in which the vertical information section X2 and the lateral information section Y1 intersect and overlap with each other functions as the indicator 800B that opposes the arm detecting switch 210B. The area in which the vertical information section X3 and the lateral information section Y2 intersect and overlap with each other functions as the indicator 800C that opposes the arm detecting switch 210C. The area in which the vertical information section X4 and the lateral information section Y1 intersect and overlap with each other functions as the indicator 800D that opposes the arm detecting switch 210D. The area in which the vertical information section X5 and the lateral information section Y3 intersect and overlap with each other functions as the indicator 800E that opposes the arm detecting switch 210E.

In this way, one indicator is arranged in each of the vertical information sections X1 to X5 in the present embodiment. Further, the indicators of adjacent vertical information sections are not lined up with each other in the right-and-left direction. In other words, the indicators 800A to 800E are arranged in a zigzag pattern. When this arrangement is adopted, even if all the indicators of adjacent vertical information sections are formed as the protrusions, the indicator of a vertical information section can more easily be distinguished from the indicator of an adjacent vertical information section. In addition, by touching the arm indicator portion 800, a person can identify a position at which each protrusion is formed. Consequently, the person can identify the tape type not only by visually checking, but also by tactually checking the arm indicator portion 800.

In the example shown in FIG. 14, the protrusions are formed in the indicators 800B and 800E. On the other hand, the indicators 800A, 800C, and 800D are surface portions that are in the same plane as the arm front surface 35, and no protrusion is formed therein. In such a manner, each of the indicators 800A to 800C is formed as either a protrusion or a surface portion. The protrusion and the surface portion can be identified by human visual check. In addition, when the protrusion and the surface portion oppose the arm detecting switches 210, the protrusion and the surface portion respectively function as a pressing portion 802 and a non-pressing portion 801. The pressing portion 802 presses the arm detecting switch 210 (refer to FIG. 12) and the non-pressing portion 801 does not press the arm detecting switch 210. Thus, the pressing portion 802 and the non-pressing portion 801 cause the tape printer 1 to identify the tape type. The relationship between the indicators 800A to 800E and the arm detecting switches 210 will be described later in detail.

The first area R1 is an area that opposes the protruding piece 225 (refer to FIG. 7) provided on the platen holder 12 when the tape cassette 30 is installed in the cassette housing portion 8 and the platen holder 12 moves to the print position as shown in FIG. 4 to FIG. 6. As shown in FIG. 15 and FIG. 18, the first area R1 is provided within the common indicator portion 831 of the arm front surface 35. The protruding piece 225 opposes an area that includes the first area R1. Therefore, the first area R1 is an area that corresponds to the shape of the protruding piece 225 in a rear view, and no protrusion is formed in the first area R1.

The first area R1 is arranged at an interval from the exit 34A of the arm portion 34, and a right end of the first area R1 is positioned on an upstream side (namely, the right side) of at least the vertical information section X1 in the tape feed direction. In the example shown in FIG. 14, a right end of the vertical information section X5, which is positioned on the most upstream side in the tape feed direction among the vertical information sections X1 to X5, is positioned approximately on the center line in the right-and-left direction of the first area R1. Therefore, a right end of the opposing portion 820 is positioned on the upstream side (namely, on the right side) of all the vertical information sections X1 to X5 in the tape feed direction. Further, the first area R1 is provided adjacent to and above the lateral information section Y1 that is positioned on the uppermost side among the lateral information sections Y1 to Y3. In other words, an upper end of the opposing portion 820 is positioned above all the lateral information sections Y1 to Y3.

In the example shown in FIG. 14, the length of the first area R1 in the right-and-left direction is approximately twice the width of each of the vertical information sections X1 to X5, and the length of the first area R1 in the vertical direction is about two thirds of the width of each of the lateral information sections Y1 to Y3.

The opposing portion 820 is a surface portion that opposes the protruding piece 225 when the tape cassette 30 is installed in the cassette housing portion 8 at the proper position and the platen holder 12 moves to the print position (refer to FIG. 4 to FIG. 6).

Next, the positional relationship between various elements in the arm front surface 35 will be described. As shown in FIG. 13, when the tape cassette 30 according to the present embodiment is viewed from the front, the length of the specified area R0 in the right-and-left direction is defined to be equal to or less than the distance (the tape exposure length) L0 between the exit 34A of the arm portion 34 and the tape discharge portion 49.

Further, a distance L1 from a center line C to a first reference line C1 is defined to be within a range of 18% to 24% of the tape exposure length L0 in the right hand direction, i.e., toward the upstream side in the tape feed direction. The center line C is a center line of the cassette case 31 in the right-and-left direction. The first reference line C1 is a virtual line that specifies the position in the right-and-left direction at which the opposing portion 820 is provided. A line on which the opposing portion 820 is always positioned may be employed as the first reference line C1. For example, the center line of the first area R1 in the right-and-left direction may be used as the first reference line C1. Further, a second reference line C2 is within the common indicator portion 831. The second reference line C2 is a virtual line that specifies the position in the vertical direction at which the opposing portion 820 is provided. For example, the center line of the first area R1 in the vertical direction may be used as the second reference line C2.

In a case where the center line C of the cassette case 31 is used as a reference, the position of the vertical information section X1 is defined such that at least a part of the vertical information section X1 is within a range of 14% to 20% of the tape exposure length L0 from the center line C toward the downstream side in the tape feed direction. Further, when the position of the exit 34A is used as a reference, the position of the vertical information section X1 is defined such that at least a part of the vertical information section X1 is within a range of 30% to 36% of the tape exposure length L0 from the exit 34A of the arm portion 34 toward the upstream side in the tape feed direction.

Furthermore, the positions of the vertical information sections X1 to X5 in the right-and-left direction are defined such that the interval between the center lines of adjacent vertical information sections in the right-and-left direction is within a range of 7% to 10% of the tape exposure length L0.

The positional relationship between the various elements in the arm front surface 35 is defined as described above, due to the following reasons.

First, it is preferable that the distance L1 between the center line C and the first reference line C1 is within a range of 18% to 24% of the distance (the tape exposure length) L0 between the exit 34A of the arm portion 34 and the tape discharge portion 49 in the right hand direction, i.e., toward the upstream side in the tape feed direction. For example, there may be a case in which a person desires to identify the print medium to be mounted in the cassette case 31, using the bottom case 31B alone. The distance L0 between the exit 34A of the arm portion 34 and the tape discharge portion 49 can easily be confirmed by a visual check even when the tape is not mounted.

Further, the position of the center line C of the tape cassette in the right-and-left direction can be identified by visually checking the bottom case 31B. In addition, if the length of the specified area R0 in the right-and-left direction is set to be equal to or less than the distance between the exit 34A of the arm portion 34 and the tape discharge portion 49, the range of the specified area R0 can easily be identified.

In a case where the opposing portion 820 is positioned to be closer toward the upstream side in the tape feed direction in the specified area R0 within the above range, if the distance L1 between the center line C and the first reference line C1 exceeds the rage of 18% to 24% of the tape exposure length L0 and the opposing portion 820 is positioned far from the center line C, there may be a possibility that the opposing portion 820 will be out of the range of the specified area R0. Conversely, if the opposing portion 820 is positioned too close to the center line C, the range of the specified area R0 in the right-and-left direction may become too short, and it may be impossible for the vertical information sections made up of, for example, five rows to be formed.

Second, it is preferable that at least a part of the vertical information section X1 is arranged to be within a range W1 that is 14% to 20% of the tape exposure length L0 from the center line C toward the downstream side in the tape feed direction. This is because, if the vertical information section X1 is positioned too close to the exit 34A of the arm portion 34, the exit 34A and the vertical information section X1 may be connected. Even if the exit 34A and the vertical information section X1 are not connected, if the distance therebetween is short, a defect such as a short shot may occur when the bottom case 31B is molded. In addition, if the position of the vertical information section X1 provided on the most downstream side (namely, the left side end) of the specified area R0 in the tape feed direction is identified, there is an effect that visual check of only a certain limited range may be sufficient when identifying the tape type.

Third, when the position of the exit 34A is used as the reference, it is preferable that at least a part of the vertical information section X1 is within a range W2 that is 30% to 36% of the tape exposure length L0 from the exit 34A of the arm portion 34 toward the upstream side in the tape feed direction. Similar to the above-described range W1, this defines the position of the vertical information section X1 within the specified area R0. The exit 34A of the arm portion 34 can be clearly identified by a visual check. Therefore, if the position of the vertical information section X1 is defined at a position that can be easily determined by the visual check, namely, if the distance from the exit 34A is defined to be 30% to 36% of the tape exposure length L0, there is an effect that the position of the vertical information section X1 can more easily be identified.

Fourth, it is preferable that the vertical information sections X1 to X5 are arranged in the right-and-left direction such that the interval between the center lines of adjacent vertical information sections in the right-and-left direction is within a range of 7% to 10% of the tape exposure length L0. This is because, if the interval between the center lines of adjacent vertical information sections in the right-and-left direction is shorter than this, it may be difficult to form a boundary therebetween, or if a protrusion is provided in a vertical information section, the size of the hole in the right-and-left direction may become too small to be visually recognized. Conversely, if the interval between the center lines of adjacent vertical information sections in the right-and-left direction is longer than this, it may be impossible for the vertical information section made up of, for example, five rows to be formed within the range of the specified area R0. Consequently, there may be cases where the tape type cannot be identified when the identification is desired.

If the positional relationship of the various elements in the arm front surface 35 is defined in the way described above, a person may easily identify the positions of the vertical information sections X1 to X5 and the indicators 800A to 800E by a visual check. The reason will be described below.

If a person knows in advance all the positions in the right-and-left direction where the vertical information sections X1 to X5 are arranged in the arm front surface 35, the person can identify the tape type by only visually checking whether a protrusion is formed in each of the vertical information sections X1 to X5. If the person does not know all the positions, the person may be able to identify the positions using the following method.

The position of the vertical information section X1 may be identified in the following manner. First, the vertical information sections X1 to X5 are arranged at an interval from the exit 34A of the arm portion 34. Therefore, if a person knows the distance between the exit 34A and the vertical information section X1 in advance, the person can visually identify the position of the vertical information section X1 in the right-and-left direction, using the exit 34A as a reference. Second, at least a part of the vertical information section X1 is within the range W1 that is 14% to 20% of the tape exposure length L0 from the center line C of the cassette case 31 in the right-and-left direction toward the downstream side in the tape feed direction. Third, at least a part of the vertical information section X1 is within the range W2 that is 30% to 36% of the tape exposure length L0 from the exit 34A of the arm portion 34 toward the upstream side in the tape feed direction. Thus, the person can identify the position of the vertical information section X1 in the right-and-left direction, using as a reference the exit 34A of the arm portion 34 or the center line C of the cassette case 31, each being a portion that can be easily identified by a visual check.

The vertical information sections X1 to X5 are arranged at equal intervals from the left side to the right side on the arm front surface 35. Accordingly, if a person knows the interval of adjacent vertical information sections among the vertical information sections X1 to X5, or the fact that the interval between the center lines of adjacent vertical information sections in the right-and-left direction is within the range of 7% to 10% of the tape exposure length L0, the person can identify the positions of the other vertical information sections X2 to X4 in the right-and-left direction, using the vertical information section X1 as a reference.

Further, as in the example of FIG. 14, among the plurality of overlapping areas formed by the vertical information sections X1 to X5 and the lateral information sections Y1 to Y3, if one overlapping area in each of the vertical information sections X1 to X5 functions as each of the indicators 800A to 800E, and if the tape type is identified based on whether a protrusion is formed in each of the indicators 800A to 800E, a person may need to identify the positions of the indicators 800A to 800E. If the person knows in advance all the vertical positions of the lateral information sections Y1 to Y3 on the arm front surface 35, the person can identify the vertical positions of the indicators 800A to 800E in the vertical information sections X1 to X5, respectively, using the lateral information sections Y1 to Y3 as a reference. In other words, a person can visually identify the fixed positions (the positions in the right-and-left direction and the positions in the vertical direction) of the indicators 800A to 800E that are provided in the overlapping areas formed by the vertical information sections X1 to X5 and the lateral information sections Y1 to Y3.

Even if a person does not know the vertical positions of the lateral information sections Y1 to Y3, the person can identify them in the following manner. It is defined that the lateral information sections Y1 and Y2 are in the common indicator portion 831 that has the predetermined height T1 and is centered on the center line N of the cassette case 31 in the vertical direction. The predetermined height T1 is a value that is slightly larger than the width T of the common portion 32. Further, in the wide-width tape cassette 30 (refer to FIG. 15), the lateral information section Y3 extends in the right-and-left direction, astride the common indicator portion 831 and the extension portion 832 below the common indicator portion 831. In the narrow-width tape cassette 30 (refer to FIG. 18), the lateral information section Y3 extends along the lower edge of the arm front surface 35 and the width thereof is smaller than that of the lateral information sections Y1 and Y2. Consequently, the person can easily identify the position of the lateral information section Y3.

Further, the lateral information sections Y1 to Y3 are arranged at approximately equal intervals in the vertical direction in the second area R2. Therefore, even if a person does not know all the positions of the lateral information sections Y1 to Y3 in the vertical direction, the person can identify the positions of the lateral information sections Y1 and Y2, using as a reference the center line N of the cassette case 31 in the vertical direction or the common portion 32, which can be identified easily by a visual check.

In this way, the tape cassette 30 according to the present embodiment is structured such that a person can identify the defined positions of the vertical information sections X1 to X5 and the indicators 800A to 800E of the arm indicator portion 800 by visually checking the arm front surface 35.

Next, identification of the tape type based on a combination of whether a protrusion is formed in each of the vertical information sections X1 to X5 of the arm indicator portion 800 or in each of the indicators 800A to 800E will be described. The tape type includes various elements (hereinafter referred to as tape type elements). In the present embodiment, an example will be described in which, among the various tape type elements, three elements, namely, the tape width, a print mode and a character color are identified.

The tape type element that each of the vertical information sections X1 to X5 indicates is determined in advance. In the present embodiment, the vertical information sections X1, X2 and X5 are determined as sections that indicate information for identifying the tape width. The vertical information section X3 is determined as a section that indicates information for identifying the print mode. The vertical information section X4 is determined as a section that indicates information for identifying the character color. In such a manner, the tape cassette 30 is structured such that a corresponding tape type element can be identified based on each of indicator portions alone, regardless of the structure of the other indicator portions.

Further, as shown in FIG. 14, in a case where a specific overlapping area in each of the vertical information sections X1 to X5 functions as each of the indicators 800A to 800E, the tape type element that each of the indicators 800A to 800E indicates is determined in accordance with which of the vertical information sections X1 to X5 includes each of the indicators 800A to 800E. Accordingly, the indicators 800A, 800B and 800E are indicators for identifying the tape width, the indicator 800C is an indicator for identifying the print mode, and the indicator 800D is an indicator for identifying the character color. Hereinafter, the indicators 800A, 800B and 800E are collectively referred to as a tape width indicator portion, the indicator 800C is referred to as a print mode indicator portion, and the indicator 800D is referred to as a character color indicator portion. A method for identifying the tape type based on the indicators 800A to 800E will be described below as an example.

The tape width, the print mode and the character color indicated by each of the above indicator portions of the tape type elements will be described with reference to Table 1 to Table 3. For explanatory purpose, in the Tables, a case where each of the indicators 800A to 800E is a surface portion and no protrusion is formed therein is denoted by a value zero (0), and a case where a protrusion is formed in each of the indicators 800A to 800E is denoted by a value one (1). Note that, in a case where the tape type is identified based on whether a protrusion is formed in each of the vertical information sections X1 to X5, the method for identifying the tape type described below may be used, with reference to similar tables in which the indicators 800A to 800E shown in Table 1 to Table 3 are respectively replaced with the vertical information sections X1 to X5.

TABLE 1

| Tape Width | 800A (X1) | 800B (X2) | 800E (X5) |
| --- | --- | --- | --- |
| 3.5 mm | 1 | 1 | 0 |
| 6 mm | 0 | 0 | 0 |
| 9 mm | 1 | 0 | 0 |
| 12 mm | 0 | 1 | 0 |
| 18 mm | 0 | 0 | 1 |
| 24 mm | 1 | 0 | 1 |
| 36 mm | 0 | 1 | 1 |

TABLE 2

| Print Mode | 800C (X3) |
| --- | --- |
| Receptor (normal image printing mode) | 1 |
| Laminated (mirror image printing mode) | 0 |

TABLE 3

| Character Color | 800D (X4) |
| --- | --- |
| Black | 1 |
| Others | 0 |

As shown in Table 1, corresponding to combinations of whether each of the indicators 800A, 800B and 800E, which constitute the tape width indicator potion, is formed as a protrusion or as a surface portion without a protrusion, seven types of tape width from 3.5 mm to 36 mm indicated by the combinations are defined. Therefore, a person can identify the tape width of the tape cassette 30 by visually checking only the indicators 800A, 800B and 800E respectively included in the vertical information sections X1, X2 and X5, within the arm indicator portion 800. Note that the total number of the combinations of the protrusion or the surface portion of the three indicators 800A, 800B and 800E is eight. However, in the present embodiment, because at least one surface portion is included in the tape width indicators, a tape width corresponding to a case where all of the indicators 800A, 800B and 800E are protrusions (the combination of "1, 1, 1") is not defined.

As shown in Table 1, it is defined that, of the tape width indicator portion, when the tape width is equal to or more than a predetermined width (18 mm), the indicator 800E is a protrusion, and when the tape width is less than the predetermined width, the indicator 800E is a surface portion without a protrusion. Accordingly, as described above, a person can identify whether the tape width is equal to or more than the predetermined width (18 mm) by only visually identifying the position of the indicator 800E in the arm front surface 35 and checking whether a protrusion is provided at the position.

In addition, based on a combination of whether a protrusion is provided in each of the indicators 800A and 800B, a size relationship of the tape width can be identified in a first range where the tape width is equal to or more than the predetermined width (18 mm) or in a second range where the tape width is less than the predetermined width. More specifically, if the indicator 800A is a surface portion and the indicator 800B is a protrusion (the combination of "0, 1" in Table 1), it indicates the maximum tape width in the first range or in the second range (that is, 36 mm or 12 mm in Table 1). If the indicator 800A is a protrusion and the indicator 800B is a surface portion (the combination of "1, 0" in Table 1), it indicates the second largest tape width in the first range or in the second range (that is, 24 mm or 9 mm in Table 1).

If both the indicators 800A and 800B are surface portions (the combination of "0, 0" in Table 1), it indicates the third largest tape width in the first range or in the second range (that is, 6 mm or 18 mm in Table 1). If both the indicators 800A and 800B are not surface portions but protrusions (the combination of "1, 1" in Table 1), it indicates the minimum tape width (that is, 3.5 mm in Table 1) among all the tape widths.

First, a person can visually identify the positions of the indicators 800A, 800B and 800E on the arm front surface 35 as described above. Then, the person can check whether a protrusion is formed in the indicator 800E, and determine whether the tape width is equal to or more than the predetermined width or the tape width is less than the predetermined width. Subsequently, by checking whether a protrusion is formed in each of the indicators 800A and 800B, the person can easily identify the tape width in more detail.

For example, in the wide-width tape cassette 30 shown in FIG. 15, the indicator 800E is a protrusion, the indicator 800A is a surface portion, and the indicator 800B is a protrusion. As a result, using the above-described method, a person can identify that the tape width is 36 mm that is the maximum width in the first range where the tape width is equal to or more than the predetermined width (18 mm). In the narrow-width tape cassette 30 shown in FIG. 18, the indicator 800E is a surface portion, the indicator 800A is a surface portion, and the indicator 800B is a protrusion. As a result, using the above-described method, a person can identify that the tape width is 12 mm that is the maximum width in the second range where the tape width is less than the predetermined width (18 mm).

If a person knows in advance the specific value of the predetermined width, the person may be able to determine whether the tape width of the tape cassette 30 is less than the predetermined width, simply by visually checking the entire tape cassette 30. Therefore, the indicator 800E that indicates whether the tape width is equal to or more than the predetermined width may not need to be included in the tape width indicators. That is, the vertical information section X5 may not need to be defined in the arm indicator portion 800. In such a case, as the vertical information sections X1 and X2 are closest to the exit 34A of the arm portion 34, a person can visually check the vertical information sections X1 and X2 together with the width of the exposed tape that has been discharged from the exit 34A at a close interval with each other. Therefore, the person can easily and unfailingly compare the width of the tape housed in the cassette case 31 and the tape width indicated by the vertical information sections X1 and X2, that is, the tape width indicator portion. In a case where the tape width indicator portion further includes the vertical information section X5, as in the present embodiment, by using the vertical information section X5 to indicate whether or not the tape width is less than the predetermined width, the person can easily and unfailingly check whether or not the tape width is less than the predetermined width. More specifically, in the present embodiment, whether the vertical information section X5 includes a protrusion or a surface portion changes at the predetermined width. Further, the vertical information section X5 can be distinguished more easily by the visual check, because the vertical information section X5 is separated from the vertical information sections X1 and X2. Thus, the person can easily recognize whether or not the tape width is less than the predetermined width.

In other words, it may be sufficient that at least the vertical information sections X1 and X2 are defined in the arm indicator portion 800 and at least the two indicators 800A and 800B are present as the tape width indicator portions. In a case where the indicators 800A and 800B that are closest to the exit 34A of the arm portion 34 from which the tape is discharged are used as the tape width indicator portions, a person can visually check the indicators 800A and 800B together with the exposed tape that has been discharged, and thereby can identify the tape width more easily.

As shown in Table 2, corresponding to whether or not the indicator 800C, which is the print mode indicator portion, is formed as a protrusion, the print mode is defined as a mirror image printing mode (laminated) or a normal image printing mode (receptor). More specifically, it is defined that, if the indicator 800C is a surface portion ("0" in Table 2), it indicates that mirror image printing is to be performed, and if the indicator 800C is a protrusion ("1" in Table 2), it indicates that normal image printing is to be performed.

Therefore, simply by visually identifying the position of the indicator 800C on the arm front surface 35 as described above, and checking whether or not a protrusion is formed there, a person can easily determine whether the print mode is laminated (mirror image printing mode) or receptor (normal image printing mode). For example, in the wide-width tape cassette 30 shown in FIG. 15, the indicator 800C is a surface portion. Therefore, the person can identify the print mode as the "mirror image printing mode (laminated)". In the narrow-width tape cassette 30 shown in FIG. 18, the indicator 800C is a protrusion. Therefore, the person can identify the print mode as the "normal image printing mode (receptor)".

The print mode "receptor (normal image printing mode)" includes all types of printing except for mirror image printing, such as a type of printing in which the ink from the ink ribbon is transferred to the tape as the print medium, and a type of printing in which a heat-sensitive tape is color developed without use of an ink ribbon. Therefore, identification of the print mode makes it possible to identify whether the tape cassette 30 houses a laminated type print medium or a receptor type print medium. In the manufacturing process of the tape cassette 30, identification of the print mode makes it possible to identify whether the cassette case 31 is prepared for the laminated type or the receptor type.

As shown in Table 3, corresponding to whether or not the indicator 800D, which is the character color indicator portion, is formed as a protrusion, the character color is defined as black or other than black. More specifically, it is defined that, if the indicator 800D is a protrusion ("1" in Table 3), it indicates that the character color is black, and if the indicator 800D is a surface portion ("0" in Table 3), it indicates that the character color is other than black.

Therefore, simply by visually identifying the position of the indicator 800D on the arm front surface 35 as described above, and checking whether or not a protrusion is formed there, a person can easily determine whether the character color is black or other than black. For example, in the wide-width tape cassette 30 shown in FIG. 15, the indicator 800D is a surface portion. Therefore, the person can identify the character color as other than black. In the narrow-width tape cassette 30 shown in FIG. 18, the indicator 800D is a protrusion. Therefore, the person can identify the character color as black.

The tape width and the print mode may be essential information for the tape printer 1 to perform correct printing. On the other hand, the character color may not be essential for the tape printer 1 to perform correct printing. Therefore, the indicator 800D, which is the character color indicator portion, is not always necessary. In other words, the vertical information section X4 may not need to be defined in the arm indicator portion 800. Further, the indicator 800D may be used to indicate not the character color but another element of the tape type, such as the color of a tape base material or the like.

Additionally, the contents of the tape width, the print mode and the character color indicated by each of the indicator portions are not limited to those shown in Table 1 to Table 3, and can be modified as necessary. Note that the total number of combinations of the tape width, the print mode and the character color defined in Table 1 to Table 3 is twenty eight. However, all of the combinations may not need to be used. For example, in a case where detection of an improper installed state by the tape printer 1 is made possible (which will be described later), a combination corresponding to the improper installed state detected by the tape printer 1 is not used.

The structure for the arm indicator portion 800 to indicate the tape type, and the method for identifying the tape type by a person visually checking the arm indicator portion 800 are described above. Hereinafter, the structure of the arm indicator portion 800 in relation to the arm detecting switches 210 of the tape printer 1, and tape type identification by the arm detecting switches 210 will be described with reference to FIG. 12 to FIG. 25.

First, the structure of the arm indicator portion 800 in relation to the arm detecting switches 210 of the tape printer 1 will be described. As described above, in the tape printer 1 of the present embodiment, the five detecting switches 210A to 210E are provided on the cassette-facing surface 12B of the platen holder 12 (refer to FIG. 7). In the tape cassette 30, the overlapping areas that respectively face the arm detecting switches 210A to 210E when the tape cassette 30 is installed in the cassette housing portion 8 as shown in FIG. 14 function as the indicators 800A to 800E. In the example shown in FIG. 14, the indicators 800A, 800C, and 800D are surface portions, and the indicators 800B and 800E are protrusions.

The surface portion is a part of the arm front surface 35 and opposes the arm detecting switch 210 with a small gap from the leading end of the switch terminal 222 of the arm detecting switch 210 when the tape cassette 30 is installed in the cassette housing portion 8 and the platen holder 12 moves to the print position (refer to FIG. 4 to FIG. 6). Therefore, the surface portion functions as the non-pressing portion 801 that does not press the switch terminal 222. The arm detecting switch 210 that opposes the non-pressing portion 801 remains in an off state, as the switch terminal 222 is not pressed.

The protrusion functions as the pressing portion 802 that presses the switch terminal 222 when the protrusion opposes the arm detecting switch 210. The arm detecting switch 210 that opposes the pressing portion 802 is changed to an on state, as the switch terminal 222 contacts with the pressing portion 802. As shown in FIG. 12, the pressing portion 802 may be formed as a parallelepiped protrusion that has an upright rectangular shape in a front view and matches the shape of the indicator (overlapping area). Thus, the pressing portion 802 protrudes forward from the arm front surface 35. In the example of the wide-width tape cassette 30 shown in FIG. 15, the indicators 800A, 800C and 800D are the non-pressing portions 801, and the indicators 800B and 800E are the pressing portions 802.

The vertical position of the indicator 800E on the arm front surface 35 is located in the lateral information section Y3 that is positioned lowest among the lateral information sections Y1 to Y3. As described above, in the wide-width tape cassette 30 with the tape width equal to or more than the predetermined width (18 mm) shown in FIG. 15, the lateral information section Y3 is provided astride the common indicator portion 831 and the extension portion 832 below the common indicator portion 831. On the other hand, in the narrow-width tape cassette 30 with the tape width less than the predetermined width shown in FIG. 18, the lateral information section Y3 extends along the lower edge of the arm front surface 35 and has the width approximately one third of the width of the lateral information sections Y1 and Y2. Accordingly, in the narrow-width tape cassette 30 shown in FIG. 18, the size of the indicator 800E in the vertical direction is approximately one third of the size of the indicator 800E of the wide-width tape cassette 30 shown in FIG. 15.

As described above, it is defined in the present embodiment that, in the wide-width tape cassette 30 (refer to FIG. 15) with the tape width equal to or more than the predetermined width (18 mm), the indicator 800E is a protrusion, namely, the pressing portion 802. It is also defined that, in the narrow-width tape cassette 30 (refer to FIG. 18) with the tape width less than the predetermined width, the indicator 800E is a surface portion, namely, the non-pressing portion 801.

This is due to the following reasons. In a case where the tape printer 1 is a dedicated device that only uses the narrow-width tape cassette 30, the arm detecting switch 210E may not be provided at the position that opposes the indicator 800E. On the other hand, in a case where the tape printer 1 is a general purpose device that can use both the narrow-width tape cassette 30 and the wide-width tape cassette 30, the arm detecting switch 210E that opposes the indicator 800E is provided. Accordingly, the indicator 800E that is formed as a surface portion (non-pressing portion 801) in the narrow-width tape cassette 30 functions as an escape portion corresponding to the arm detecting switch 210E.

As described above with reference to Table 1 to Table 3, each of the indicators 800A to 800E of the arm indicator portion 800 is associated with a tape type element that each of the indicators 800A to 800E indicates. Either a surface portion (the non-pressing portion 801) or a protrusion (the pressing portion 802) is formed in each of the indicators 800A to 800E, in accordance with a prescribed pattern that corresponds to the tape type. Accordingly, the tape printer 1 can identify the tape type based on the combination of the on and off states of the arm detecting switches 210 that are selectively pressed by the arm indicator portion 800.

More specifically, the prescribed pattern (the combination of the protrusion(s) and the surface portion(s)) that is defined in advance for the indicators 800A to 800E as described above can be converted to a detection pattern (the combination of the on and off states) of the corresponding arm detecting switches 210A to 210E. Then, the tape printer 1 can identify the tape type with reference to a table in which each detection pattern is associated with the tape type.

Figure 22:
FIG. 22 is a diagram showing a data structure of a tape type table 510.

A tape type table 510 shown in FIG. 22 is an example of a table used in the tape printer 1 to identify the tape type, and is stored in the ROM 402 of the tape printer 1. The tape types of the tape cassette 30 are defined in the tape type table 510 in accordance with the combinations of the on and off states of the five arm detecting switches 210A to 210E. In the tape type table 510 shown in FIG. 22, the arm detecting switches 210A to 210E respectively correspond to switches SW1 to SW5, and the off state (OFF) and the on state (ON) of each of the arm detecting switches 210 correspond to the values zero (0) and one (1) respectively.

In a case where the total of the five arm detecting switches 210A to 210E are used, a maximum of thirty-two tape types can be identified, corresponding to a maximum of thirty-two detection patterns that are the total number of combinations of the on and off states. However, in the tape type table 510 shown in FIG. 22, of the maximum of thirty-two detection patterns, tape types corresponding to twenty-four detection patterns are set. Of the remaining eight detection patterns, "ERROR" is shown for one pattern for which the tape printer 1 can detect that the tape cassette 30 is not installed at a proper position in the cassette housing portion 8. "SPARE" is shown for the other seven detection patterns, indicating a blank field. The installed state of the tape cassette 30 when an error is detected will be described later.

The table that can be used in the tape printer 1 is not limited to the tape type table 510 shown in FIG. 22. For example, a table may be used in which any selected tape type is newly added in the detection pattern corresponding to "SPARE" in the tape type table 510. In addition, a table may be used in which a tape type that is recorded in the tape type table 510 is deleted, the correspondence between each detection pattern and the tape type is changed, and the content of the tape type corresponding to each detection pattern is changed. In such a case, the above-described prescribed pattern determined for identification of the tape type by a visual check may also be changed as necessary.

Additionally, as described above, the indicator 800E included in the tape width indicator portion, and the indicator 800D as the character color indicator portion may be omitted. When the indicators 800E and 800D are not provided, the corresponding arm detecting switches 210E (SW5) and 210D (SW4) are not used. In such a case, therefore, a table in which only the tape types corresponding to the arm detecting switches 210A to 210C (SW1 to SW3) are defined may be used.

Figure 19:
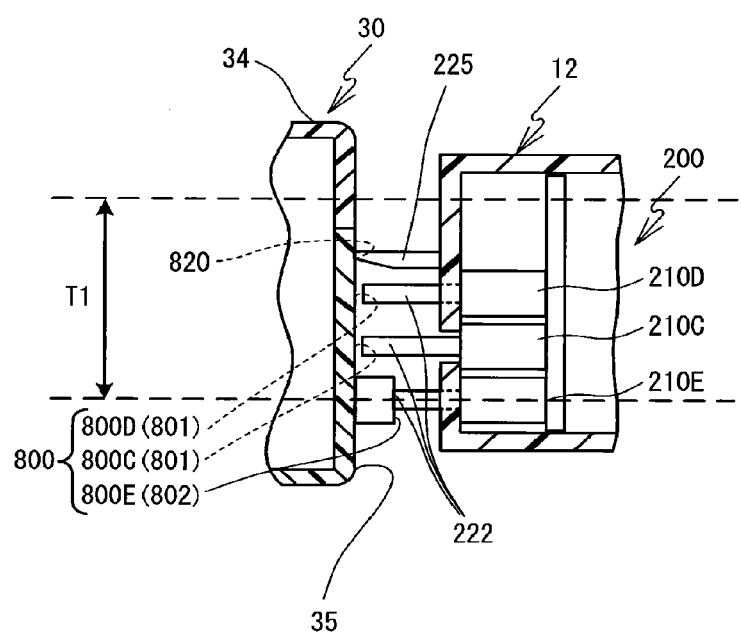
FIG. 19 is a cross-sectional view along a II-II line shown in FIG. 15 as seen in the direction of the arrows, when the platen holder 12 shown in FIG. 8 opposes the wide-width tape cassette 30 shown in FIG. 15.
Figure 20:
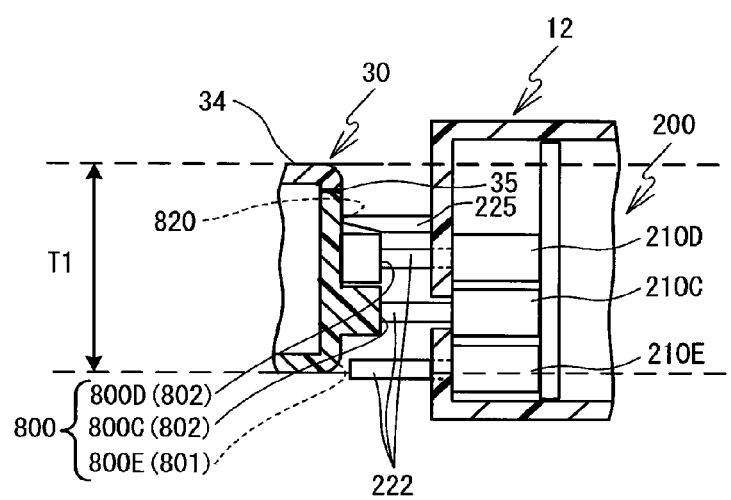
FIG. 20 is a cross-sectional view along a line shown in FIG. 18 as seen in the direction of the arrows, when the platen holder 12 shown in FIG. 8 opposes the narrow-width tape cassette 30 shown in FIG. 18.

Next, modes of detecting the tape type of the tape cassette 30 by the tape printer 1 will be explained with reference to FIG. 3 to FIG. 6, FIG. 19 and FIG. 20. FIG. 19 shows a state in which the tape type is detected of the wide-width tape cassette 30 with the tape width of 36 mm shown in FIG. 2, and FIG. 10 to FIG. 15. FIG. 20 shows a state in which the tape type is detected of the narrow-width tape cassette 30 with the tape width of 12 mm shown in FIG. 16 to FIG. 18.

When the tape cassette 30 is installed at a proper position in the cassette housing portion 8 by the user and the cassette cover 6 is closed, the platen holder 12 moves from the stand-by position (refer to FIG. 3) to the print position (refer to FIG. 4 to FIG. 6). Then, the arm detection portion 200 and the protruding piece 225 provided on the cassette-facing surface 12B of the platen holder 12 move to the positions that respectively oppose the arm indicator portion 800 and the opposing portion 820 provided on the arm front surface 35 of the tape cassette 30.

In a case where the tape cassette 30 is installed in the cassette housing portion 8 at the proper position, the protruding piece 225 opposes the opposing portion 820. In the meantime, the switch terminals 222 of the arm detecting switches 210 that protrude from the cassette-facing surface 12B (refer to FIG. 8) oppose the indicators 800 A to 800E (the non-pressing portions 801 and the pressing portion 802) that are provided at the corresponding positions in the arm indicator portion 800, and are selectively pressed. More specifically, as shown in FIG. 19 and FIG. 20, the arm-detecting switch 210 opposing the non-pressing portion 801, namely, a surface portion, remains in the off state, as the leading end of its switch terminal 222 is slightly separated from the arm front surface 35 and thus is not pressed. The arm detecting switch 210 opposing the pressing portion 802 is changed to the on state, as its switch terminal 222 is pressed by the pressing portion 802, namely, a protrusion that protrudes forward from the arm front surface 35.

In a case where the wide-width tape cassette 30 shown in FIG. 10 to FIG. 15 is installed at the proper position in the cassette housing portion 8, the arm detecting switches 210A, 210C and 210D are in the off state because they oppose the indicators 800A, 800C and 800D that are the non-pressing portions 801, as shown in FIG. 19. On the other hand, the arm detecting switches 210B and 210E are in the on state because they oppose the indicators 800B and 800E that are the pressing portions 802. More specifically, the values that indicate the on and off states of the switches SW1 to SW5 corresponding to the arm detecting switches 210A to 210E are identified as 0, 1, 0, 0 and 1, respectively. Therefore, with reference to the tape type table 510, the tape type is identified as "tape width 36 mm, mirror image printing mode (laminated), and the character color is other than black," in the same manner as the identification result by a visual check that is described above.

In a case where the narrow-width tape cassette 30 shown in FIG. 16 to FIG. 18 is installed at the proper position in the cassette housing portion 8, the arm detecting switches 210A and 210E are in the off state because they oppose the indicators 800A and 800E that are the non-pressing portions 801, as shown in FIG. 20. On the other hand, the arm detecting switches 210B, 210C and 210D are in the on state because they oppose the indicators 800B, 800C and 800D that are the pressing portions 802. More specifically, the values that indicate the on and off states of the switches SW1 to SW5 corresponding to the arm detecting switches 210A to 210E are identified as 0, 1, 1, 1 and 0, respectively. Therefore, with reference to the tape type table 510, the tape type is identified as "tape width 12 mm, normal image printing mode (receptor), and the character color is black" in the same manner as the identification result by a visual check that is described above.

Figure 23:
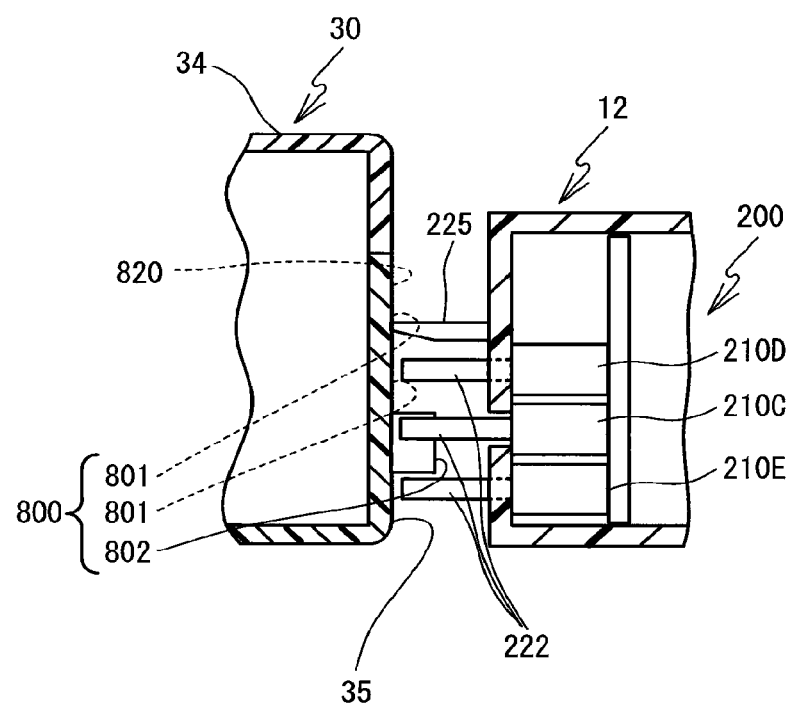
FIG. 23 is an explanatory diagram illustrating a case in which an error is detected by the tape printer 1, and the tape cassette 30 is opposed to the platen holder 12.

As shown in FIG. 23, in a case where the tape cassette 30 is not sufficiently pushed in the downward direction, for example, the arm detecting switches 210 do not oppose the indicators 800A to 800E, which are supposed to oppose the detecting arm switches 210 oppose when the tape cassette 30 is properly installed. As described above with reference to FIG. 14, in the present embodiment, each of the indicators 800A to 800E is arranged in each of the vertical information sections X1 to X5, and arranged in a zigzag pattern in a front view, and thus none of the indicators 800A to 800E is aligned on the same line in the vertical direction. In addition, the pressing portion 802 is formed as a protrusion that has the same shape as the overlapping portion in a front view.

Consequently, in a case where the tape cassette 30 is misaligned in the upward direction relative to the proper position in the cassette housing portion 8 as shown in FIG. 23, the pressing portion(s) 802 does not press the detecting switch(es) 210 that is not supposed to oppose the pressing portion(s) 802. Therefore, none of the switch terminals 222 contacts with the arm front surface 35 (including the arm indicator portion 800). In other words, all of the arm detecting switches 210A to 210E are maintained in the off states, and the values that indicate the on and off states of the switches SW1 to SW5 that correspond to the arm detecting switches 210A to 210E are identified as 0, 0, 0, 0 and 0, respectively. As a result, in the case of this installed state, with reference to the tape type table 510, "ERROR" is identified in the tape printer 1.

As described above, the combination pattern of the pressing portion(s) 802 (protrusion(s)) and the non-pressing portion(s) 801 (surface portion(s)) that corresponds to "ERROR" is not adopted in the arm indicator portion 800 in the present embodiment. More specifically, in the present embodiment, a pattern in which all the indicators 800A to 800E are the non-pressing portions 801 (surface portions) is not adopted. Thus, the tape cassette 30 not only enables identification of the tape type by human visual check and by the arm detecting switches 210 of the tape printer 1, but also enables detection of the installed state of the tape cassette 30 by the tape printer 1.

As described above, the arm portion 34 is a portion that guides the film tape 59 pulled out from the second tape spool 41 and the ink ribbon 60 pulled out from the ribbon spool 42, causes the film tape 59 and the ink ribbon 60 to be joined at the exit 34A and then discharges them towards the head insertion portion 39 (more specifically, the opening 77). Therefore, if the tape cassette 30 is not properly installed in the cassette housing portion 8, an error may occur in the positional relationship with the thermal head 10, and printing may be performed at a misaligned position relative to the tape width direction (the height direction) of the film tape 59. This also applies to the print tape 57 and the heat-sensitive paper tape 55.

Considering this situation, in the present embodiment, the arm indicator portion 800 is provided on the arm front surface 35 of the arm portion 34, which is in the vicinity of the head insertion portion 39 into which the thermal head 10 is inserted. Thus, the arm portion 34 (more specifically, the arm front surface 35) forms the basis for easy detection of an error in the positional relationship with the thermal head 10, and, printing accuracy may be improved by determining whether or not the tape cassette 30 is installed in the cassette housing portion 8 at the proper position.

Next, processing relating to printing performed in the tape printer 1 according to the present embodiment will be explained with reference to FIG. 21. The processing relating to printing shown in FIG. 21 is performed by the CPU 401 based on programs stored in the ROM 402 when the power source of the tape printer 1 is switched on.

Figure 21:
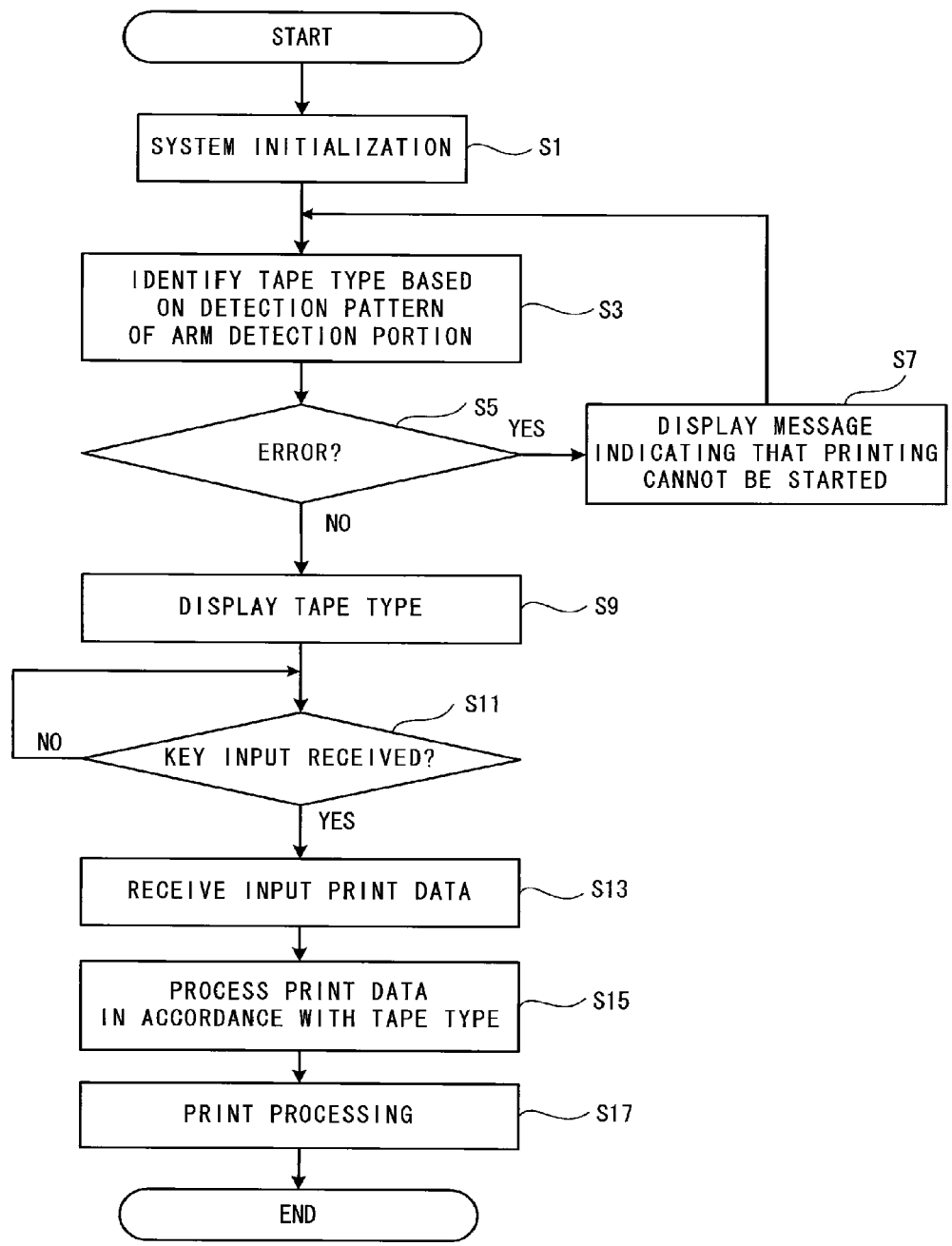
FIG. 21 is a flowchart showing processing relating to printing of the tape printer 1.

As shown in FIG. 21, in the processing relating to printing, first, system initialization of the tape printer 1 is performed (step S1). For example, in the system initialization performed at step S1, the text memory in the RAM 404 is cleared, a counter is initialized to a default value, and so on.

Next, the tape type of the tape cassette 30 is identified based on the detection pattern of the arm detection portion 200 (namely, based on the combination of the on and off states of the arm detecting switches 210A to 210E) (step S3). At step S3, as described above, with reference to the tape type table 510 stored in the ROM 402, the tape type corresponding to the combination of the on and off states of the arm detecting switches 210A to 210E is identified.

Next, it is determined whether the tape type identified at step S3 is "ERROR" (step S5). If the identified tape type is "ERROR" (yes at step S5), the tape cassette 30 is not properly installed in the cassette housing portion 8, as described above with reference to FIG. 23. Therefore, a message is displayed on the display 5 to notify that printing cannot be started (step S7). At step S7, a text message is displayed on the display 5 that reads, for example, "The tape cassette is not properly installed."

After step S7 is performed, the processing returns to step S3. Note that, even when the tape cassette 30 is properly installed in the cassette housing portion 8, if the cassette cover 6 is open, the platen holder 12 is at the stand-by position (refer to FIG. 3) and therefore, a message is displayed on the display 5 indicating that printing cannot be started (step S7).

If the identified tape type is not "ERROR" (no at step S5), the content of the tape type identified at step S3 is displayed on the display 5 as text information (step S9). In a case where the above-described wide-width tape cassette 30 shown in FIG. 15 is properly installed, the display 5 displays a message that reads, for example, "A 36 mm laminated-type tape cassette has been installed. The character color is other than black." In a case where the above-described narrow-width tape cassette 30 shown in FIG. 18 is properly installed, the display 5 displays a message that reads, for example, "A 12 mm receptor-type tape cassette has been installed. The character color is black."

Next, it is determined whether there is any input from the keyboard 3 (step S11). If there is an input from the keyboard 3 (yes at step S11), the CPU 401 receives the characters input from the keyboard 3 as print data, and stores the print data (text data) in the text memory of the RAM 404 (step S13). If there is no input from the keyboard 3 (no at step S11), the processing returns to step S11 and the CPU 402 the CPU 401 waits for an input from the keyboard 3.

Then, if there is an instruction to start printing from the keyboard 3, for example, the print data stored in the text memory is processed in accordance with the tape type identified at step S3 (step S15). For example, at step S15, the print data is processed such that a print range and a print size corresponding to the tape width identified at step S3, and a print position corresponding to the print mode (the mirror image printing mode or the normal image printing mode) identified at step S3 are incorporated. Based on the print data processed at step S15, a print processing is performed on the tape that is the print medium (step S17). After the print processing is performed, the processing relating to printing (refer to FIG. 21) ends.

The above-described print processing (step S17) will be explained below more specifically. In a case where the laminated type tape cassette 30 shown in FIG. 3 and FIG. 4 is installed, the tape drive roller 46, which is driven to rotate via the tape drive shaft 100, pulls out the film tape 59 from the second tape spool 41 by moving in concert with the movable feed roller 14. Further, the ribbon take-up spool 44, which is driven to rotate via the ribbon take-up shaft 95, pulls out the unused ink ribbon 60 from the ribbon spool 42 in synchronization with the print speed. The film tape 59 that has been pulled out from the second tape spool 41 passes the outer edge of the ribbon spool 42 and is fed along the feed path within the arm portion 34.

Then, the film tape 59 is discharged from the exit 34A toward the head insertion portion 39 in a state in which the ink ribbon 60 is joined to the surface of the film tape 59. The film tape 59 is then fed between the thermal head 10 and the platen roller 15 of the tape printer 1. The characters are printed onto the print surface of the film tape 59 by the thermal head 10. Following that, the used ink ribbon 60 is separated from the printed film tape 59 at the guide wall 47 and wound onto the ribbon take-up spool 44.

Meanwhile, the double-sided adhesive tape 58 is pulled out from the first tape spool 40 by the tape drive roller 46 moving in concert with the movable feed roller 14. While being guided and caught between the tape drive roller 46 and the movable feed roller 14, the double-sided adhesive tape 58 is layered onto and affixed to the print surface of the printed film tape 59. The printed film tape 59 to which the double-sided adhesive tape 58 has been affixed (namely, the printed tape 50) is then fed toward the tape discharge portion 49, and is discharged from the discharge aperture. After that, the printed tape 50 is cut by the cutting mechanism 17.

In a case where the receptor type tape cassette 30 shown in FIG. 5 is installed, the tape drive roller 46, which is driven to rotate via the tape drive shaft 100, pulls out the print tape 57 from the first tape spool 40 by moving in concert with the movable feed roller 14. Further, the ribbon take-up spool 44, which is driven to rotate via the ribbon take-up shaft 95, pulls out the unused ink ribbon 60 from the ribbon spool 42 in synchronization with the print speed. The print tape 57 that has been pulled out from the first tape spool 40 is bent in the leftward direction in the right front portion of the cassette case 31, and fed along the feed path within the arm portion 34.

Then, the print tape 57 is discharged from the exit 34A toward the head insertion portion 39 in a state in which the ink ribbon 60 is joined to the surface of the print tape 57. The print tape 57 is then fed between the thermal head 10 and the platen roller 15 of the tape printer 1. Then, characters are printed onto the print surface of the print tape 57 by the thermal head 10. Following that, the used ink ribbon 60 is separated from the printed print tape 57 at the guide wall 47 and wound onto the ribbon take-up spool 44. Meanwhile, the printed print tape 57 (in other words, the printed tape 50) is then fed toward the tape discharge portion 49 and is discharged from the discharge aperture. After that, the printed tape 50 is cut by the cutting mechanism 17.

In a case where the thermal type tape cassette 30 shown in FIG. 6 is installed, the tape drive roller 46, which is driven to rotate via the tape drive shaft 100, pulls out the heat-sensitive paper tape 55 from the first tape spool 40 by moving in concert with the movable feed roller 14. The heat-sensitive paper tape 55 that has been pulled out from the first tape spool 40 is bent in the leftward direction in the right front portion of the cassette case 31, and is fed along the feed path within the arm portion 34.

Then, the heat-sensitive paper tape 55 is discharged from the exit 34A of the arm portion 34 toward the aperture 77 and is then fed between the thermal head 10 and the platen roller 15. Then, characters are printed onto the print surface of the heat-sensitive paper tape 55 by the thermal head 10. Following that, the printed heat-sensitive paper tape 55 (namely, the printed tape 50) is further fed toward the tape discharge portion 49 by the tape drive roller 46 moving in concert with the movable feed roller 14, and is discharged from the discharge aperture. After that, the printed tape 50 is cut by the cutting mechanism 17.

When printing is being performed with thermal type printing, the ribbon take-up spool 44 is also driven to rotate via the ribbon take-up shaft 95. However, there is no ribbon spool housed in the thermal type tape cassette 30. For that reason, the ribbon take-up spool 44 does not pull out the unused ink ribbon 60, nor does it wind the used ink ribbon 60. In other words, even when the thermal type tape cassette 30 is used in the tape printer 1 that is equipped with the ribbon take-up shaft 95, the rotation drive of the ribbon take-up shaft 95 does not have an influence on the printing operation of the heat-sensitive paper tape 55 and printing can be correctly performed. In the thermal type tape cassette 30, the ribbon take-up spool 44 may not be provided, and the ribbon take-up shaft 95 may perform idle running inside the support holes 67A and 67B in a similar way.

In the above-described print processing (step S17), in a case where the laminated type tape cassette 30 is installed, mirror image printing is performed. In mirror image printing, the ink of the ink ribbon 60 is transferred onto the film tape 59 such that the characters are shown as a mirror image. In a case where the receptor type tape cassette 30 is installed, normal image printing is performed. In normal image printing, the ink of the ink ribbon 60 is transferred onto the print tape 57 such that the characters are shown as a normal image. In a case where the thermal type tape cassette 30 is installed, thermal type normal image printing is performed on the heat-sensitive paper tape 55 such that the characters are shown as a normal image.

In the present embodiment, the print mode "laminated" is applied to the tape cassette 30 with which mirror image printing is performed, while the print mode "receptor" is applied to the tape cassette 30 with which normal image printing is performed. For that reason, the print mode "receptor" is applied not only to the receptor type tape cassette 30 shown in FIG. 5, but also to the thermal type tape cassette 30 shown in FIG. 6.

Through the above-described processing relating to printing (refer to FIG. 21), the tape type of the tape cassette 30 installed in the cassette housing portion 8 is identified by the tape printer 1 based on the detection patterns of the arm detection portion 200. More specifically, the arm detecting switches 210A to 210E on the arm detection portion 200 are selectively pressed by the arm indicator portion 800 provided on the arm front surface 35 of the tape cassette 30, and the tape type of the tape cassette 30 is thus identified.

As described above, the tape cassette 30 according to the present embodiment is structured such that when a person looks at the tape cassette 30 alone, the person can identify the type of the tape included in the tape cassette 30 by visually checking the arm front surface 35. In addition, the tape cassette 30 is structured such that when the tape cassette 30 is installed in the cassette housing portion 8 of the tape printer 1, the tape printer 1 can identify the tape type with the arm detection portion 200 detecting information indicated by the arm indicator portion 800. Of the foregoing structures, as a result of structuring the tape cassette 30 such that a person can recognize the tape type in the tape cassette 30 by visually checking the arm indicator portion 800, the following effects may be particularly exhibited.

In a conventional manufacturing method for tape cassettes, it is a general practice to house a tape as a print medium in a cassette case having the height (so-called case size) corresponding to the print tape. In contrast to this, a tape cassette manufacturing method is proposed in which the tapes with differing tape widths are respectively housed in cassette cases with the same height (the same case size). With this type of tape cassette manufacturing method that uses a common case size, the following benefits may be expected.

First, conventionally, when transporting cassette cases of different case sizes corresponding to different tape widths from a parts manufacturing plant to an assembly plant, the cassette cases are transported in different transportation containers each prepared for each of the case sizes. In contrast, by using a common case size, common transportation containers can be used when transporting the cassette cases from the parts manufacturing plant to the assembly plant. Consequently, transportation costs for the cassette cases may be reduced.

Second, if the case size is different for each tape width, when products are shipped from the assembly plant, it is necessary to use different package boxes each prepared for each case size. In contrast, by using a common case size, common package boxes can be used and a common packaging format can also be used when shipping the products. Consequently, packaging cost may also be reduced.

Third, if an ink ribbon with the same width is used for a tape with a narrow tape width, the width of the ink ribbon itself (the ribbon width) is narrow. In such a case, the ink ribbon may get cut during the printing operation. In contrast, by using a common case size that can maintain a ribbon width with an adequate strength, even if the width of the tape is narrow, the ink ribbon may be prevented from getting cut during the printing operation.

On the other hand, in the manufacture of the tape cassettes, if tapes with different tape widths are respectively mounted in the common size cassette cases, a tape with a wrong tape width may be housed in the cassette case. For example, a worker may mistakenly mount a tape with a 6 mm or a 9 mm width in the cassette case intended to house a 12 mm tape. This may happen because the common size cassette case capable of housing the 12 mm tape has a rib height that allows housing a tape with a less than 12 mm width.

Furthermore, as described above, the print modes of the tape cassette include the so-called receptor type, with which normal image printing is performed directly onto the print tape, and the laminated type, with which, after mirror image printing is performed on a transparent tape, a double-sided adhesive tape is affixed to the print surface. The common size cassette cases have the same external appearance, and therefore, a wrong tape may be mounted in the cassette case in the wrong print mode. For example, a worker may mount a wrong tape in the cassette case to assemble the receptor type tape cassette, when the cassette case is intended for the laminated type tape cassette.

With the tape cassette 30 according to the present embodiment, however, a person can identify the tape type of the tape cassette 30 simply by visually checking the arm indicator portion 800. In other words, the worker can ascertain the tape width of the tape that should be mounted in the cassette case 31, and the print mode that is intended for the cassette case 31. As a consequence, in the manufacturing process of the tape cassette 30, the worker can work while confirming the contents to be housed in the cassette case 31, and thus errors in the manufacture of the tape cassette 30 may be reduced.

Furthermore, when the tape cassette 30 is shipped from the plant, an inspector can verify whether the contents housed in the cassette case 31 are correct by simply visually checking the arm indicator portion 800, and therefore product inspection can be performed on the tape cassette 30. More specifically, the inspector can verify whether the tape exposed at the opening 77 of the manufactured tape cassette 30 matches the tape type that can be identified from the arm indicator portion 800.

In particular, the arm indicator portion 800 according to the present embodiment is provided on the arm front surface 35 that is in the vicinity of the opening 77 at which the tape is exposed. Moreover, the arm front surface 35 is a portion that can be seen from the same direction as the tape that is exposed at the opening 77 (more specifically, from the front of the tape cassette 30). In other words, the arm indicator portion 800 and the tape are in adjacent positions and can be seen from the same direction, and thus the inspector can inspect the tape while verifying the arm indicator portion 800. As a consequence, working efficiency in the product inspection of the tape cassette 30 may be improved.

In addition, the arm indicator portion 800 indicates the tape type using a simple structure formed of a combination of a presence and an absence of a protrusion (namely, a combination of the non-pressing portions 801 and the pressing portions 802) in each of the vertical information sections X1 to X5 (or in each of the indicators 800A to 800E). Therefore, the arm indicator portion 800 may be formed easily on the cassette case 31 in advance. For that reason, at the time of manufacture of the cassette case 31, there may be no need to print the contents to be housed in the cassette case 31, nor to affix labels to indicate the contents, and therefore errors in the manufacture of the tape cassette 30 can be reduced at a low cost.

Moreover, in the present embodiment, the laminated type tape cassette 30 formed from the general purpose cassette is used in the general purpose tape printer 1. Therefore, a single tape printer 1 can be used with each type of the tape cassette 30, such as the thermal type, the receptor type, and the laminated type etc., and it may not be necessary to use the different tape printer 1 for each type. Furthermore, the tape cassette 30 is normally formed by injecting plastic into a plurality of combined dies. In the case of the tape cassette 30 that corresponds to the same tape width, common dies can be used, except for the die including the portion that forms the arm indicator portion 800. Thus, costs may be significantly reduced.

In the example described above, the specified area R0 of the arm front surface 35 includes the first area R1 and the second area R2. The first area R1 is formed as a surface portion that functions as the opposing portion 820. The second area R2 includes overlapping areas that function as the indicators 800A to 800E, each of which includes either a surface portion (namely, the non-pressing portion 801) or a protrusion (namely, the pressing portion 802). In such a case, in the specified area R0, a protrusion and a surface portion may be formed freely as long as the functions of the opposing portion 820 or the indicators 800A to 800E are maintained.

More specifically, with the above-described wide-width tape cassette 30 shown in FIG. 2 and FIG. 10 to FIG. 15, all the areas that do not function as the opposing portion 820 (the first area R1) or as the indicators 800A to 800E are surface portions that are in the same plane as the non-pressing portions 801. Therefore, the protrusions (the opposing portion 820) provided in the specified area R0 are formed separately from each other. However, it may not be necessary that the protrusions are all separated from each other.

For example, one protrusion that has a size and shape that includes at least two of the pressing portions 802 (hereinafter referred to as a continuous protrusion) may be formed in the specified area R0. In a case where such a continuous protrusion is formed, the continuous protrusion should not include the opposing portion 820 that opposes the protruding piece 225 and a portion that functions as the non-pressing portion(s) 801.

Figure 24:
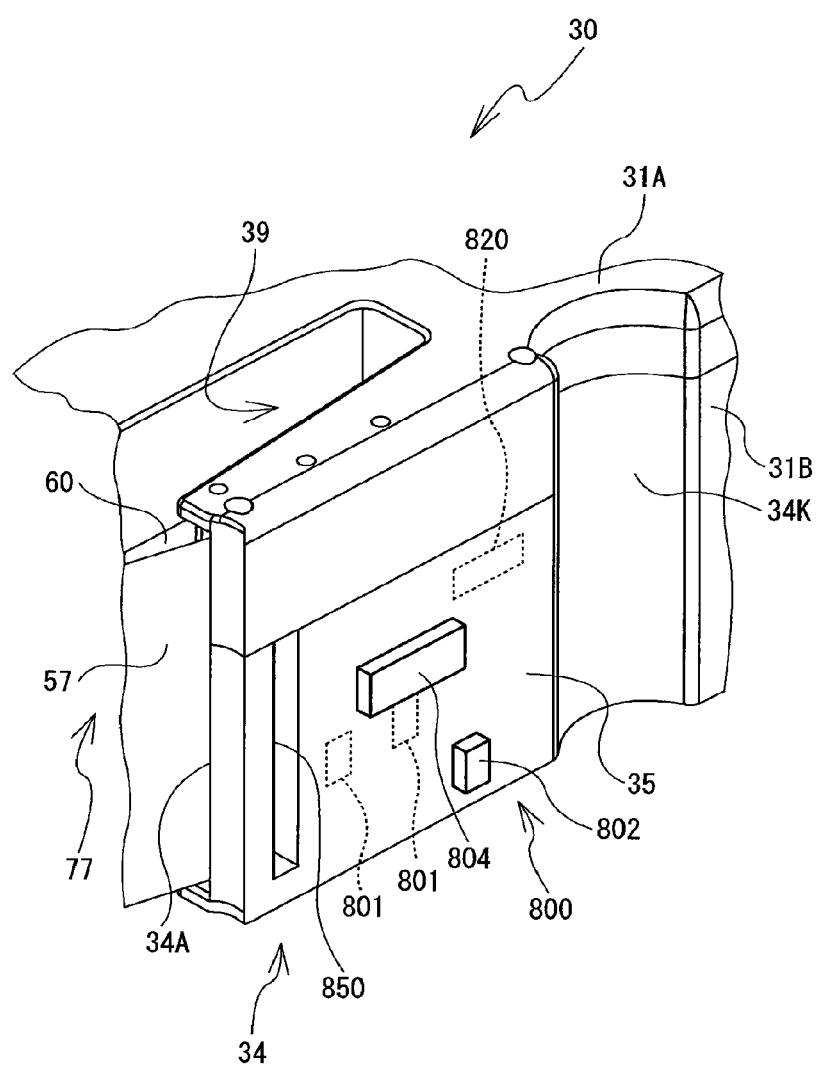
FIG. 24 is an enlarged external perspective view of the arm front surface 35 of another wide-width tape cassette 30.
Figure 25:
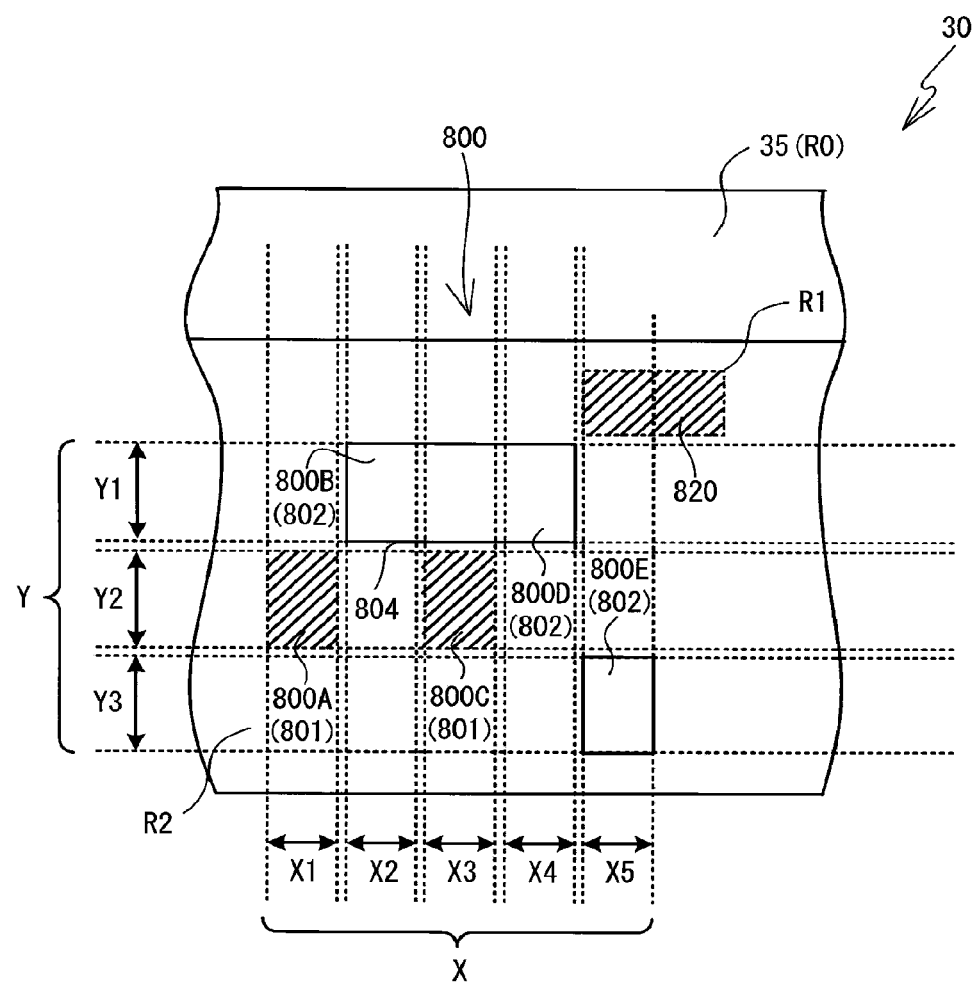
FIG. 25 is an explanatory view of a structure of indicators 800A to 800E in the wide-width tape cassette 30 shown in FIG. 24.
Figure 26:
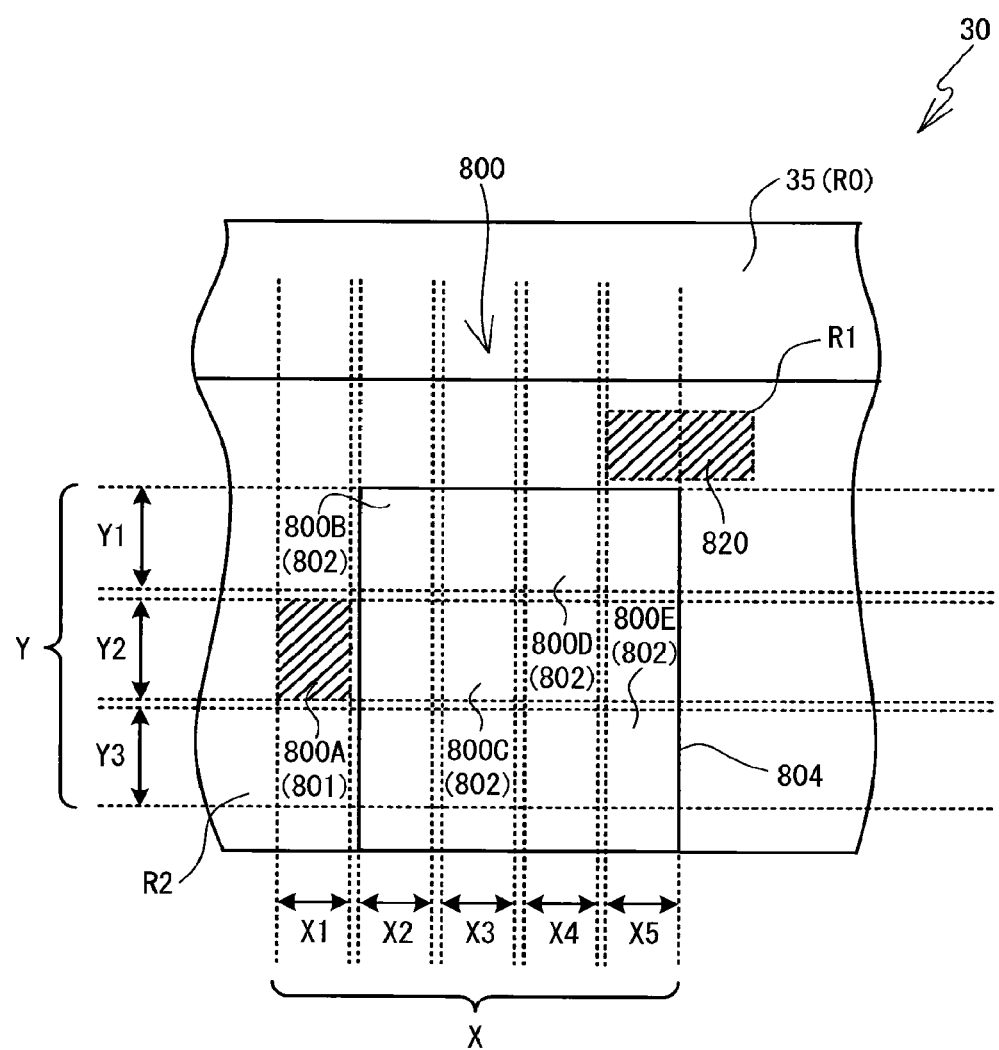
FIG. 26 is an explanatory view of a structure of the indicators 800A to 800E in yet another wide-width tape cassette 30.

FIG. 24 and FIG. 25 show an example of the wide-width tape cassette 30 in which the pressing portions 802 provided in the indicators 800B and 800D are made continuous to form the continuous protrusion 804. FIG. 26 shows an example of the wide-width tape cassette 30 in which the pressing portions 802 provided in the indicators 800B, 800C, 800D, and 800E are made continuous to form the continuous protrusion 804. Also with the wide-width tape cassettes 30 shown in FIG. 24 to FIG. 26, in the same manner as with the above-described wide-width tape cassette 30 shown in FIG. 2 and FIG. 10 to FIG. 15, the tape type can be identified by either detection of the arm detecting switches 210 or human visual check.

Further, with the above-described narrow-width tape cassette 30 shown in FIG. 16 to FIG. 18, all the areas of the specified area R0 that do not function as the opposing portion 820 (the first area R1) or the indicators 800A to 800E are surface portions that are in the same plane as the non-pressing portions 801. Therefore, the protrusions (the pressing portions 802) provided in the specified area R0 are formed separately from each other. However, it may not be necessary that the protrusions are all separated from each other.

Figure 27:
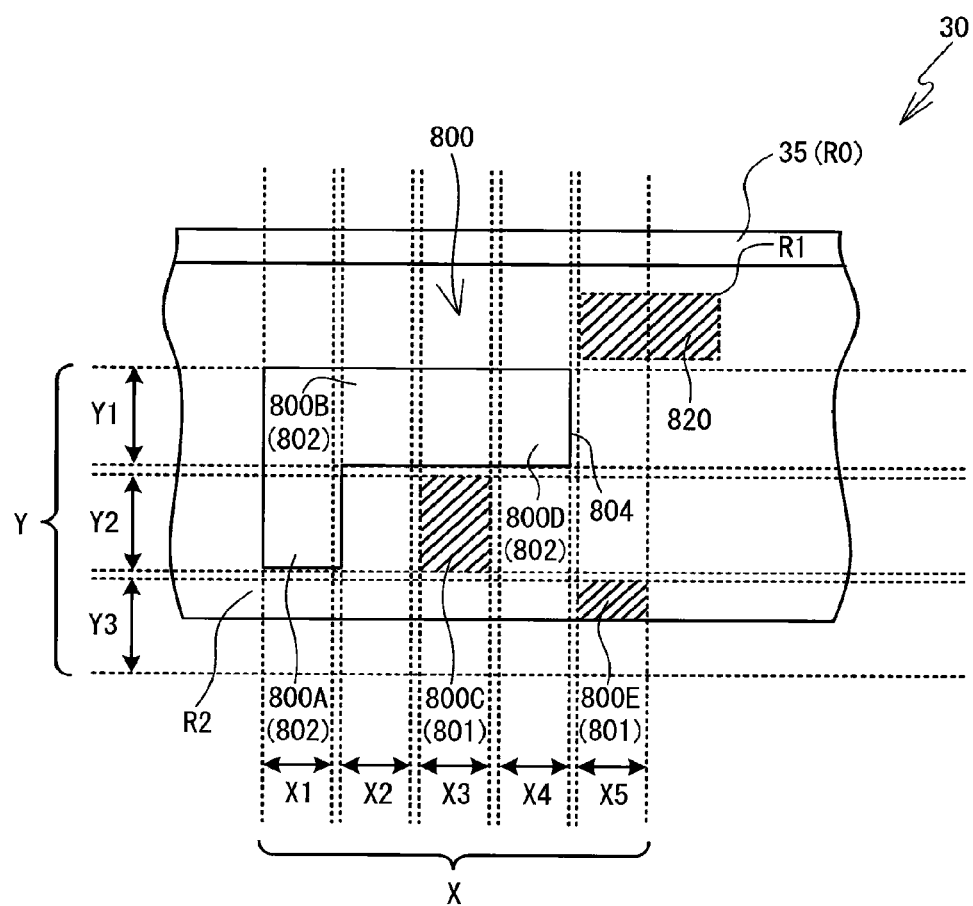
FIG. 27 is an explanatory view of a structure of the indicators 800A to 800E in another narrow-width tape cassette 30.

Specifically, as in the case of the wide-width tape cassette 30 described above, one continuous protrusion 804 that includes at least two of the pressing portions 802 may be formed in the specified area R0. FIG. 27 shows an example of the narrow-width tape cassette 30 in which the pressing portions 802 provided in the indicators 800A, 800B, and 800D are made continuous to form the continuous protrusion 804. Also with the narrow-width tape cassette 30 shown in FIG. 27, in the same manner as with the above-described narrow-width tape cassette 30 shown in FIG. 16 to FIG. 18, the tape type can be identified by either detection of the arm detecting switches 210 or human visual check.

The tape cassette 30 and the tape printer 1 of the present invention are not limited to those in the above-described embodiment, and various modifications and alterations may of course be made insofar as they are within the scope of the present invention.

The shape, size, number and arrangement pattern of the non-pressing portion(s) 801 and the pressing portion(s) 802 of the arm indicator portion 800 are not limited to the examples represented in the above-described embodiment, but can be modified. For example, in the above-described embodiment, the pressing portion 802 (protrusion) of the arm indicator portion 800 is a parallelepiped protrusion that has an upright rectangular shape in a front view that is the same as the shape of each of the overlapping areas functioning as the indicators 800A to 800E. However, the pressing portion 802 can be modified in a range of size and shape as long as the pressing portion 802 is capable of pressing the switch terminal 222 to make the detecting switch 210 to be in the on state. For example, the pressing portion 802 may be a hemispherical projection that has a circular shape and includes the overlapping area in a plan view, or the pressing portion 802 may have any other different shape. In addition, in the above-described embodiment, the tape cassette 30 that has the semi-circular groove 34K is shown as an example. However, the tape cassette 30 may not need to have the semi-circular groove 34K.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A tape cassette, comprising:
a housing having a top surface, a bottom surface, a front surface and a pair of side surfaces;
a tape that is a print medium mounted in the housing;
a tape exit that discharges, from the housing, the tape guided in the housing along a predetermined feed path, at least a portion of the feed path extending parallel to the front surface; and
a type indicator portion provided adjacent to the tape exit and in a specified area of the front surface on an upstream side of the tape exit in a feed direction of the tape, the type indicator portion indicating a tape type of the tape and including at least one first surface portion and at least one second surface portion arranged in a pattern corresponding to the tape type, each of the at least one second surface portion being a surface portion located between the at least one first surface portion and the portion of the feed path in a direction that is generally orthogonal to the front surface, wherein
the type indicator portion includes a plurality of strip-shaped vertical information sections extending along a direction orthogonal to the feed direction,
each of the plurality of vertical information sections includes one of the at least one first surface portion and the at least one second surface portion, and
a first vertical information section is positioned at an interval from the tape exit toward an upstream side in the feed direction, the first vertical information section being a vertical information section located on a most downstream side in the feed direction among the plurality of vertical information sections.

2. The tape cassette according to claim 1, wherein the type indicator portion includes at least a tape width indicator portion that indicates a tape width of the tape.

3. The tape cassette according to claim 2, wherein:
the tape width indicator portion includes, of the plurality of vertical information sections, the first vertical information section and a second vertical information section that is a vertical information section located second closest to the tape exit toward the upstream side in the feed direction; and
a combination of whether a first surface portion is formed in each of the first vertical information section and the second vertical information section indicates the tape width.

4. The tape cassette according to claim 2, wherein:
the plurality of vertical information sections include vertical information sections arranged in at least three rows;
the tape width indicator portion includes, of the plurality of vertical information sections, the first vertical information section, a second vertical information section that is a vertical information section located second closest to the tape exit toward the upstream side in the feed direction, and a most upstream vertical information section that is a vertical information section located farthest from the tape exit toward the upstream side in the feed direction; and
a combination of whether a first surface portion is formed in each of the first vertical information section, the second vertical information section and the most upstream vertical information section indicates the tape width.

5. The tape cassette according to claim 4, wherein adjacent vertical information sections of the plurality of vertical information sections are arranged at an equal interval.

6. The tape cassette according to claim 2, wherein the type indicator portion includes a print mode indicator portion that indicates whether a print mode is a normal image or a minor image.

7. The tape cassette according to claim 6, wherein:
the plurality of vertical information sections include vertical information sections arranged in at least three rows;
the print mode indicator portion includes, of the plurality of vertical information sections, a third vertical information section that is a vertical information section located third closest to the tape exit toward the upstream side in the feed direction; and
whether a first surface portion is formed in the third vertical information section indicates whether the print mode is the normal image or the mirror image.

8. The tape cassette according to claim 7, wherein:
the tape width indicator portion includes, of the plurality of vertical information sections, the first vertical information section and a second vertical information section that is a vertical information section located second closest to the tape exit toward the upstream side in the feed direction; and
a combination of whether a first surface portion is formed in each of the first vertical information section and the second vertical information section indicates the tape width.

9. The tape cassette according to claim 7, wherein:
the plurality of vertical information sections include vertical information sections arranged in five rows;
the tape width indicator portion includes, of the plurality of vertical information sections, the first vertical information section, a second vertical information section that is a vertical information section located second closest to the tape exit toward the upstream side in the feed direction, and a most upstream vertical information section that is a vertical information section located farthest from the tape exit toward the upstream side in the feed direction; and
a combination of whether a first surface portion is formed in each of the first vertical information section, the second vertical information section and the most upstream vertical information section indicates the tape width.

10. The tape cassette according to claim 1, further comprising:
a tape guide portion that is provided on a downstream side of the tape exit on the feed path, and that guides the tape that is discharged from the tape exit and exposed,
wherein:
a length in the feed direction of the specified area of the front surface on which the type indicator portion is provided is equal to or less than a tape exposure length that is a distance between the tape exit and the tape guide portion and is a length of the exposed tape;
the top surface and the bottom surface of the housing each have a rectangular shape that is longer in a right-and-left direction; and
at least a part of the first vertical information section is on a downstream side of a cassette center line in the feed path's direction, and is positioned such that a distance from the cassette center line is within a range of 14 to 20 percent of the tape exposure length, the cassette center line being a center line of the housing in the right-and-left direction.

11. The tape cassette according to claim 10, wherein a distance between center lines in the right-and-left direction of adjacent vertical information sections is within a range of 7 to 10 percent of the tape exposure length.

12. The tape cassette according to claim 1, further comprising:
a tape guide portion that is provided on a downstream side of the tape exit on the feed path, and that guides the tape that is discharged from the tape exit and exposed,
wherein:
a length in the feed direction of the specified area of the front surface on which the type indicator portion is provided is equal to or less than a tape exposure length that is a distance between the tape exit and the tape guide portion and is a length of the exposed tape; and
at least a part of the first vertical information section is positioned such that a distance from the tape exit is within a range of 30 to 36 percent of the tape exposure length.

13. A tape cassette, comprising:
a housing having a top surface, a bottom surface, a front surface and a pair of side surfaces;
a tape that is a print medium mounted in the housing;
a tape exit that discharges, from the housing, the tape guided in the housing along a predetermined feed path, at least a portion of the feed path extending parallel to the front surface; and
a type indicator portion provided adjacent to the tape exit and in a specified area of the front surface on an upstream side of the tape exit in a feed direction of the tape, the type indicator portion indicating a tape type of the tape and including at least one first surface portion and at least one second surface portion arranged in a pattern corresponding to the tape type, each of the at least one second surface portion being a surface portion located between the at least one first surface portion and the portion of the feed path in a direction that is generally orthogonal to the front surface, wherein
the type indicator portion includes a plurality of strip-shaped vertical information sections extending along a direction orthogonal to the feed direction,
each of the plurality of vertical information sections includes one of the at least one first surface portion and the at least one second surface portion, and
the type indicator portion includes at least one first surface portion formed over at least two of the plurality of vertical information sections.

* * * * *